United States Patent [19]
Sugiyama et al.

[11] Patent Number: 5,926,610
[45] Date of Patent: Jul. 20, 1999

[54] VIDEO DATA PROCESSING METHOD, VIDEO DATA PROCESSING APPARATUS AND VIDEO DATA RECORDING AND REPRODUCING APPARATUS

[75] Inventors: Akira Sugiyama; Tadashi Katagiri; Katsuya Yamamoto, all of Kanagawa, Japan

[73] Assignee: Sony Corporation, Tokyo, Japan

[21] Appl. No.: 08/745,057

[22] Filed: Nov. 7, 1996

[30] Foreign Application Priority Data

Nov. 15, 1995 [JP] Japan .................................. 7-297222
Nov. 15, 1995 [JP] Japan .................................. 7-321112

[51] Int. Cl.[6] .................................................. H04N 5/92
[52] U.S. Cl. ........................ 386/111; 386/112; 386/124
[58] Field of Search ........................... 386/46, 47, 111, 386/112, 116, 124, 68, 69, 71, 78, 79, 95; H04N 5/76, 5/92

[56] References Cited

U.S. PATENT DOCUMENTS

| | | | |
|---|---|---|---|
| 5,237,424 | 8/1993 | Nishino et al. | 386/40 |
| 5,313,471 | 5/1994 | Otaka et al. | 386/47 |
| 5,335,117 | 8/1994 | Park et al. | 386/116 |
| 5,416,600 | 5/1995 | Matsumi et al. | 386/112 |
| 5,602,685 | 2/1997 | Lee | 386/124 |

FOREIGN PATENT DOCUMENTS

| | | |
|---|---|---|
| 0 471 118 | 2/1992 | European Pat. Off. . |
| 0 552 049 | 7/1993 | European Pat. Off. . |
| 0 556 063 | 8/1993 | European Pat. Off. . |
| 0 664 648 | 7/1995 | European Pat. Off. . |
| 7-296528 | 11/1995 | Japan . |

OTHER PUBLICATIONS

Patent Abstracts of Japan vol. 16, No. 204 (E–1202), May 15, 1992 & JP 04 033484 A (Sony), Feb. 4, 1992.

C. Yamamitsu et al.: "A Study On Trick Plays for Digital VCR" IEEE Transactions On Consumer Electronics, vol. 37, No. 3, Aug. 1, 1991, pp. 261–266, XP000263194.

*Primary Examiner*—Huy Nguyen
*Attorney, Agent, or Firm*—Frommer Lawrence & Haug, LLP.; William S. Frommer

[57] ABSTRACT

A method and apparatus of processing a video data, for charging an arrangement of positions of macroblocks of video data, the video data being compressed in units of macroblocks and recorded on a magnetic tape recording medium, each macroblock of video data being formed by a plurality of video data, in which the following steps are carried out: adjoining recording positions of the macroblocks of video data on the magnetic tape recording medium, said video data being adjoined on an image when reproduction; and shuffling the macroblocks of the video data so that the macroblocks of video data are reproduced as the adjoined macroblocks of video data of the reproduction image when the video data on the magnetic tape recording medium are scanned at a speed which is a predetermined times of a normal speed.

8 Claims, 41 Drawing Sheets

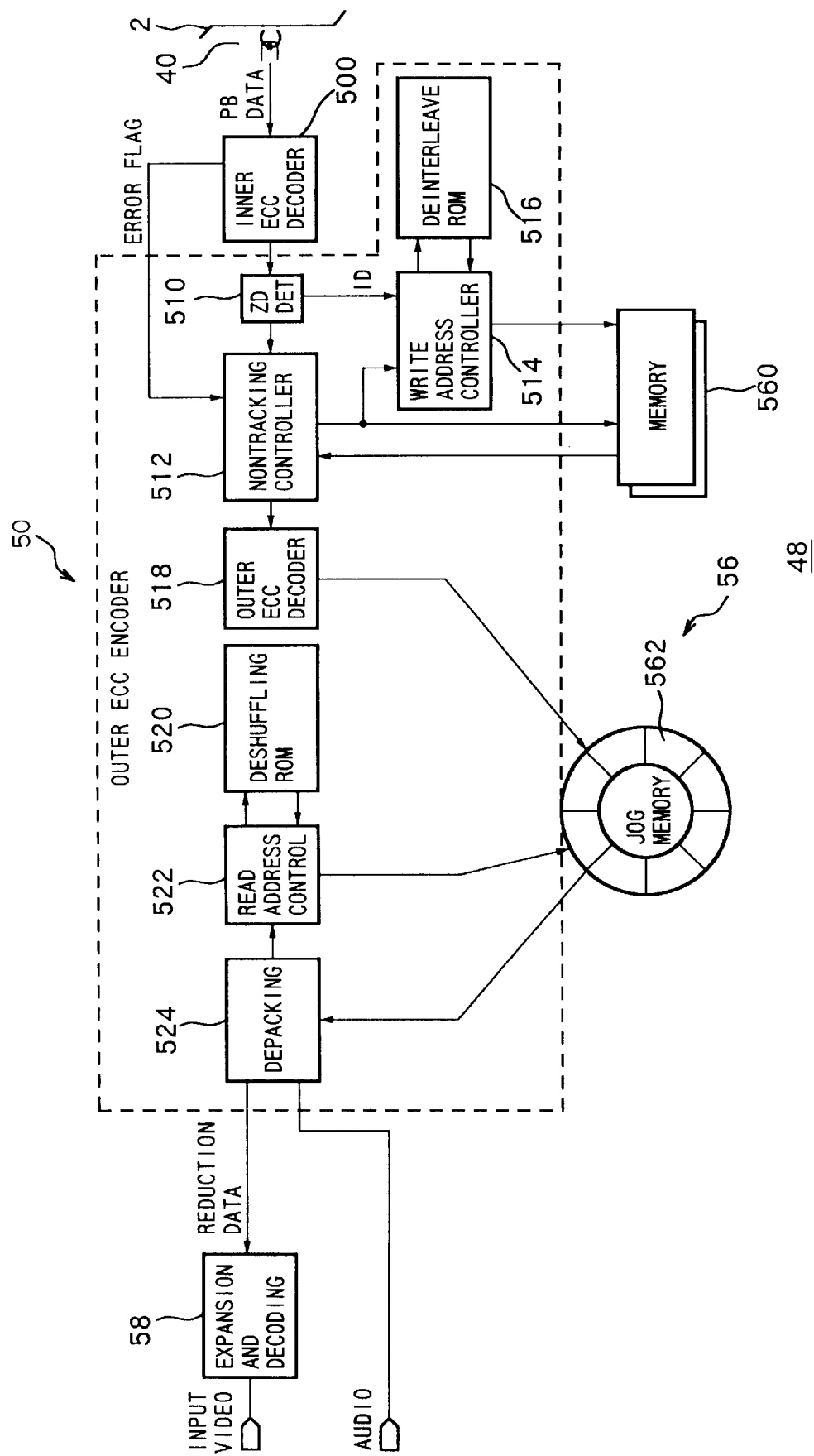

GOP STRUCTURE

REDUCTIONED DATA

SYNC BLOCK

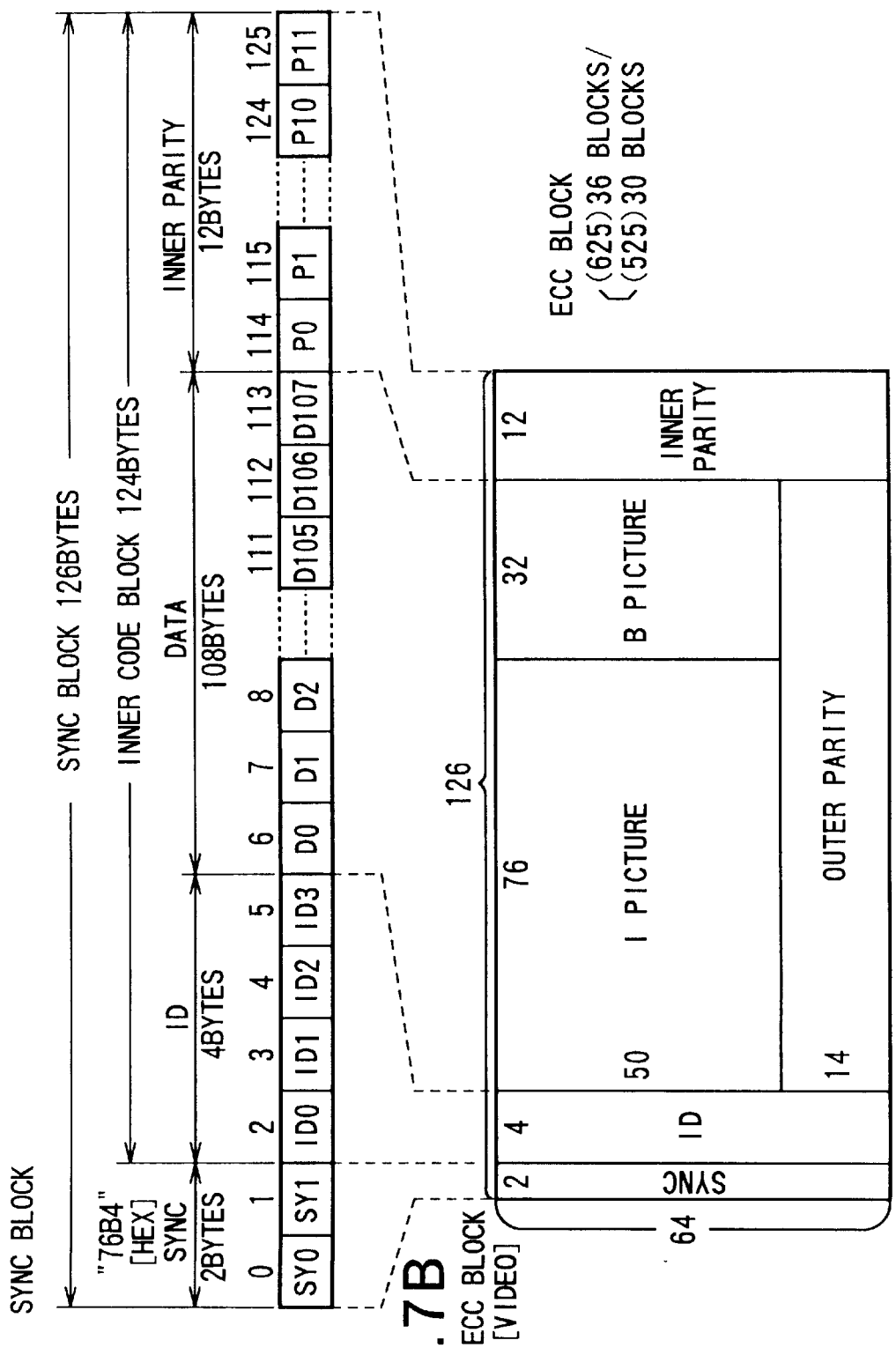

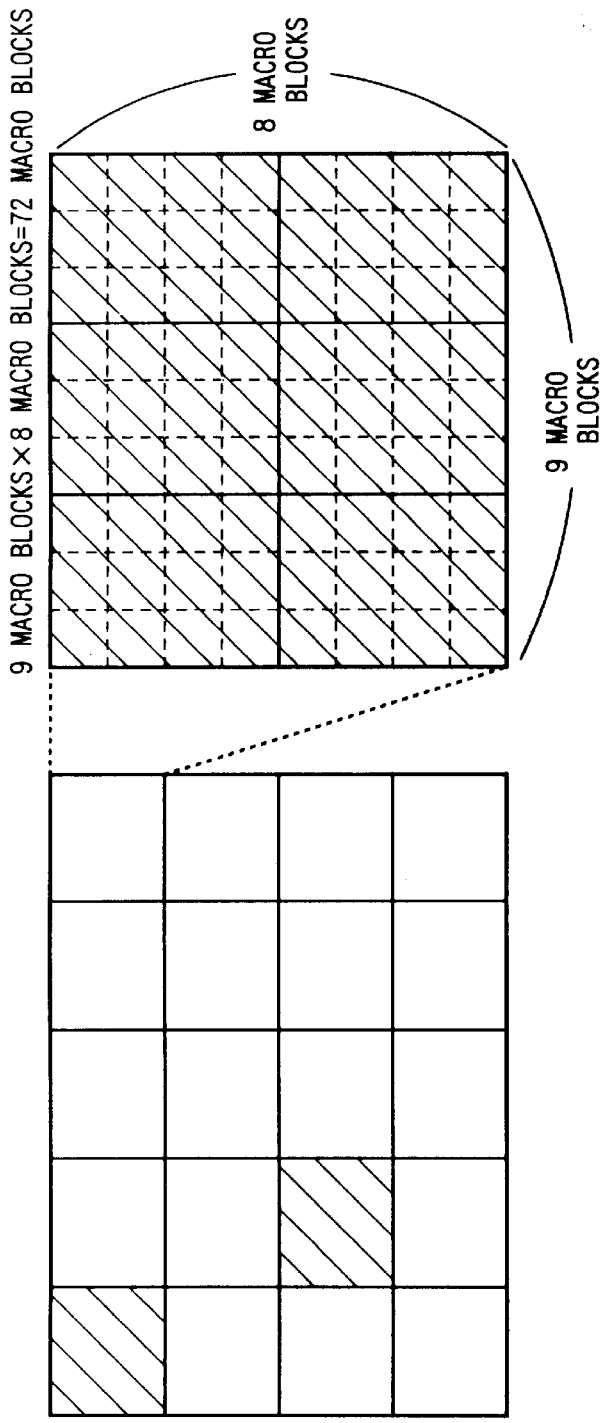
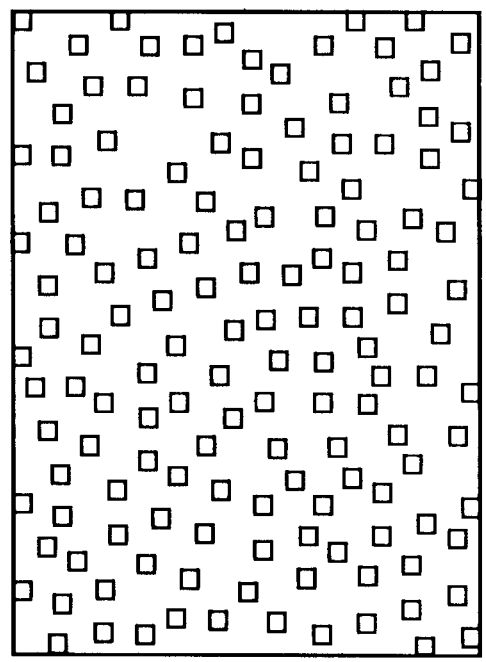
FIG.15A
FIG.15B

| IN AUDIO SECTOR | | |
|---|---|---|
| SB6 | 0 | SYSTEM AUX |
|  | 1 | AUDIO |
| SB5 SB4 | 00 | AUDIO CH4 |
|  | 01 | AUDIO CH3 |
|  | 10 | AUDIO CH2 |
|  | 11 | AUDIO CH1 |
| SB3 | 0 | UPPER SECTOR |
|  | 1 | LOWER SCTOR |

| IN VIDEO SECTOR | | |
|---|---|---|
| SB7 | 0 | UPPER SECTOR |
|  | 1 | LOWER SECTOR |

FIG. 20

| SYNC BLOCK ID | 1 | 2 | 3 | 4 | TRACK ID → 5 | ECC BLOCK NO. 6 | SYNC BLOCK NO. 7 | 8 | 9 | A | (DEC) |
|---|---|---|---|---|---|---|---|---|---|---|---|
| 20 | 0, 50 | 12, 50 | 24, 50 | 6, 50 | 18, 50 | 0, 51 | 12, 51 | 24, 51 | 6, 51 | 18, 51 | |
| 21 | 1, 50 | 13, 50 | 25, 50 | 7, 50 | 19, 50 | 1, 51 | 13, 51 | 25, 51 | 7, 51 | 19, 51 | |
| 22 | 2, 50 | 14, 50 | 26, 50 | 8, 50 | 20, 50 | 2, 51 | 14, 51 | 26, 51 | 8, 51 | 20, 51 | |
| 23 | 3, 50 | 15, 50 | 27, 50 | 9, 50 | 21, 50 | 3, 51 | 15, 51 | 27, 51 | 9, 51 | 21, 51 | |
| 24 | 4, 50 | 16, 50 | 28, 50 | 10, 50 | 22, 50 | 4, 51 | 16, 51 | 28, 51 | 10, 51 | 22, 51 | |
| 25 | 5, 50 | 17, 50 | 29, 50 | 11, 50 | 23, 50 | 5, 51 | 17, 51 | 29, 51 | 11, 51 | 23, 51 | |
| 26 | 6, 52 | 18, 52 | 0, 52 | 12, 52 | 24, 52 | 6, 53 | 18, 53 | 0, 53 | 12, 53 | 24, 53 | |
| 27 | 7, 52 | 19, 52 | 1, 52 | 13, 52 | 25, 52 | 7, 53 | 19, 53 | 1, 53 | 13, 53 | 25, 53 | |
| 28 | 8, 52 | 20, 52 | 2, 52 | 14, 52 | 26, 52 | 8, 53 | 20, 53 | 2, 53 | 14, 53 | 26, 53 | |
| 29 | 9, 52 | 21, 52 | 3, 52 | 15, 52 | 27, 52 | 9, 53 | 21, 53 | 3, 53 | 15, 53 | 27, 53 | |
| 2a | 10, 52 | 22, 52 | 4, 52 | 16, 52 | 28, 52 | 10, 53 | 22, 53 | 4, 53 | 16, 53 | 28, 53 | |
| 2b | 11, 52 | 23, 52 | 5, 52 | 17, 52 | 29, 52 | 11, 53 | 23, 53 | 5, 53 | 17, 53 | 29, 53 | |
| 2c | 12, 54 | 24, 54 | 6, 54 | 18, 54 | 0, 54 | 12, 55 | 24, 55 | 6, 55 | 18, 55 | 0, 55 | |
| 2d | 13, 54 | 25, 54 | 7, 54 | 19, 54 | 1, 54 | 13, 55 | 25, 55 | 7, 55 | 19, 55 | 1, 55 | |
| 2e | 14, 54 | 26, 54 | 8, 54 | 20, 54 | 2, 54 | 14, 55 | 26, 55 | 8, 55 | 20, 55 | 2, 55 | |
| 2f | 15, 54 | 27, 54 | 9, 54 | 21, 54 | 3, 54 | 15, 55 | 27, 55 | 9, 55 | 21, 55 | 3, 55 | |

FIG. 21

| SYNC BLOCK ID | 1 | 2 | 3 | 4 | TRACK ID → 5 | ECC BLOCK NO. 6 | 7 | 8 | 9 | A | SYNC BLOCK NO. (DEC) |
|---|---|---|---|---|---|---|---|---|---|---|---|
| 30 | 16, 54 | 28, 54 | 10, 54 | 22, 54 | 4, 54 | 16, 55 | 28, 55 | 10, 55 | 22, 55 | 4, 55 | — |
| 31 | 17, 54 | 29, 54 | 11, 54 | 23, 54 | 5, 54 | 17, 55 | 29, 55 | 11, 55 | 23, 55 | 5, 55 | — |
| 32 | 18, 0 | 0, 0 | 12, 0 | 24, 0 | 6, 0 | 18, 1 | 0, 1 | 12, 1 | 24, 1 | 6, 1 | — |
| 33 | 19, 0 | 1, 0 | 13, 0 | 25, 0 | 7, 0 | 19, 1 | 1, 1 | 13, 1 | 25, 1 | 7, 1 | — |
| 34 | 20, 0 | 2, 0 | 14, 0 | 26, 0 | 8, 0 | 20, 1 | 2, 1 | 14, 1 | 26, 1 | 8, 1 | — |
| 35 | 21, 0 | 3, 0 | 15, 0 | 27, 0 | 9, 0 | 21, 1 | 3, 1 | 15, 1 | 27, 1 | 9, 1 | — |
| 36 | 22, 0 | 4, 0 | 16, 0 | 28, 0 | 10, 0 | 22, 1 | 4, 1 | 16, 1 | 28, 1 | 10, 1 | — |
| 37 | 23, 0 | 5, 0 | 17, 0 | 29, 0 | 11, 0 | 23, 1 | 5, 1 | 17, 1 | 29, 1 | 11, 1 | — |
| 38 | 24, 2 | 6, 2 | 18, 2 | 0, 2 | 12, 2 | 24, 3 | 6, 3 | 18, 3 | 0, 3 | 12, 3 | — |
| 39 | 25, 2 | 7, 2 | 19, 2 | 1, 2 | 13, 2 | 25, 3 | 7, 3 | 19, 3 | 1, 3 | 13, 3 | — |
| 3a | 26, 2 | 8, 2 | 20, 2 | 2, 2 | 14, 2 | 26, 3 | 8, 3 | 20, 3 | 2, 3 | 14, 3 | — |
| 3b | 27, 2 | 9, 2 | 21, 2 | 3, 2 | 15, 2 | 27, 3 | 9, 3 | 21, 3 | 3, 3 | 15, 3 | — |
| 3c | 28, 2 | 10, 2 | 22, 2 | 4, 2 | 16, 2 | 28, 3 | 10, 3 | 22, 3 | 4, 3 | 16, 3 | — |
| 3d | 29, 2 | 11, 2 | 23, 2 | 5, 2 | 17, 2 | 29, 3 | 11, 3 | 23, 3 | 5, 3 | 17, 3 | — |
| 3e | 0, 4 | 12, 4 | 24, 4 | 6, 4 | 18, 4 | 0, 5 | 12, 5 | 24, 5 | 6, 5 | 18, 5 | — |
| 3f | 1, 4 | 13, 4 | 25, 4 | 7, 4 | 19, 4 | 1, 5 | 13, 5 | 25, 5 | 7, 5 | 19, 5 | — |

FIG. 22

TRACK ID → | ECC BLOCK NO. , SYNC BLOCK NO. (DEC)

| SYNC BLOCK ID → | 1 | 2 | 3 | 4 | 5 | 6 | 7 | 8 | 9 | A |
|---|---|---|---|---|---|---|---|---|---|---|
| 40 | 2 | 4, 14 | 4, 26 | 4, 8 | 4, 20 | 4, 2 | 5, 14 | 5, 26 | 5, 8 | 5, 20 |
| 41 | 3 | 4, 15 | 4, 27 | 4, 9 | 4, 21 | 4, 3 | 5, 15 | 5, 27 | 5, 9 | 5, 21 |
| 42 | 4 | 4, 16 | 4, 28 | 4, 10 | 4, 22 | 4, 4 | 5, 16 | 5, 28 | 5, 10 | 5, 22 |
| 43 | 5 | 4, 17 | 4, 29 | 4, 11 | 4, 23 | 4, 5 | 5, 17 | 5, 29 | 5, 11 | 5, 23 |
| 44 | 6 | 6, 18 | 6, 0 | 6, 12 | 6, 24 | 6, 6 | 7, 18 | 7, 0 | 7, 12 | 7, 24 |
| 45 | 7 | 6, 19 | 6, 1 | 6, 13 | 6, 25 | 6, 7 | 7, 19 | 7, 1 | 7, 13 | 7, 25 |
| 46 | 8 | 6, 20 | 6, 2 | 6, 14 | 6, 26 | 6, 8 | 7, 20 | 7, 2 | 7, 14 | 7, 26 |
| 47 | 9 | 6, 21 | 6, 3 | 6, 15 | 6, 27 | 6, 9 | 7, 21 | 7, 3 | 7, 15 | 7, 27 |
| 48 | 10 | 6, 22 | 6, 4 | 6, 16 | 6, 28 | 6, 10 | 7, 22 | 7, 4 | 7, 16 | 7, 28 |
| 49 | 11 | 6, 23 | 6, 5 | 6, 17 | 6, 29 | 6, 11 | 7, 23 | 7, 5 | 7, 17 | 7, 29 |
| 4a | 12 | 6, 24 | 6, 6 | 6, 18 | 8, 0 | 6, 12 | 7, 24 | 7, 6 | 7, 18 | 9, 0 |
| 4b | 13 | 6, 25 | 6, 7 | 6, 19 | 8, 1 | 6, 13 | 7, 25 | 7, 7 | 7, 19 | 9, 1 |
| 4c | 14 | 8, 26 | 8, 8 | 8, 20 | 8, 2 | 8, 14 | 9, 26 | 9, 8 | 9, 20 | 9, 2 |
| 4d | 15 | 8, 27 | 8, 9 | 8, 21 | 8, 3 | 8, 15 | 9, 27 | 9, 9 | 9, 21 | 9, 3 |
| 4e | 16 | 8, 28 | 8, 10 | 8, 22 | 8, 4 | 8, 16 | 9, 28 | 9, 10 | 9, 22 | 9, 4 |
| 4f | 17 | 8, 29 | 8, 11 | 8, 23 | 8, 5 | 8, 17 | 9, 29 | 9, 11 | 9, 23 | 9, 5 |

FIG.23

| SYNC BLOCK ID | TRACK ID → 1 | 2 | 3 | 4 | 5 | 6 | 7 | 8 | 9 | A |
|---|---|---|---|---|---|---|---|---|---|---|
| | ECC BLOCK NO., SYNC BLOCK NO. (DEC) | | | | | | | | | |
| 50 | 18, 10 | 0, 10 | 12, 10 | 24, 10 | 6, 10 | 18, 11 | 0, 11 | 12, 11 | 24, 11 | 6, 11 |
| 51 | 19, 10 | 1, 10 | 13, 10 | 25, 10 | 7, 10 | 19, 11 | 1, 11 | 13, 11 | 25, 11 | 7, 11 |
| 52 | 20, 10 | 2, 10 | 14, 10 | 26, 10 | 8, 10 | 20, 11 | 2, 11 | 14, 11 | 26, 11 | 8, 11 |
| 53 | 21, 10 | 3, 10 | 15, 10 | 27, 10 | 9, 10 | 21, 11 | 3, 11 | 15, 11 | 27, 11 | 9, 11 |
| 54 | 22, 10 | 4, 10 | 16, 10 | 28, 10 | 10, 10 | 22, 11 | 4, 11 | 16, 11 | 28, 11 | 10, 11 |
| 55 | 23, 10 | 5, 10 | 17, 10 | 29, 10 | 11, 10 | 23, 11 | 5, 11 | 17, 11 | 29, 11 | 11, 11 |
| 56 | 24, 12 | 6, 12 | 18, 12 | 0, 12 | 12, 12 | 24, 13 | 6, 13 | 18, 13 | 0, 13 | 12, 13 |
| 57 | 25, 12 | 7, 12 | 19, 12 | 1, 12 | 13, 12 | 25, 13 | 7, 13 | 19, 13 | 1, 13 | 13, 13 |
| 58 | 26, 12 | 8, 12 | 20, 12 | 2, 12 | 14, 12 | 26, 13 | 8, 13 | 20, 13 | 2, 13 | 14, 13 |
| 59 | 27, 12 | 9, 12 | 21, 12 | 3, 12 | 15, 12 | 27, 13 | 9, 13 | 21, 13 | 3, 13 | 15, 13 |
| 5a | 28, 12 | 10, 12 | 22, 12 | 4, 12 | 16, 12 | 28, 13 | 10, 13 | 22, 13 | 4, 13 | 16, 13 |
| 5b | 29, 12 | 11, 12 | 23, 12 | 5, 12 | 17, 12 | 29, 13 | 11, 13 | 23, 13 | 5, 13 | 17, 13 |
| 5c | 0, 14 | 12, 14 | 24, 14 | 6, 14 | 18, 14 | 0, 15 | 12, 15 | 24, 15 | 6, 15 | 18, 15 |
| 5d | 1, 14 | 13, 14 | 25, 14 | 7, 14 | 19, 14 | 1, 15 | 13, 15 | 25, 15 | 7, 15 | 19, 15 |
| 5e | 2, 14 | 14, 14 | 26, 14 | 8, 14 | 20, 14 | 2, 15 | 14, 15 | 26, 15 | 8, 15 | 20, 15 |
| 5f | 3, 14 | 15, 14 | 27, 14 | 9, 14 | 21, 14 | 3, 15 | 15, 15 | 27, 15 | 9, 15 | 21, 15 |

FIG.24

| SYNC BLOCK ID ↓ | TRACK ID → |ECC BLOCK NO. , SYNC BLOCK NO.| (DEC) | | | | | | | | | | |
|---|---|---|---|---|---|---|---|---|---|---|---|---|
| | 1 | 2 | 3 | 4 | 5 | 6 | 7 | 8 | 9 | A | B | C |
| 20 | 27, 50 | 6, 50 | 21, 50 | 0, 50 | 15, 50 | 30, 50 | 9, 50 | 24, 50 | 3, 50 | 18, 50 | 33, 50 | 12, 50 |
| 21 | 28, 50 | 7, 50 | 22, 50 | 1, 50 | 16, 50 | 31, 50 | 10, 50 | 25, 50 | 4, 50 | 19, 50 | 34, 50 | 13, 50 |
| 22 | 29, 50 | 8, 50 | 23, 50 | 2, 50 | 17, 50 | 32, 50 | 11, 50 | 26, 50 | 5, 50 | 20, 50 | 35, 50 | 14, 50 |
| 23 | 30, 51 | 9, 51 | 24, 51 | 3, 51 | 18, 51 | 33, 51 | 12, 51 | 27, 51 | 6, 51 | 21, 51 | 0, 51 | 15, 51 |
| 24 | 31, 51 | 10, 51 | 25, 51 | 4, 51 | 19, 51 | 34, 51 | 13, 51 | 28, 51 | 7, 51 | 22, 51 | 1, 51 | 16, 51 |
| 25 | 32, 51 | 11, 51 | 26, 51 | 5, 51 | 20, 51 | 35, 51 | 14, 51 | 29, 51 | 8, 51 | 23, 51 | 2, 51 | 17, 51 |
| 26 | 33, 52 | 12, 52 | 27, 52 | 6, 52 | 21, 52 | 0, 52 | 15, 52 | 30, 52 | 9, 52 | 24, 52 | 3, 52 | 18, 52 |
| 27 | 34, 52 | 13, 52 | 28, 52 | 7, 52 | 22, 52 | 1, 52 | 16, 52 | 31, 52 | 10, 52 | 25, 52 | 4, 52 | 19, 52 |
| 28 | 35, 52 | 14, 52 | 29, 52 | 8, 52 | 23, 52 | 2, 52 | 17, 52 | 32, 52 | 11, 52 | 26, 52 | 5, 52 | 20, 52 |
| 29 | 0, 53 | 15, 53 | 30, 53 | 9, 53 | 24, 53 | 3, 53 | 18, 53 | 33, 53 | 12, 53 | 27, 53 | 6, 53 | 21, 53 |
| 2a | 1, 53 | 16, 53 | 31, 53 | 10, 53 | 25, 53 | 4, 53 | 19, 53 | 34, 53 | 13, 53 | 28, 53 | 7, 53 | 22, 53 |
| 2b | 2, 53 | 17, 53 | 32, 53 | 11, 53 | 26, 53 | 5, 53 | 20, 53 | 35, 53 | 14, 53 | 29, 53 | 8, 53 | 23, 53 |
| 2c | 3, 54 | 18, 54 | 33, 54 | 12, 54 | 27, 54 | 6, 54 | 21, 54 | 0, 54 | 15, 54 | 30, 54 | 9, 54 | 24, 54 |
| 2d | 4, 54 | 19, 54 | 34, 54 | 13, 54 | 28, 54 | 7, 54 | 22, 54 | 1, 54 | 16, 54 | 31, 54 | 10, 54 | 25, 54 |
| 2e | 5, 54 | 20, 54 | 35, 54 | 14, 54 | 29, 54 | 8, 54 | 23, 54 | 2, 54 | 17, 54 | 32, 54 | 11, 54 | 26, 54 |
| 2f | 6, 55 | 21, 55 | 0, 55 | 15, 55 | 30, 55 | 9, 55 | 24, 55 | 3, 55 | 18, 55 | 33, 55 | 12, 55 | 27, 55 |

FIG. 25

SYNC BLOCK ID → TRACK ID → | ECC BLOCK NO., SYNC BLOCK NO. | (DEC)

| SYNC BLOCK ID | 1 | 2 | 3 | 4 | 5 | 6 | 7 | 8 | 9 | A | B | C |
|---|---|---|---|---|---|---|---|---|---|---|---|---|
| 30 | 7, 55 | 22, 55 | 1, 55 | 16, 55 | 31, 55 | 10, 55 | 25, 55 | 4, 55 | 19, 55 | 34, 55 | 13, 55 | 28, 55 |
| 31 | 8, 55 | 23, 55 | 2, 55 | 17, 55 | 32, 55 | 11, 55 | 26, 55 | 5, 55 | 20, 55 | 35, 55 | 14, 55 | 29, 55 |
| 32 | 9, 0 | 24, 0 | 3, 0 | 18, 0 | 33, 0 | 12, 0 | 27, 0 | 6, 0 | 21, 0 | 0, 0 | 15, 0 | 30, 0 |
| 33 | 10, 0 | 25, 0 | 4, 0 | 19, 0 | 34, 0 | 13, 0 | 28, 0 | 7, 0 | 22, 0 | 1, 0 | 16, 0 | 31, 0 |
| 34 | 11, 0 | 26, 0 | 5, 0 | 20, 0 | 35, 0 | 14, 0 | 29, 0 | 8, 0 | 23, 0 | 2, 0 | 17, 0 | 32, 0 |
| 35 | 12, 1 | 27, 1 | 6, 1 | 21, 1 | 0, 1 | 15, 1 | 30, 1 | 9, 1 | 24, 1 | 3, 1 | 18, 1 | 33, 1 |
| 36 | 13, 1 | 28, 1 | 7, 1 | 22, 1 | 1, 1 | 16, 1 | 31, 1 | 10, 1 | 25, 1 | 4, 1 | 19, 1 | 34, 1 |
| 37 | 14, 1 | 29, 1 | 8, 1 | 23, 1 | 2, 1 | 17, 1 | 32, 1 | 11, 1 | 26, 1 | 5, 1 | 20, 1 | 35, 1 |
| 38 | 15, 2 | 30, 2 | 9, 2 | 24, 2 | 3, 2 | 18, 2 | 33, 2 | 12, 2 | 27, 2 | 6, 2 | 21, 2 | 0, 2 |
| 39 | 16, 2 | 31, 2 | 10, 2 | 25, 2 | 4, 2 | 19, 2 | 34, 2 | 13, 2 | 28, 2 | 7, 2 | 22, 2 | 1, 2 |
| 3a | 17, 2 | 32, 2 | 11, 2 | 26, 2 | 5, 2 | 20, 2 | 35, 2 | 14, 2 | 29, 2 | 8, 2 | 23, 2 | 2, 2 |
| 3b | 18, 3 | 33, 3 | 12, 3 | 27, 3 | 6, 3 | 21, 3 | 0, 3 | 15, 3 | 30, 3 | 9, 3 | 24, 3 | 3, 3 |
| 3c | 19, 3 | 34, 3 | 13, 3 | 28, 3 | 7, 3 | 22, 3 | 1, 3 | 16, 3 | 31, 3 | 10, 3 | 25, 3 | 4, 3 |
| 3d | 20, 3 | 35, 3 | 14, 3 | 29, 3 | 8, 3 | 23, 3 | 2, 3 | 17, 3 | 32, 3 | 11, 3 | 26, 3 | 5, 3 |
| 3e | 21, 4 | 0, 4 | 15, 4 | 30, 4 | 9, 4 | 24, 4 | 3, 4 | 18, 4 | 33, 4 | 12, 4 | 27, 4 | 6, 4 |
| 3f | 22, 4 | 1, 4 | 16, 4 | 31, 4 | 10, 4 | 25, 4 | 4, 4 | 19, 4 | 34, 4 | 13, 4 | 28, 4 | 7, 4 |

FIG.26

| SYNC BLOCK ID → | 1 | 2 | 3 | 4 | 5 | 6 | 7 | 8 | 9 | A | B | C |
|---|---|---|---|---|---|---|---|---|---|---|---|---|
| | | | | | TRACK ID → | | ECC BLOCK NO. | | SYNC BLOCK NO. | | (DEC) | |
| 40 | 4,23 | 4,2 | 4,17 | 4,32 | 4,11 | 4,26 | 4,5 | 4,20 | 4,35 | 4,14 | 4,29 | 4,8 |
| 41 | 5,24 | 5,3 | 5,18 | 5,33 | 5,12 | 5,27 | 5,6 | 5,21 | 5,0 | 5,15 | 5,30 | 5,9 |
| 42 | 5,25 | 5,4 | 5,19 | 5,34 | 5,13 | 5,28 | 5,7 | 5,22 | 5,1 | 5,16 | 5,31 | 5,10 |
| 43 | 5,26 | 5,5 | 5,20 | 5,35 | 5,14 | 5,29 | 5,8 | 5,23 | 5,2 | 5,17 | 5,32 | 5,11 |
| 44 | 6,27 | 6,6 | 6,21 | 6,0 | 6,15 | 6,30 | 6,9 | 6,24 | 6,3 | 6,18 | 6,33 | 6,12 |
| 45 | 6,28 | 6,7 | 6,22 | 6,1 | 6,16 | 6,31 | 6,10 | 6,25 | 6,4 | 6,19 | 6,34 | 6,13 |
| 46 | 6,29 | 6,8 | 6,23 | 6,2 | 6,17 | 6,32 | 6,11 | 6,26 | 6,5 | 6,20 | 6,35 | 6,14 |
| 47 | 7,30 | 7,9 | 7,24 | 7,3 | 7,18 | 7,33 | 7,12 | 7,27 | 7,6 | 7,21 | 7,0 | 7,15 |
| 48 | 7,31 | 7,10 | 7,25 | 7,4 | 7,19 | 7,34 | 7,13 | 7,28 | 7,7 | 7,22 | 7,1 | 7,16 |
| 49 | 7,32 | 7,11 | 7,26 | 7,5 | 7,20 | 7,35 | 7,14 | 7,29 | 7,8 | 7,23 | 7,2 | 7,17 |
| 4a | 8,33 | 8,12 | 8,27 | 8,6 | 8,21 | 8,0 | 8,15 | 8,30 | 8,9 | 8,24 | 8,3 | 8,18 |
| 4b | 8,34 | 8,13 | 8,28 | 8,7 | 8,22 | 8,1 | 8,16 | 8,31 | 8,10 | 8,25 | 8,4 | 8,19 |
| 4c | 8,35 | 8,17 | 8,29 | 8,8 | 8,23 | 8,2 | 8,17 | 8,32 | 8,11 | 8,26 | 8,5 | 8,20 |
| 4d | 9,0 | 9,15 | 9,30 | 9,9 | 9,24 | 9,3 | 9,18 | 9,33 | 9,12 | 9,27 | 9,6 | 9,21 |
| 4e | 9,1 | 9,16 | 9,31 | 9,10 | 9,25 | 9,4 | 9,19 | 9,34 | 9,13 | 9,28 | 9,7 | 9,22 |
| 4f | 9,2 | 9,17 | 9,32 | 9,11 | 9,26 | 9,5 | 9,20 | 9,35 | 9,14 | 9,29 | 9,8 | 9,23 |

FIG. 27

| SYNC BLOCK ID | 1 | 2 | 3 | 4 | 5 | 6 | 7 | 8 | 9 | A | B | C | (DEC) |
|---|---|---|---|---|---|---|---|---|---|---|---|---|---|
| 50 | 3, 10 | 18, 10 | 33, 10 | 12, 10 | 27, 10 | 6, 10 | 21, 10 | 0, 10 | 15, 10 | 30, 10 | 9, 10 | 24, 10 | |
| 51 | 4, 10 | 19, 10 | 34, 10 | 13, 10 | 28, 10 | 7, 10 | 22, 10 | 1, 10 | 16, 10 | 31, 10 | 10, 10 | 25, 10 | |
| 52 | 5, 10 | 20, 10 | 35, 10 | 14, 10 | 29, 10 | 8, 10 | 23, 10 | 2, 10 | 17, 10 | 32, 10 | 11, 10 | 26, 10 | |
| 53 | 6, 11 | 21, 11 | 0, 11 | 15, 11 | 30, 11 | 9, 11 | 24, 11 | 3, 11 | 18, 11 | 33, 11 | 12, 11 | 27, 11 | |
| 54 | 7, 11 | 22, 11 | 1, 11 | 16, 11 | 31, 11 | 10, 11 | 25, 11 | 4, 11 | 19, 11 | 34, 11 | 13, 11 | 28, 11 | |
| 55 | 8, 11 | 23, 11 | 2, 11 | 17, 11 | 32, 11 | 11, 11 | 26, 11 | 5, 11 | 20, 11 | 35, 11 | 14, 11 | 29, 11 | |
| 56 | 9, 12 | 24, 12 | 3, 12 | 18, 12 | 33, 12 | 12, 12 | 27, 12 | 6, 12 | 21, 12 | 0, 12 | 15, 12 | 30, 12 | |
| 57 | 10, 12 | 25, 12 | 4, 12 | 19, 12 | 34, 12 | 13, 12 | 28, 12 | 7, 12 | 22, 12 | 1, 12 | 16, 12 | 31, 12 | |
| 58 | 11, 12 | 26, 12 | 5, 12 | 20, 12 | 35, 12 | 14, 12 | 29, 12 | 8, 12 | 23, 12 | 2, 12 | 17, 12 | 32, 12 | |
| 59 | 12, 13 | 27, 13 | 6, 13 | 21, 13 | 0, 13 | 15, 13 | 30, 13 | 9, 13 | 24, 13 | 3, 13 | 18, 13 | 33, 13 | |
| 5a | 13, 13 | 28, 13 | 7, 13 | 22, 13 | 1, 13 | 16, 13 | 31, 13 | 10, 13 | 25, 13 | 4, 13 | 19, 13 | 34, 13 | |
| 5b | 14, 13 | 29, 13 | 8, 13 | 23, 13 | 2, 13 | 17, 13 | 32, 13 | 11, 13 | 26, 13 | 5, 13 | 20, 13 | 35, 13 | |
| 5c | 15, 14 | 30, 14 | 9, 14 | 24, 14 | 3, 14 | 18, 14 | 33, 14 | 12, 14 | 27, 14 | 6, 14 | 21, 14 | 0, 14 | |
| 5d | 16, 14 | 31, 14 | 10, 14 | 25, 14 | 4, 14 | 19, 14 | 34, 14 | 13, 14 | 28, 14 | 7, 14 | 22, 14 | 1, 14 | |
| 5e | 17, 14 | 32, 14 | 11, 14 | 26, 14 | 5, 14 | 20, 14 | 35, 14 | 14, 14 | 29, 14 | 8, 14 | 23, 14 | 2, 14 | |
| 5f | 18, 15 | 33, 15 | 12, 15 | 27, 15 | 6, 15 | 21, 15 | 0, 15 | 15, 15 | 30, 15 | 9, 15 | 24, 15 | 3, 15 | |

TRACK ID → | ECC BLOCK NO., SYNC BLOCK NO. | (DEC)

TRACK ID → | ECC BLOCK NO. | SYNC BLOCK NO. | (DEC)

| SYNC BLOCK ID | 1 | 2 | 3 | 4 | 5 | 6 | 7 | 8 | 9 | A |
|---|---|---|---|---|---|---|---|---|---|---|
| 1 | 0, 6 | 1, 6 | 2, 6 | 3, 6 | 4, 6 | 5, 6 | 6, 6 | 7, 6 | 8, 6 | 9, 6 |
| 2 | 7, 7 | 8, 7 | 9, 7 | 0, 7 | 1, 7 | 2, 7 | 3, 7 | 4, 7 | 5, 7 | 6, 7 |
| 3 | 4, 0 | 5, 0 | 6, 0 | 7, 0 | 8, 0 | 9, 0 | 0, 0 | 1, 0 | 2, 0 | 3, 0 |
| 4 | 1, 1 | 2, 1 | 3, 1 | 4, 1 | 5, 1 | 6, 1 | 7, 1 | 8, 1 | 9, 1 | 0, 1 |
| 5 | 8, 2 | 9, 2 | 0, 2 | 1, 2 | 2, 2 | 3, 2 | 4, 2 | 5, 2 | 6, 2 | 7, 2 |
| 6 | 5, 8 | 6, 8 | 7, 8 | 8, 8 | 9, 8 | 0, 8 | 1, 8 | 2, 8 | 3, 8 | 4, 8 |
| 7 | 2, 9 | 3, 9 | 4, 9 | 5, 9 | 6, 9 | 7, 9 | 8, 9 | 9, 9 | 0, 9 | 1, 9 |
| 9 | 9, 10 | 0, 10 | 1, 10 | 2, 10 | 3, 10 | 4, 10 | 5, 10 | 6, 10 | 7, 10 | 8, 10 |
| a | 6, 11 | 7, 11 | 8, 11 | 9, 11 | 0, 11 | 1, 11 | 2, 11 | 3, 11 | 4, 11 | 5, 11 |
| b | 3, 3 | 4, 3 | 5, 3 | 6, 3 | 7, 3 | 8, 3 | 9, 3 | 0, 3 | 1, 3 | 2, 3 |
| c | 0, 4 | 1, 4 | 2, 4 | 3, 4 | 4, 4 | 5, 4 | 6, 4 | 7, 4 | 8, 4 | 9, 4 |
| d | 7, 5 | 8, 5 | 9, 5 | 0, 5 | 1, 5 | 2, 5 | 3, 5 | 4, 5 | 5, 5 | 6, 5 |
| e | 4, 12 | 5, 12 | 6, 12 | 7, 12 | 8, 12 | 9, 12 | 0, 12 | 1, 12 | 2, 12 | 3, 12 |
| f | 1, 13 | 2, 13 | 3, 13 | 4, 13 | 5, 13 | 6, 13 | 7, 13 | 8, 13 | 9, 13 | 0, 13 |

TRACK ID → | ECC BLOCK NO. , SYNC BLOCK NO. | (DEC)

| SYNC BLOCK ID ↓ | 1 | 2 | 3 | 4 | 5 | 6 | 7 | 8 | 9 | A | B | C |
|---|---|---|---|---|---|---|---|---|---|---|---|---|
| 1 | 6, 0 | 6, 1 | 6, 2 | 6, 3 | 6, 4 | 6, 5 | 6, 6 | 6, 7 | 6, 8 | 6, 9 | 6, 10 | 6, 11 |
| 2 | 7, 7 | 7, 8 | 7, 9 | 7, 10 | 7, 11 | 7, 0 | 7, 1 | 7, 2 | 7, 3 | 7, 4 | 7, 5 | 7, 6 |
| 3 | 0, 2 | 0, 3 | 0, 4 | 0, 5 | 0, 6 | 0, 7 | 0, 8 | 0, 9 | 0, 10 | 0, 11 | 0, 0 | 0, 1 |
| 4 | 1, 9 | 1, 10 | 1, 11 | 1, 0 | 1, 1 | 1, 2 | 1, 3 | 1, 4 | 1, 5 | 1, 6 | 1, 7 | 1, 8 |
| 5 | 2, 4 | 2, 5 | 2, 6 | 2, 7 | 2, 8 | 2, 9 | 2, 10 | 2, 11 | 2, 0 | 2, 1 | 2, 2 | 2, 3 |
| 6 | 8, 11 | 8, 0 | 8, 1 | 8, 2 | 8, 3 | 8, 4 | 8, 5 | 8, 6 | 8, 7 | 8, 8 | 8, 9 | 8, 10 |
| 7 | 9, 6 | 9, 7 | 9, 8 | 9, 9 | 9, 10 | 9, 11 | 9, 0 | 9, 1 | 9, 2 | 9, 3 | 9, 4 | 9, 5 |
| 9 | 10, 1 | 10, 2 | 10, 3 | 10, 4 | 10, 5 | 10, 6 | 10, 7 | 10, 8 | 10, 9 | 10, 10 | 10, 11 | 10, 0 |
| a | 11, 8 | 11, 9 | 11, 10 | 11, 11 | 11, 0 | 11, 1 | 11, 2 | 11, 3 | 11, 4 | 11, 5 | 11, 6 | 11, 7 |
| b | 3, 3 | 3, 4 | 3, 5 | 3, 6 | 3, 7 | 3, 8 | 3, 9 | 3, 10 | 3, 11 | 3, 0 | 3, 1 | 3, 2 |
| c | 4, 10 | 4, 11 | 4, 0 | 4, 1 | 4, 2 | 4, 3 | 4, 4 | 4, 5 | 4, 6 | 4, 7 | 4, 8 | 4, 9 |
| d | 5, 5 | 5, 6 | 5, 7 | 5, 8 | 5, 9 | 5, 10 | 5, 11 | 5, 0 | 5, 1 | 5, 2 | 5, 3 | 5, 4 |
| e | 12, 0 | 12, 1 | 12, 2 | 12, 3 | 12, 4 | 12, 5 | 12, 6 | 12, 7 | 12, 8 | 12, 9 | 12, 10 | 12, 11 |
| f | 13, 7 | 13, 8 | 13, 9 | 13, 10 | 13, 11 | 13, 0 | 13, 1 | 13, 2 | 13, 3 | 13, 4 | 13, 5 | 13, 6 |

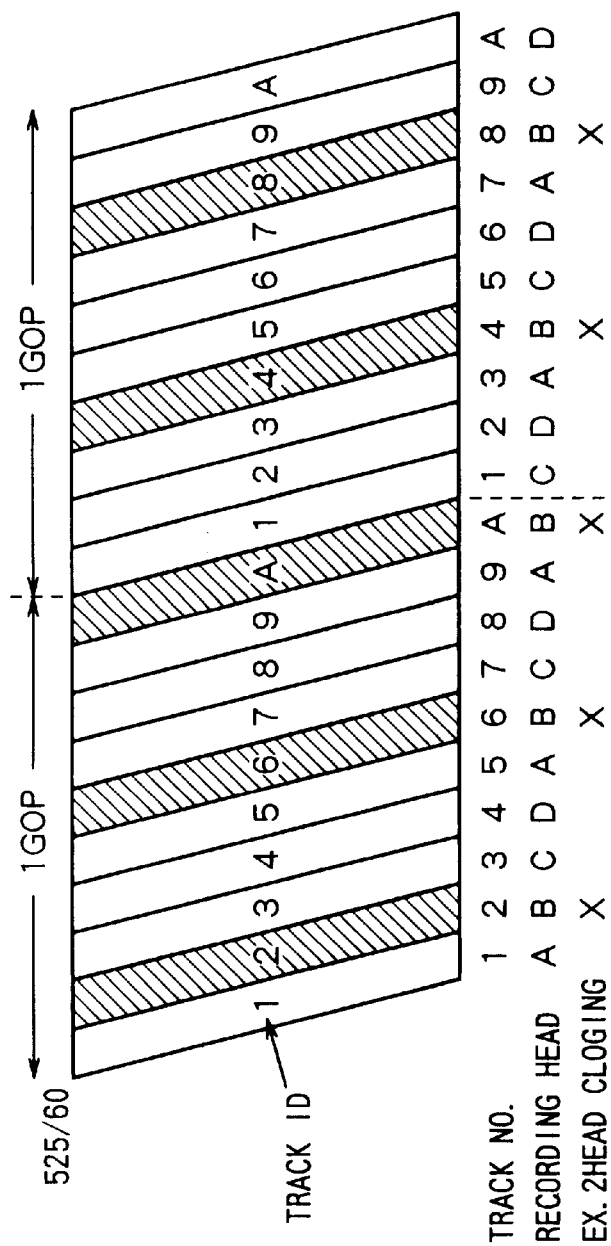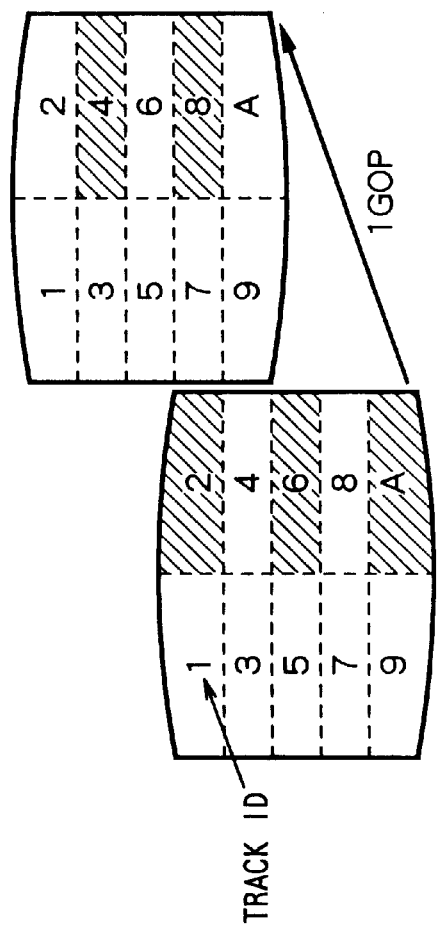
FIG.30A
FIG.30B

RANDOM SHUFFLING

BLOCK SHUFFLING

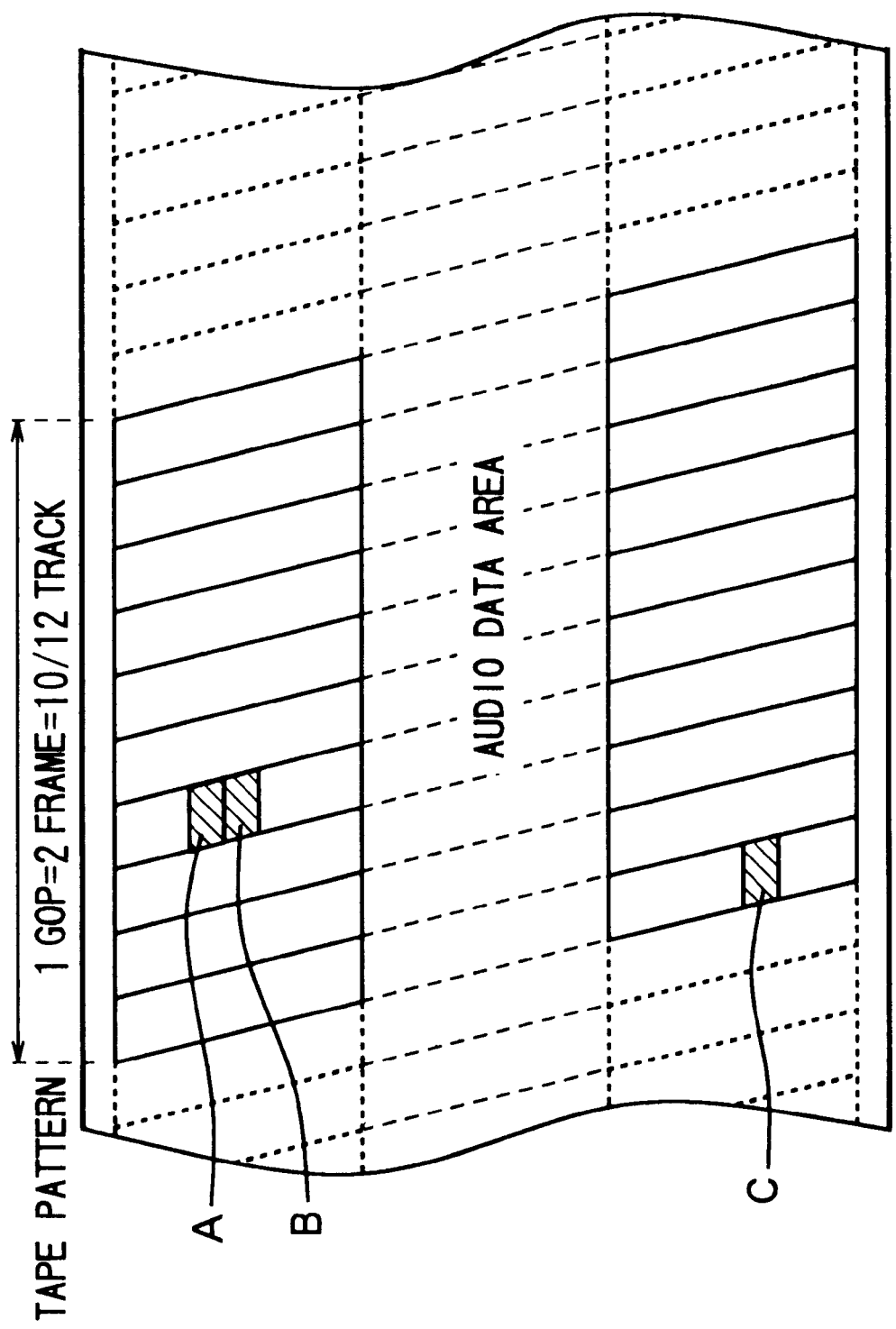

VIDEO DATA PROCESSING METHOD, VIDEO DATA PROCESSING APPARATUS AND VIDEO DATA RECORDING AND REPRODUCING APPARATUS

BACKGROUND OF THE INVENTION

1. Field of the Invention

The present invention relates to a video data processing method, a video data processing apparatus, and a video data recording and reproducing apparatus, in which a video signal is compressed and encoded on a relatively large macroblock and displayed so that, when reproducing the video data recorded on a video tape, the content of the reproduction video can be easily recognized even if when a high speed reproduction or when data error is occurred.

2. Description of the Related Art

In general, digital video data of a moving picture has been compressed and coded by dividing the video data contained in each of the frames into relatively small blocks, each consisting of, for example, 8×4 pixels and performing processing such as predictive coding in units of these blocks. At present, however, large macroblocks of, for example, 16×16 pixels are now being used for the compression and coding of video data.

In order to prevent a burst-like data error from occurring at the reproduction and the error correction processing from becoming impossible due to occurrence of a large amount of error in the error correction data block (ECC block) by the same error correction code, the video data is recorded on a magnetic tape for video tape recorder (VTR tape) with the video data shuffled so that the distribution of the large macroblocks contained in the same ECC block becomes random on the helical tracks of the VTR tape.

No problem occurs when reproducing at a usual (normal) reproduction speed the video data compressed and coded using large macroblocks and recorded on the VTR tape shuffled so that the distribution on the helical tracks becomes random as explained above. However, it is sometimes desired to reproduce such video data from the VTR tape at a high speed such double speed or triple speed. At high speed reproduction, the reproduction head of the video cassette recorder (VCR) does not scan (trace) along the helical tracks of the VTR tape, but traces the helical tracks at an angle in accordance with a speed, which is a predetermined times of a normal speed, for the high speed reproduction with respect to the longitudinal direction of the helical tracks. Accordingly, all of the video data recorded on each of the helical tracks are not reproduced at the high speed reproduction—only one part is reproduced.

In the conventional shuffling, the video data is shuffled so that the distribution of the macroblocks contained in the same frame becomes constant on the helical tracks of the VTR tape, therefore where only part of the video data recorded on each of the helical tracks is reproduced, macroblocks spaced apart from each other on the image are reproduced from the same helical track.

When the macroblock is relatively small, due to the properties of human vision, the individual macroblocks which are reproduced do not stand out and the entire image appears integrated, therefore there is a little effect exerted upon the viewer. However, the larger the macroblock, the more the individual macroblocks stand out and harder the reproduced image becomes to be viewed by the viewer. That is, in such a case, a plurality of rectangular areas (macroblocks) spaced apart from each other are reproduced at random and the image appears unnatural to the viewer as if it were divided into separate areas like a checkered flag. Such a phenomenon becomes conspicuous when the motion of the video is vigorous.

Usually a plurality of recording magnetic heads and reproduction magnetic heads (recording/reproduction heads) are respectively disposed on a tape travelling surface of a rotation drum of a video cassette tape recorder for recording and reproducing (recording/reproducing) digital audio data and digital video data of a moving picture (audio and video data). These magnetic heads respectively scan specific helical tracks on the VTR tape to record and reproduce the shuffled audio and video data.

The disadvantages, for example, clogging of a magnetic head (head clogging), sometimes occurs in one or more of the plurality of recording/reproduction heads of the tape traveling surface of the rotation drum of the VCR. In such a case, the recording and reproduction of the audio and video data recorded on the helical tracks corresponding to the recording/reproduction head in which trouble is caused continuously become impossible. Accordingly, a loss of image continuously occurs at the same position over the frames and cannot be corrected by interpolation on a time axis using the video data of this other frames. That is, for loss of image due to head clogging etc., it is necessary to interpolate and correct the loss by using the other video data in the same frame.

However, when recording/reproducing video data shuffled by a pattern so that the video data recorded and reproduced by one scan of the recording/reproduction heads are collected together so as to correspond to a wide range of the screen, the area of the loss of the image due to head clogging etc. becomes large and interpolation in the same frame becomes impossible.

Alternatively, it can be considered to use a powerful error correction code (ECC) having a high error correction ability so as to correct the loss of image due to head clogging etc. When adopting this method, however, the amount of data of the ECC code having a high error correction ability is large, and the proportion of it occupying the audio and video data becomes high, therefore it will prevent efficient recording of the audio and video data.

SUMMARY OF THE INVENTION

An object of the present invention is to provide a video data processing method, a video data processing apparatus, and a video data recording and reproducing apparatus wherein even in a case where the video data is compressed, coded, and recorded on the video tape by using relatively large macroblocks and further reproduced at a high speed and displayed, the reproduced image is natural and easily viewed.

Another object of the present invention is to provide a video data processing method, a video data processing apparatus, and a video data recording and reproducing apparatus with which loss will not continuously occur at the same position of the image obtained by reproducing the video data from the VTR tape even in a case where clogging is caused in the recording/reproduction heads.

Still another object of the present invention is to provide a video data processing method, a video data processing apparatus, and a video data recording and reproducing apparatus with which loss will not continuously occur at the same position of the image no matter which shuffling pattern is used to shuffle the video data to be reproduced from the VTR tape.

Yet still another object of the present invention is to provide a video data processing method, a video data processing apparatus, and a video data recording and reproducing apparatus with which easy inter-frame correction is possible and the quality of the reproduced image does not largely deteriorate even in a case where head clogging is caused in the recording/reproduction heads of the rotation drum.

According to a first aspect of the present invention, there is provided a method of processing a video data, for charging an arrangement of positions of macroblocks of video data, the video data being compressed in units of macroblocks and recorded on a magnetic tape recording medium, each macroblock of video data being formed by a plurality of video data, said method including the steps of: adjoining recording positions of the macroblocks of video data on the magnetic tape recording medium, said video data being adjoined on an image when reproduction; and shuffling the macroblocks of the video data so that the macroblocks of video data are reproduced as the adjoined macroblocks of video data of the reproduction image when the video data on the magnetic tape recording medium are scanned at a speed which is a predetermined times of a normal speed.

According to a second aspect of the present invention, there is provided an apparatus of processing a video data, for charging an arrangement of positions of macroblocks of video data, the video data being compressed in units of macroblocks and recorded on a magnetic tape recording medium, each macroblock of video data being formed by a plurality of video data, said apparatus comprising: a video data arrangement changing means for changing an arrangement of the macroblocks of video data to adjoin recording positions of the macroblocks of video data on the magnetic tape recording medium, said video data being adjoined on an image when reproduction; an interleaving means for performing interleaving so that the adjoining macroblocks of video data on the image are not contained in the same data block; and an error correction code adding means for adding an error correction code to the interleaved data block.

According to a third aspect of the present invention, there is provided a video data recording and reproducing apparatus for recording and reproducing video data compressed in units of macroblocks to and from a magnetic tape recording medium, said apparatus comprising: a video data processing means for changing the arrangement of the macroblocks of the video data; and a video data arrangement changing means for changing the arrangement of the macroblocks of video data so that the recording positions of the adjoining macroblocks on the image on the magnetic tape recording medium are adjacent to each other, an interleaving means for performing interleaving so that the adjoining macroblocks on the image are not contained in the same data block, and an error correction code adding means for adding an error correction code to the interleaved data block.

Preferably, the apparatus further comprising: a video data reproducing means for reproducing the video data recorded on the magnetic tape recording medium; an arrangement restoring means for returning the arrangement of the macroblocks of the reproduced video data to the original one; an error correcting means for performing error correction processing by using the error correction code added to the video data returned in arrangement of the macroblocks to the original one; and a video data expanding means for expanding the error-corrected video data.

According to a fourth aspect of the present invention, there is provided a method of processing a video data, including the steps of: displaying a video data block containing at least one frame of video data in which an error is continuously occurred in a same portion, on a screen; and shuffling the video data block by charging a shuffling pattern for each video data block so that portions in which the error is continuously caused will not superimpose on each other on the screen.

According to a fifth aspect of the present invention, there is provided a video data processing apparatus comprising: a shuffling means for performing shuffling for each of a plurality of video data blocks containing one or more frames of video data; a video data dividing means for dividing each of the plurality of shuffled video data blocks into a predetermined plurality of shuffling blocks; an identification code adding means for adding an identification code indicating the order of each of the plurality of shuffling blocks to each of the shuffling blocks; and an order changing means for changing the order of the plurality of shuffling blocks added with the identification codes for each of the video data blocks.

According to a sixth aspect of the present invention, there is provided a video data recording and reproducing apparatus comprising: a shuffling means for performing shuffling for each of a plurality of video data blocks containing one or more frames of video data; a video data dividing means for dividing each of the plurality of shuffled video data blocks into a predetermined plurality of shuffling blocks; an identification code adding means for adding an identification code indicating the order of each of the plurality of shuffling blocks to each of the shuffling blocks; an order changing means for changing the order of the plurality of shuffling blocks added with the identification codes for each of the video data blocks; and a recording means for recording the plurality of shuffling blocks changed in order in a plurality of recording areas of a predetermined recording medium.

Preferably, the recording means has a plurality of recording heads for recording each of the plurality of shuffling blocks by sequentially accessing each of the plurality of recording areas of the recording medium in a predetermined order.

Also, preferably, the video data recording and reproducing apparatus, further comprises: a reproducing means for reproducing the plurality of shuffling blocks from each of the plurality of recording areas of the recording medium and an order restoring means for restoring the order of the plurality of shuffling blocks to the order before the change based on the identification code contained in each of the reproduced plurality of shuffling blocks.

Preferably, the recording means has a plurality of recording heads for recording each of the plurality of shuffling blocks by sequentially accessing each of the plurality of recording areas of the recording medium in a predetermined order.

BRIEF DESCRIPTION OF THE DRAWINGS

These and other objects and features of the present invention will become clearer from the following description of the preferred embodiments made with reference to the attached drawings, in which:

FIG. 3 is a view of the configuration of a reproduction unit shown in FIG. 1;

FIGS. 7A to 7D are views of the configuration of the recording block unit shown in FIG. 6 wherein a pack circuit shown in FIG. 2 multiplexes the compressed video data and the noncompressed audio data;

FIGS. 15A and 15B are views of the area of the image updated whenever the reproduction head unit scans the VTR tape one time when the reproduction unit shown in FIG. 1 performs 4-speed reproduction;

FIG. 20 is a view illustrating part of an interleave pattern of video data for video data having a 525/60 configuration;

FIG. 21 is a view illustrating part of the interleave pattern of video data for video data having a 525/60 configuration;

FIG. 22 is a view illustrating part of the interleave pattern of video data for video data having a 525/60 configuration;

FIG. 23 is a view illustrating part of the interleave pattern of video data for video data having a 525/60 configuration;

FIG. 24 is a view illustrating part of the interleave pattern of video data for video data having a 625/50 configuration;

FIG. 25 is a view illustrating part of the interleave pattern of video data for video data having a 625/50 configuration;

FIG. 26 is a view illustrating part of the interleave pattern of video data for video data having a 625/50 configuration;

FIG. 27 is a view illustrating part of the interleave pattern of video data for video data having a 625/50 configuration;

FIG. 28 is a view of the interleave pattern of audio data contained in video data having a 525/60 configuration;

FIG. 29 is a view of the interleave pattern of audio data contained in video data having a 625/50 configuration;

FIGS. 30A and 30B are views of helical tracks of a VTR tape which cannot be read from and a part on the picture corresponding to the data which cannot be read for a case of video data having a 525/60 configuration taking as an example a case where trouble occurs in a second recording head among the four recording heads of the recording head unit shown in FIG. 4 when track alternation by an SYNC and ID adding circuit shown in FIG. 2 is not carried out;

FIG. 35 is a view of the video data recorded on the VTR tape by the recording head unit shown in FIG. 2;

DETAILED DESCRIPTION OF THE PREFERRED EMBODIMENTS

Below, an explanation will be made of a first embodiment of a video data recording and reproducing apparatus of the present invention.

In the context of the specification, the term "a video data" means a video data (picture data) and/or an audio data therefor.

Figure 1:
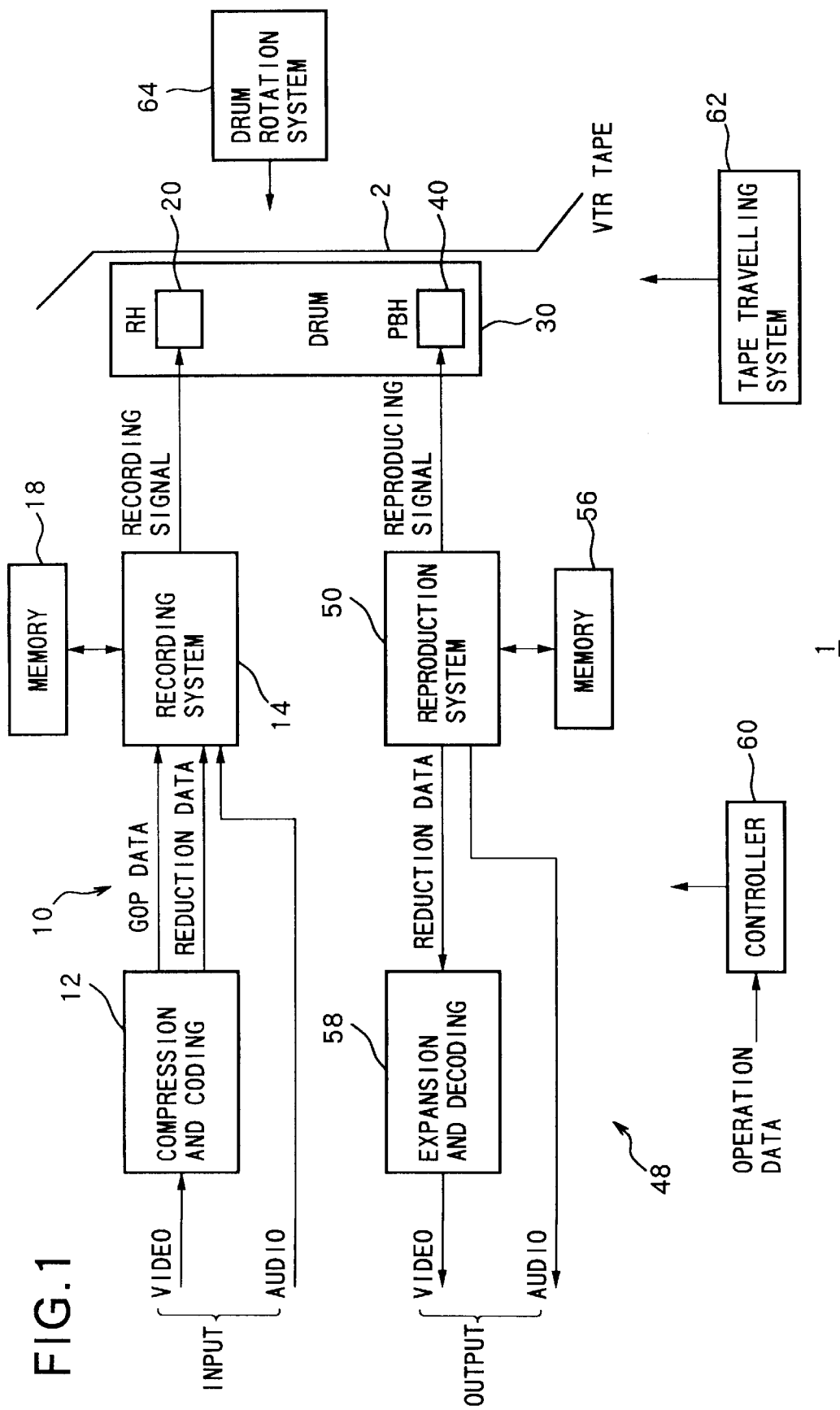
FIG. 1 is a view of the configuration of a video cassette recorder according to the present invention.

FIG. 1 is a view of the configuration of a video cassette recorder (VCR) apparatus 1 as the video data recording and reproducing apparatus according to the present invention.

The VCR apparatus 1 according to the present invention is constituted by a recording unit 10, a recording head unit 20, a reproduction head unit 40, a reproduction unit 48, a control unit 60, a tape travelling system 62, and a drum rotation system 64.

The recording unit 10 is constituted by a compressing and coding system 12, a recording system 14, and a memory circuit 18.

The reproduction unit 48 is constituted by a reproduction system 50, a memory unit 56, and an expansion and decoding system 58.

The VCR apparatus 1 compresses and codes the audio and video data input from an external video processing apparatus (not shown), for example, an audio and video data relaying apparatus and audio and video data editing apparatus, in units of a predetermined number of frames (GOP: group of pictures) by a compression and coding system such as an MPEG (motion picture experts group).

Further, in the same way as the conventional VCR apparatus, the VCR apparatus 1 shuffles the video data, in particular, it shuffles and records it on the VTR tape 2 contained in a cassette half together with the noncompressed audio data so that even in a case where trouble such as head clogging occurs at part of the plurality of recording heads and reproduction heads (recording and reproduction heads), loss will not continuously occur at the same position in the reproduced image.

Further, the reproduction system 50 of the VCR apparatus 1 reads the audio and video data recorded on the VTR tape 2 as mentioned above, reproduces the audio and video data of the time of recording, and outputs this to the external video processing apparatus.

Figure 2:
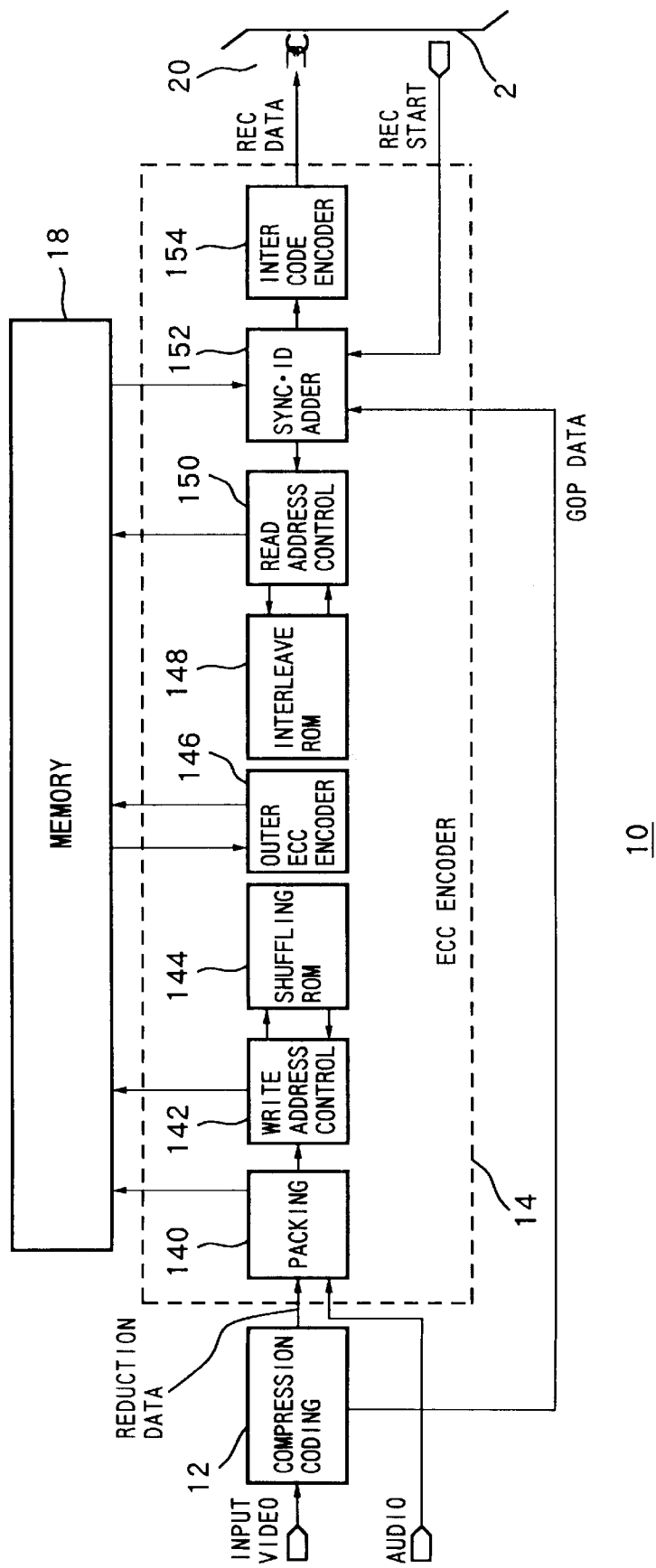
FIG. 2 is a view of the configuration of a recording unit shown in FIG. 1.

FIG. 2 is a view of the configuration of the recording unit 10 shown in FIG. 1. The recording system 14 of the recording unit 10 is constituted by a pack circuit 140, a write address control circuit 142, a shuffling ROM circuit 144, an outer code encoder 146, an interleave ROM circuit 148, a read address control circuit 150, a SYNC and ID adding circuit 150, and an inner code encoder 154.

FIG. 3 is a view of the configuration of the reproduction unit 48 shown in FIG. 1. The reproduction system 50 of the reproduction unit 48 is constituted by an inner code decoder circuit 500, an ID detecting circuit 510, a non-tracking control circuit 512, an outer code decoder circuit 518, a deshuffling ROM circuit 520, a read address control circuit 522, and a depack circuit 524.

The memory unit 56 of the reproduction unit 48 is constituted by a memory circuit 560 and a jog memory circuit 562.

Figure 4A:
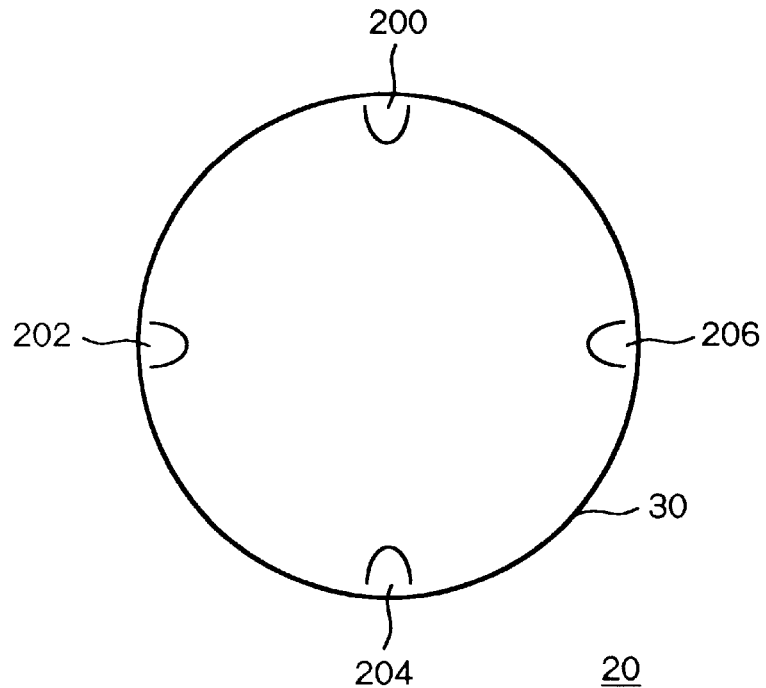
FIGS. 4A and 4B are views illustrating the configuration of Ea recording head unit and reproduction head unit shown in FIG. 1 for a case of four heads.
Figure 4B:
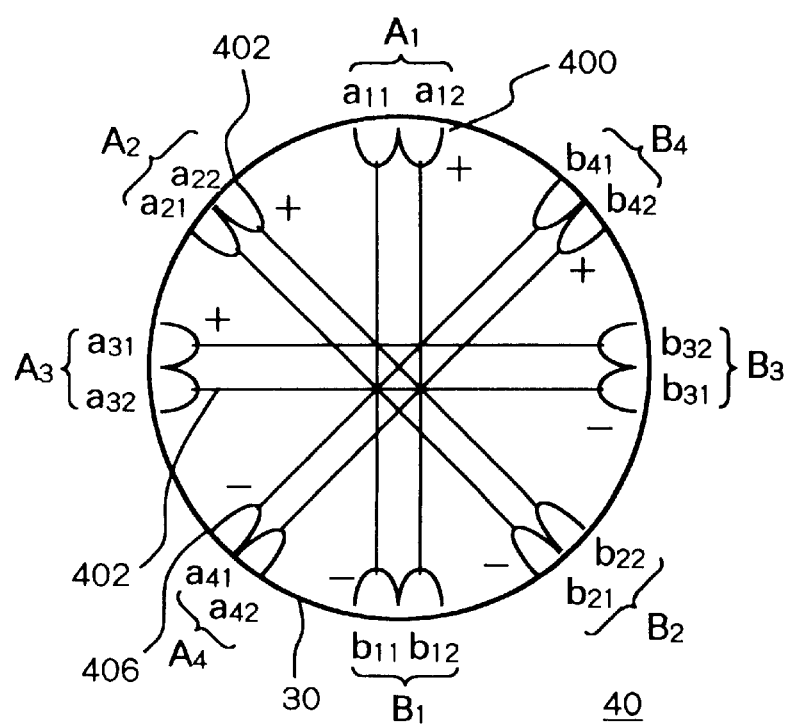

FIGS. 4A and 4B are views illustrating the configuration of the recording head unit 20 and the reproduction head unit 40 shown in FIG. 1 for a case of four heads.

In FIG. 4A, the recording head unit 20 has four recording heads 200, 202, 204, and 206.

In FIG. 4B, the reproduction head unit 40 is constituted by the reproduction heads 400, 402, 404, and 406. Each of the reproduction heads 400, 402, 404, and 406 is constituted by reproduction heads of a positive azimuth angle (positive azimuth reproduction heads) $a_{11}$, $a_{12}$ ($A_1$), $a_{21}$, $a_{22}$ ($A_2$), $a_{31}$, $a_{32}$ ($A_3$), and $a_{41}$, $a_{42}$ ($A_4$) arranged on the tape travelling surface of the rotation drum 30 at a distance of an amount of one helical track of the VTR tape 2 and reproduction heads of a negative azimuth angle (negative azimuth reproduction heads) $b_{11}$, $b_{12}$ ($B_1$), $b_{21}$, $b_{22}$ ($B_2$), $b_{31}$, $b_{32}$ ($B_3$), and $b_{41}$, $b_{42}$ ($B_4$) arranged on the tape travelling surface of the rotation drum 30 at symmetrical positions relative to the positive azimuth reproduction heads with respect to the rotational axis of the rotation drum 30 at a distance of an amount of one helical track of the VTR tape 2 similar to the positive azimuth reproduction heads.

Below, the component parts of the VCR apparatus 1 will be explained.

The control unit 60 controls the component parts of the VCR apparatus 1 according to the operation data input via operation buttons or a terminal provided at the VCR apparatus 1 by the user of the VCR apparatus 1 etc.

The tape travelling system 62 makes the VTR tape 2 travel according to the control of the control unit 60.

The rotation drum system 64 rotates the rotation drum 30 according to the control of the control unit 60 to make the recording head unit 20 and the reproduction head unit 40 arranged on the rotation drum 30 scan the helical tracks of the VTR tape 2.

Below, an explanation will be made of the component parts relating to the operation when the VCR apparatus 1 records the audio and video data on the VTR tape 2.

The recording unit 10 compresses and codes the noncompressed video data (INPUT DATA VIDEO) input from the external video processing apparatus by the compressing and coding system, for example, the MPEG system, and records the same on the VTR tape 2 together with the noncompressed audio signal (INPUT DATA AUDIO).

Figure 5:
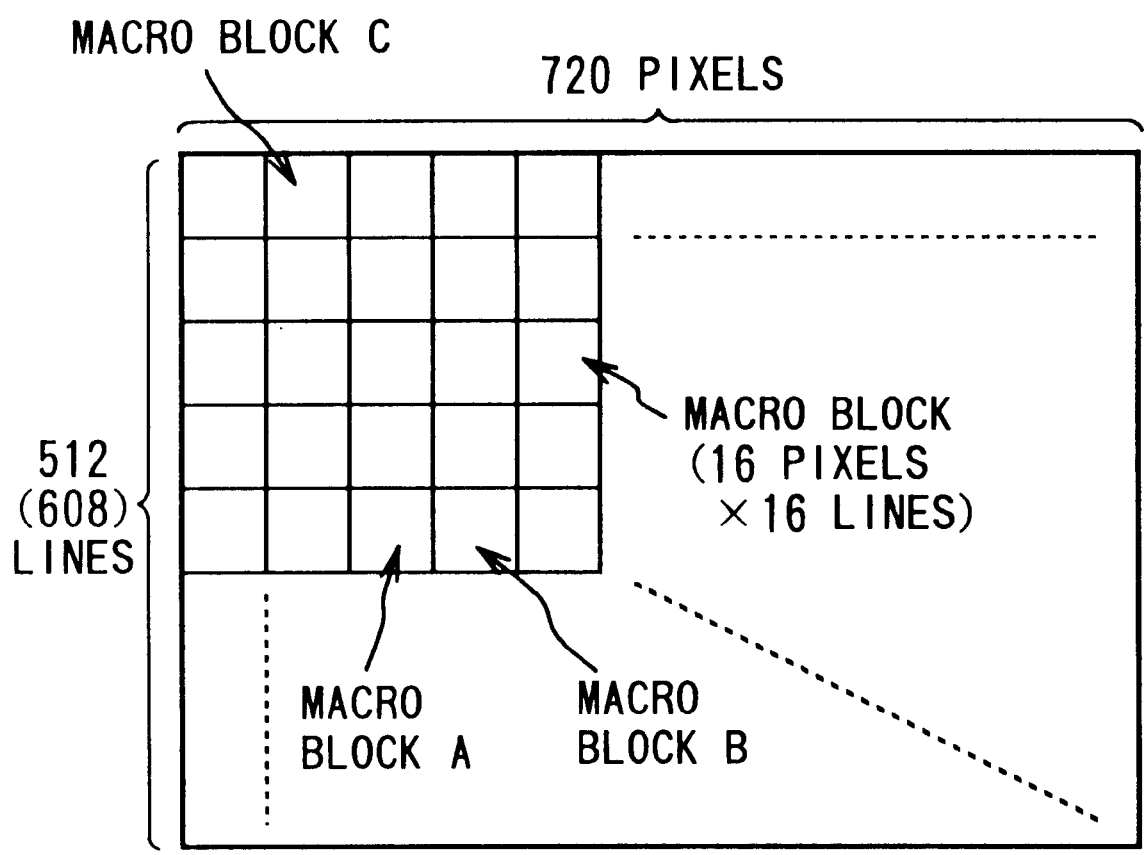
FIG. 5 is a view of a method of dividing the video data when the compressing and coding system shown in FIG. 1 and FIG. 2 compresses and codes noncompressed video data.

FIG. 5 is a view of the method of dividing the video data when the compressing and coding system 12 shown in FIG. 1 and FIG. 2 compresses and codes the noncompressed video data.

In FIG. 5, one picture contains 720 pixels in a scanning line direction, contains 512 lines in a vertical direction in the case of video data having a 525/60 configuration (structure), and contains 608 lines in the vertical direction in the case of video data having a 625/50 configuration. Also, one macroblock consists of 16 pixels×16 lines. Therefore, one picture is divided into 45×32 macroblocks in the case of video data having the 525/60 configuration and is divided into 45×38 macroblocks in the case of video data having the 625/50 configuration.

In the recording unit 10 (FIG. 1), the compressing and coding system 12 divides the input noncompressed video data into macroblocks consisting of 16 pixels×16 lines as shown in FIG. 5 and performs orthogonal transformation such as DCT (discrete cosine transformation), predictive coding, quantization, and variable length coding with respect to these macroblocks to compress and code the same in unit of GOPs.

Figure 6A:
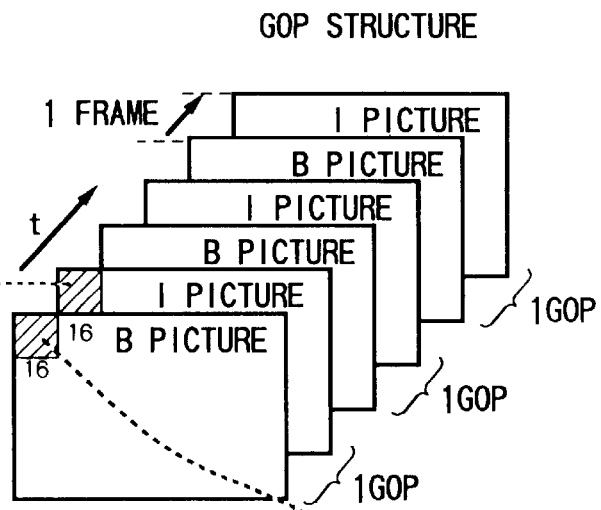
FIGS. 6A to 6C are views of compressed video data output from the compressing and coding system shown in FIG. 1 to a recording system.
Figure 6B:
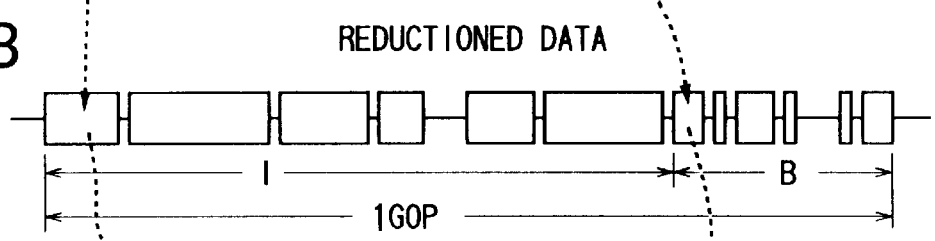
Figure 6C:
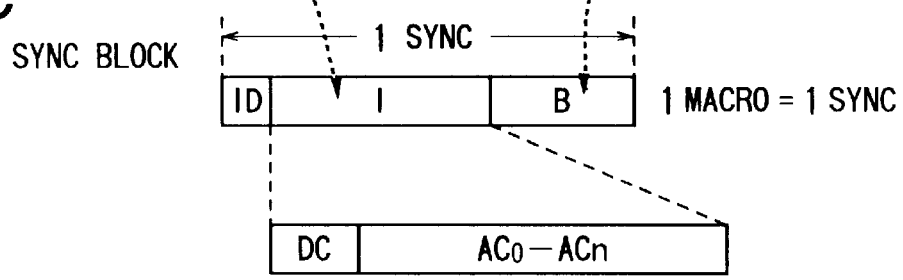

FIGS. 6A to 6C are views of the compressed video data output from the compressing and coding system 12 shown in FIG. 1 to the recording system 14.

In FIG. 6A, a GOP of compressed video data contains for example two frames of compressed video data, that is, an I-frame (intra picture frame) which is compressed and coded closed in the frame and can be expanded and decoded without use of data of another frame and a B-frame (bi-directional picture frame) which is compressed and coded so as to have a correlation with the frames before and after it and is expanded and decoded by using the expanded and decoded data of the frames before and after it.

In FIG. 6B, the compressing and coding system 12 outputs the generated compressed video data to the pack circuit 140 (FIG. 2) of the recording system 14 as a bit train with the I-frame at the head and the B-frame, having a relatively long processing time in the component parts after this, behind it.

The recording system 14 (FIG. 1 and FIG. 2) uses the memory circuit 18 to shuffle the compressed video data, assembles it into a predetermined recording format, adds an error correction code (outer code (OUTER ECC) and inner code (INNER ECC), also referred to together as a product code) to this, and records the same on the helical tracks of the VTR tape 2 via the recording head unit 20.

In the recording system 14, the pack circuit 140 performs processing based on the GOP data input from the compressing and coding system 12, packs in units of recording blocks of a fixed length shown in FIG. 6C and FIGS. 7A to 7D the compressed video data of the variable length input from the compressing and coding system 12, the noncompressed audio data, and the system auxiliary data input from the control unit 60, and stores the same in the memory circuit 18 according to the write addresses generated by the write address control circuit 142. Further, the pack circuit 140 demultiplexes the macroblock position data (macroblock number) which is contained in the compressed video data and indicates the position of each of the macroblocks on the picture (FIG. 5) and outputs the same to the write address control circuit 142.

FIGS. 7A to 7D are views of the configuration of the recording block unit shown in FIG. 6C by which the VCR apparatus 15 shown in FIG. 2 multiplexes the compressed video data and noncompressed audio data.

In FIG. 7A, the recording block unit has a 126-byte configuration comprising, from the head, the areas of a synchronization data area SYNC of 2 bytes, an identification data area ID of 4 bytes, a data area (DATA) of 108 bytes, and an inner code (INNER PARITY) area.

Figure 7C:
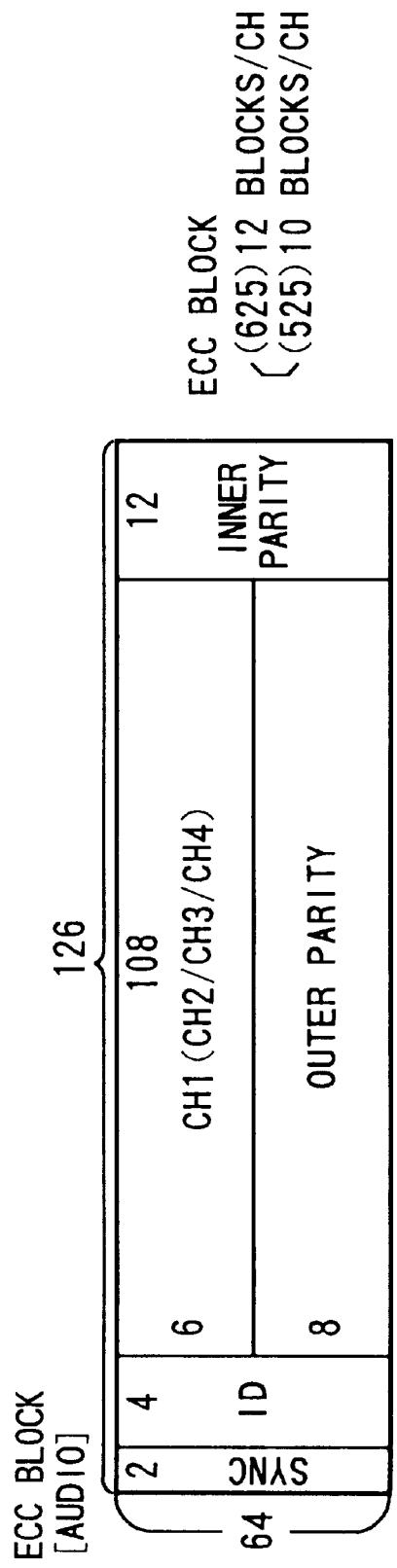

In FIG. 7B, 64 compressed video data (I-frame and B-frame) recording blocks construct one ECC (error correction code) block containing the video data. The ECC block contains 50 recording block units in which compressed video data is multiplexed in the data area (DATA) and 14 recording block units containing the outer code (OUTER PARITY). Note that, where the compressed video data has a 625/50 configuration, one GOP worth of video data is contained in 36 ECC blocks, and where the compressed video data has a 525/60 configuration, one GOP worth of video data is contained in 30 ECC blocks In FIG. 7C, 14 noncompressed audio data recording blocks constitute one ECC block containing the noncompressed audio data corresponding to the one GOP worth of video data. The ECC block contains 6 recording block units in which the noncompressed audio data is multiplexed in the data area (DATA) and 8 recording block units containing the outer code (OUTER PARITY).

Note that, where the compressed video data has a 625/50 configuration, one GOP worth of the audio data is contained in 12 ECC blocks, and where the compressed video data has a 525/60 configuration, one GPO worth of the audio data is contained in 10 ECC blocks. A maximum of 4 channels of audio data (CH1 to CH4) are contained in one GOP. Note that, the noncompressed audio data has a fixed length. The pack circuit 140 equally divides the noncompressed audio data into fixed lengths and packs the same in each recording block unit.

Figure 7D:
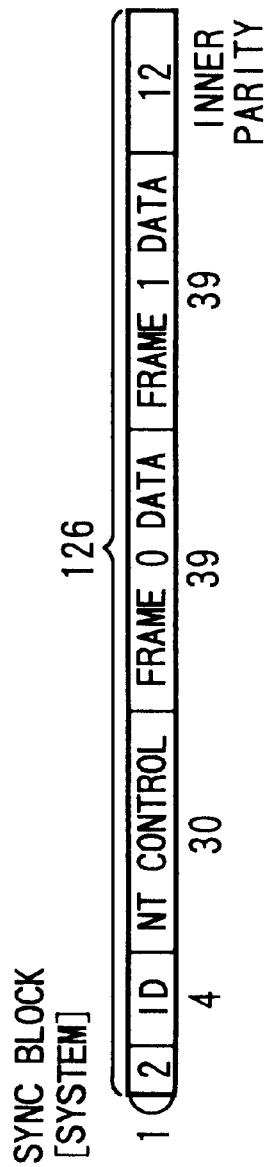

In FIG. 7D, the system auxiliary data generated by the control unit 60 etc. is added for every GOP worth of the audio and video data. As the system auxiliary data, in the data area (DATA), non-tracking control data (NT control) of 30 bytes used at the non-tracking processing (explained later referring to FIG. 3) in the non-tracking control circuit 512 of the reproduction system 50 and two management data (frame 0 data, frame 1 data) each consisting of 39 bytes used for managing the VTR tape 2 by the user are contained for every frame worth of data from the head.

Note that, the system auxiliary data does not have the outer code added to it unlike the recording block unit for the video data and the recording block unit for the audio data and does not adopt the configuration of an ECC block, but to ensure the reliability of the system auxiliary data, for every recording area of a GOP of the audio and video data of the VTR tape 2, 32 system auxiliary data are repeatedly written in the case where the compressed video data has a 625/50 configuration, while 24 system auxiliary data are repeatedly written in the case where the compressed video data has a 525/60 configuration.

Here, further, in contrast to the fact that the compressed video data has a variable length for every macroblock, the recording block unit has a fixed length, therefore the one macroblock worth of compressed video data is not always contained in one recording block unit. There is sometimes leftover space in the recording block unit or one macroblock of the compressed video data sometimes cannot be completely contained in one recording block unit. On the other hand, if data error occurs in the middle of a recording block unit, the data after the part in that recording block where the data error occurs can no longer be reproduced.

Further, the DC component and low frequency component of each macroblock have a great influence upon the quality of the image after reproduction. For this reason, the pack circuit 140 packs the components of the compressed video data of each macroblock in the order of the lower frequency from the head of the data area (DATA) of the ECC block shown in FIG. 7B.

When the components of the compressed video data are contained in the data area (DATA) in the order of the lower frequency and recorded on the VTR tape 2 in this way, so long as the data error is not caused at the head of the data area of the recording block unit, the DC component of the compressed video data having the greatest influence on the quality of the reproduced image can be reproduced even in the worst case.

Accordingly, by packing the compressed video data in the recording block unit by this method, a situation where the image of the macroblock in which a data error is caused cannot be reproduced at all can be prevented and the deterioration of quality of the reproduced image can be suppressed to the lowest extent. Further, when adopting this method, a similar effect is exhibited even in a case where the VCR apparatus 1 reproduces the audio and video data from the VTR tape 2 at a high speed and therefore all of the data of each recording block unit cannot be read.

Figure 8:
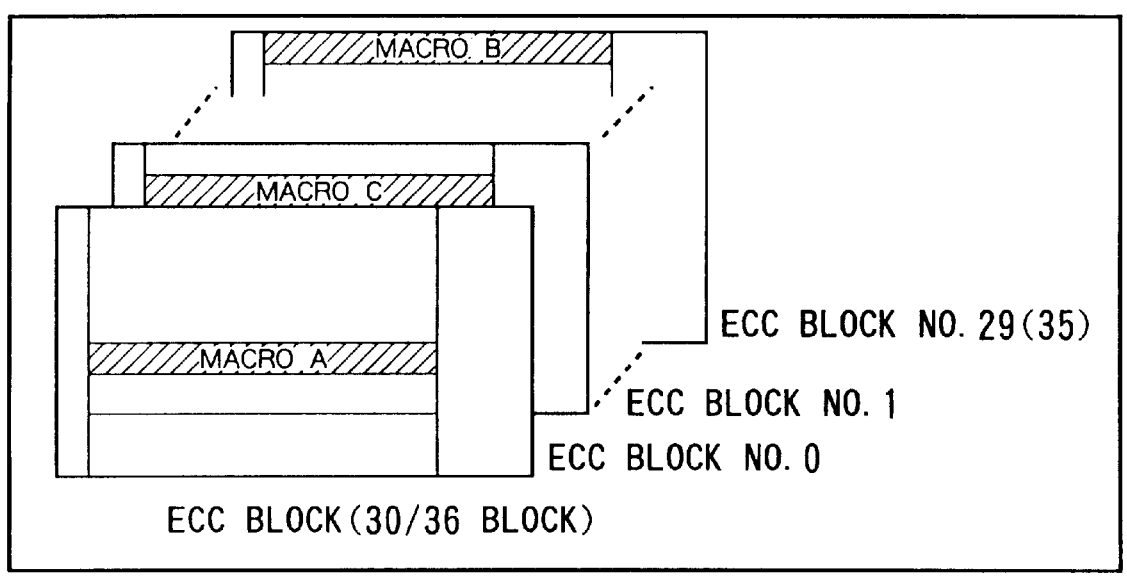
FIG. 8 is a view of an ECC block stored in a memory circuit shown in FIG. 1.
Figure 9:
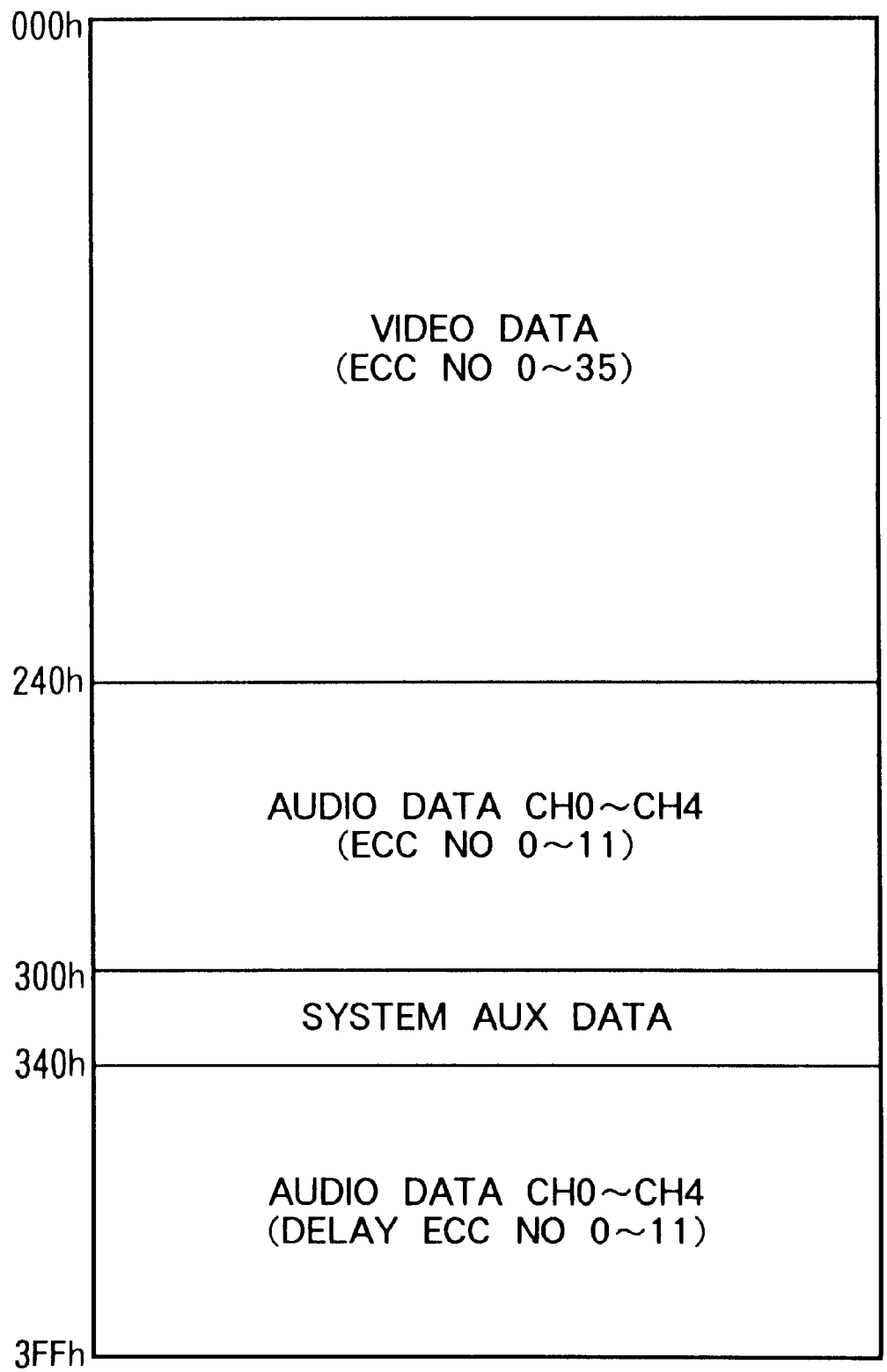
FIG. 9 is a view of a recording area of the memory circuit shown in FIG. 1.

FIG. 8 is a view of the ECC block stored in the memory circuit 18 shown in FIG. 1. FIG. 9 is a view of the recording area of the memory circuit 18 shown in FIG. 1.

The compressed video data packed in the recording block units FIGS. 7A to 7D by the recording system 14 as mentioned above is stored in the memory circuit 18 as shown in FIG. 8 and FIG. 9.

In the memory circuit 18, the video ECC block FIG. 7B is stored, for example, from the 00h (h: hexadecimal expression) address to the 240h address (2 bytes (16 bits) per address) of the memory circuit 18 as shown in FIG. 9.

The audio ECC block (FIG. 7C) is stored from for example the 240h address to the 300h address of the memory circuit 18. Further, the system auxiliary data (FIG. 7D) is stored from for example the 200h address to the 340h address of the memory circuit 18. Further, the 340h address to the 3FFh address of the memory circuit 18 are used as spare areas for audio delay.

The shuffling ROM circuit 144 stores the address (shuffling pattern) of the memory circuit 18 corresponding to each of the recording block units which the pack circuit 140 tries to store in the memory circuit 18 and outputs the same to the write address control circuit 142 according to the control of the write address control circuit 142.

That is, the write address control circuit 142 generates write addresses indicating which number recording block units of the ECC block the recording block units output by the pack circuit 140 will become according to the shuffling pattern input from the shuffling ROM circuit 144 and performs shuffling with respect to the ECC block and the system auxiliary data FIGS. 7A to 7D.

Note that, in the VCR apparatus 1, since the size of the macroblock is for example 16 pixels×16 lines and is a relatively large, a shuffling pattern is stored in the shuffling ROM circuit 144. The pattern is used for shuffling so that mutually adjoining macroblocks are simultaneously recorded on the VTR tape 2 and are recorded to be collected on the VTR tape 2 as well for example whenever the recording head unit 20 scans the VTR tape 2 one time. That is, in the VCR 1 apparatus, at the time of recording, the compressed video data corresponding to a wide area of the picture is recorded by one scan of the recording head unit 20 and the compressed video data corresponding to the wide area of the picture is read from the VTR tape 2 by one scan of the reproduction head unit 40.

Here, an explanation will be made of the shuffling pattern stored in the shuffling ROM circuit 144.

Figure 10:
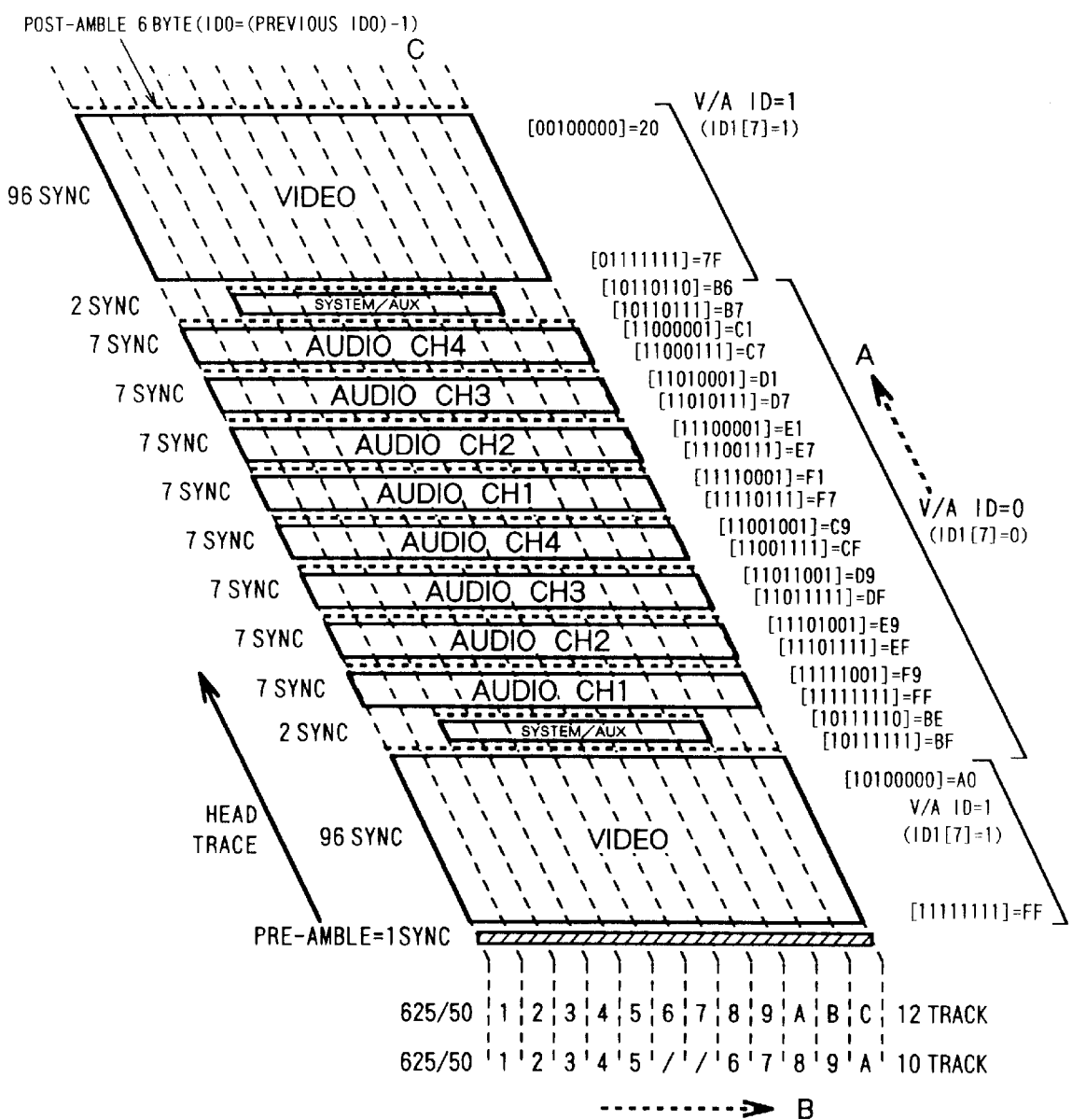
FIG. 10 is a view of a recording format of the video data, the audio data, and the system auxiliary data on a VTR tape shown in FIG. 1.
Figure 11:
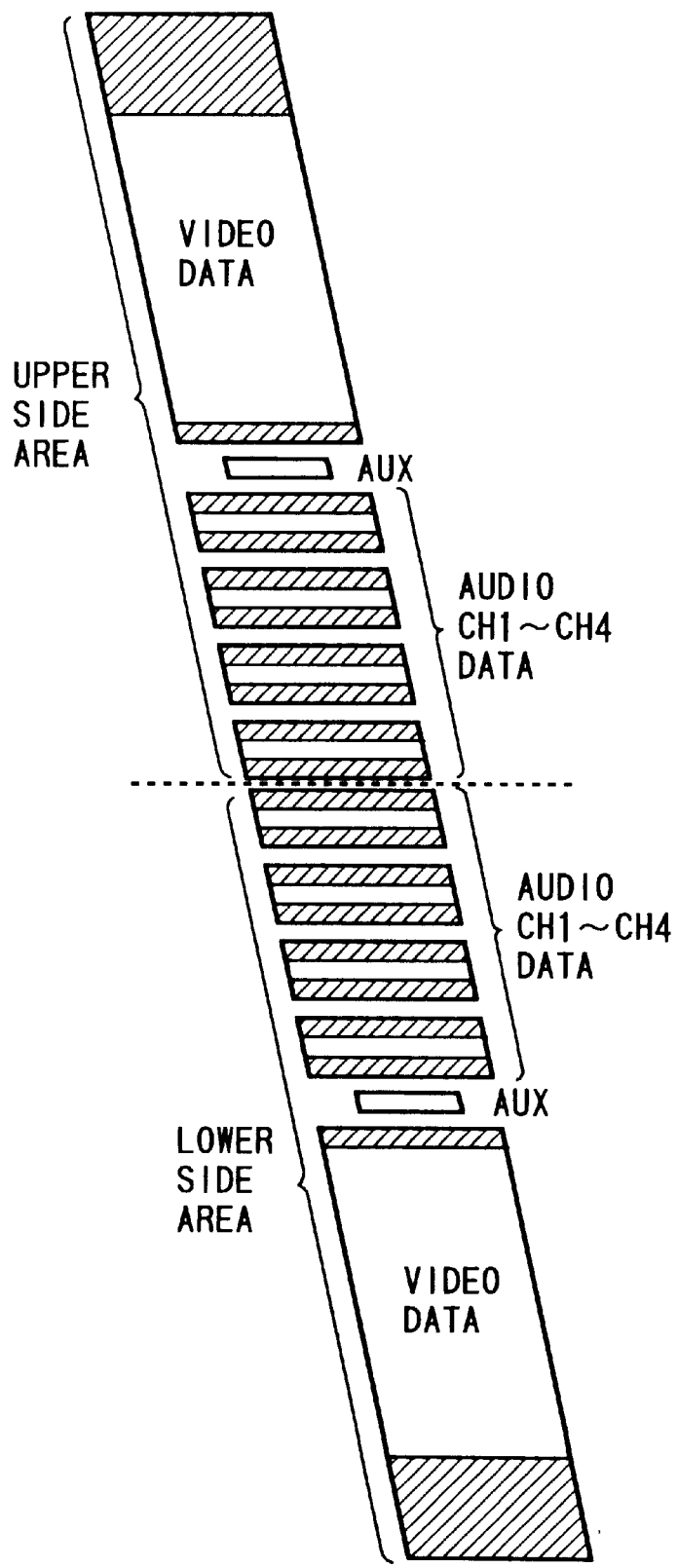
FIG. 11 is a view of the recording position of the video data, the audio data, and the system auxiliary data shown in FIG. 10 on the VTR tape.

FIG. 10 is a view of the recording format of the video data, the audio data, and the system auxiliary data on the VTR tape 2 shown in FIG. 1. FIG. 11 is a view of the recording position on the VTR tape 2 of the video data, the audio data, and the system auxiliary data shown in FIG. 10.

In FIG. 10, one GOP worth of the video data having a 525/60 configuration is recorded on 10 helical tracks of the VTR tape 2, while one GOP worth of the video data having a 625/50 configuration is recorded on 12 helical tracks of the VTR tape 2.

In FIG. 11, one GOP worth of the audio and video data is divided, a half each, to an upper side area and a lower side area of the helical tracks of the VTR tape 2. The audio data is recorded at the center of the VTR tape 2, and the video data is recorded at the two sides of the audio data.

In a VCR apparatus recording noncompressed video data on the VTR tape, the shuffling is carried out for every pixel or, in the in-field compressing and coding system, the shuffling processing is carried out for every relatively small macroblock of 8×4 pixels.

When the shuffling is carried out for every pixel or for every relatively small macroblock, to improve the error correction ability, the shuffling pattern is determined so that the adjoining pixels or macroblock in the same image are recorded at positions on the VTR tape 2 as far away as possible. Even if the shuffling is perform with such a shuffling pattern, since the area of the unit of shuffling on the image is small, even if part of the video data is reproduced by high speed reproduction, due to the characteristics of human vision, the picture appears integrated, therefore the viewer could sufficiently recognize the contents of the image.

However, if shuffling by a shuffling pattern so that large macroblocks of 16×16 pixels are recorded at positions as far away as possible on the VTR tape 2, the time interval between reproduction of the adjoining macroblocks on the image becomes large, the boundaries of the macroblocks are clearly recognized by the viewer, and the image does not appear integrated. Accordingly, in this case, the image becomes like a checkered flag in state divided into individual macroblocks and it becomes very hard for the viewer to view the image.

To overcome such the disadvantage, in the VCR 1, the adjoining macroblocks on the same image are recorded at adjacent positions on the VTR tape 2 so that the video data of a wide area of the same image is recorded whenever the recording head unit 20 scans the VTR tape 2 one time and in addition the adjoining macroblocks on the VTR tape 2 are contained in different ECC blocks so that these macroblocks are corrected for error by respectively different error correction codes (inner codes and outer codes).

On the other hand, as shown in FIG. 10 and FIG. 11, there is the limiting condition that one GOP worth of the audio and video data is recorded on 10 or 12 helical tracks and the sector for recording the video data is divided into two areas by the sector for recording the audio data. In view of this restriction, the system is designed so that where the speed of the multiple speed reproduction is low, video data contained in a large rectangle on the picture is reproduced, while where the speed is high, the video data contained in a small rectangle is reproduced.

Referring to FIG. 12 to FIG. 18, the shuffling pattern stored in the shuffling ROM circuit 144 will be explained in further detail for the case of video data having a 525/60 configuration.

Figure 12:
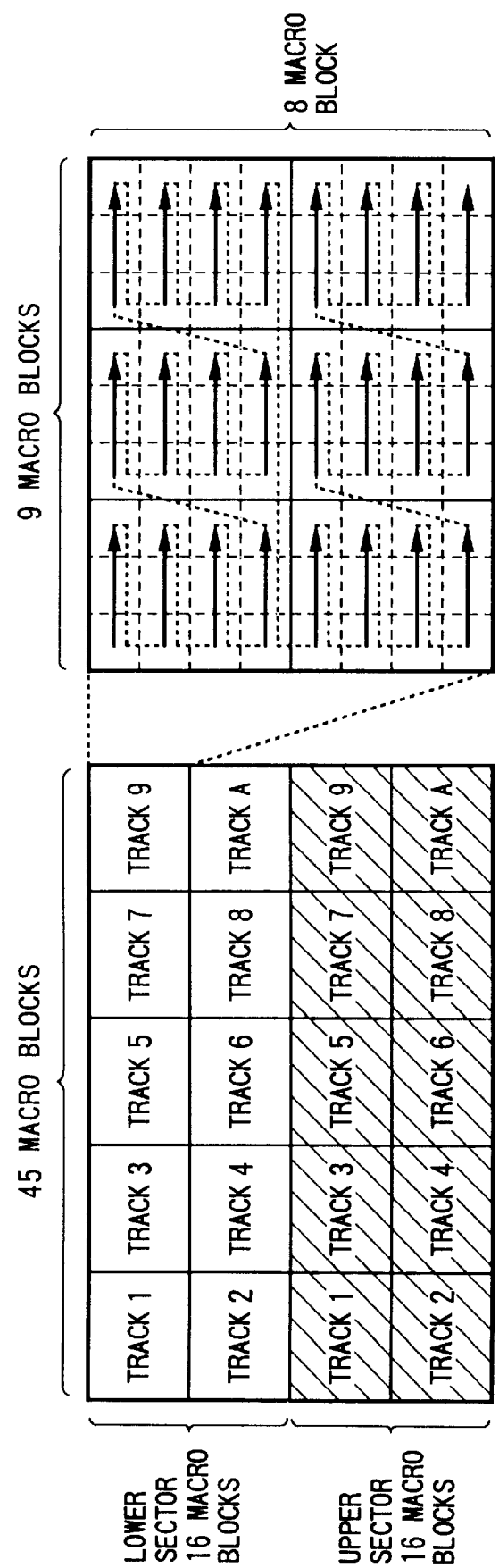
FIG. 12 is a view of a method of dividing a macroblock.

FIG. 12 is a view of the method of dividing a macroblock.

As shown at the left side in FIG. 12, when dividing the video data into macroblocks of 16×16 pixels, 45 macroblocks are formed in the scanning line (horizontal) direction and 32 macroblocks are formed in the vertical direction (43×32 in total). These 45×32 macroblocks are divided into five in the horizontal direction and four in the vertical direction (5×4 in total) and therefore divided into shuffling blocks each containing nine macroblocks in the horizontal direction and eight macroblocks in the vertical direction (9×8 in total).

Among these 20 shuffling blocks, the 10 shuffling blocks which become upper side in the image are assigned to the lower side area (FIG. 11) of the helical tracks 01h to 0Ah of the VTR tape 2, and the 10 shuffling blocks (half-tone picture part) which become the lower side are assigned to the upper side area of the helical tracks 01h to 0Ah of the VTR tape 2.

Each of the thus divided shuffling blocks is further divided into six shuffling units containing three shuffling blocks in the horizontal direction and two shuffling blocks in the vertical direction (3×2 in total) and further divided into 12 units consisting of three shuffling blocks in the horizontal direction and four shuffling blocks in the vertical direction (3×4 in total). The order indicated by the dotted line is added to the macroblocks contained in the shuffling unit. This order indicates the order of the recording and reproduction of the macroblocks contained in each of the shuffling blocks with respect to the VTR tape 2.

Figure 13:
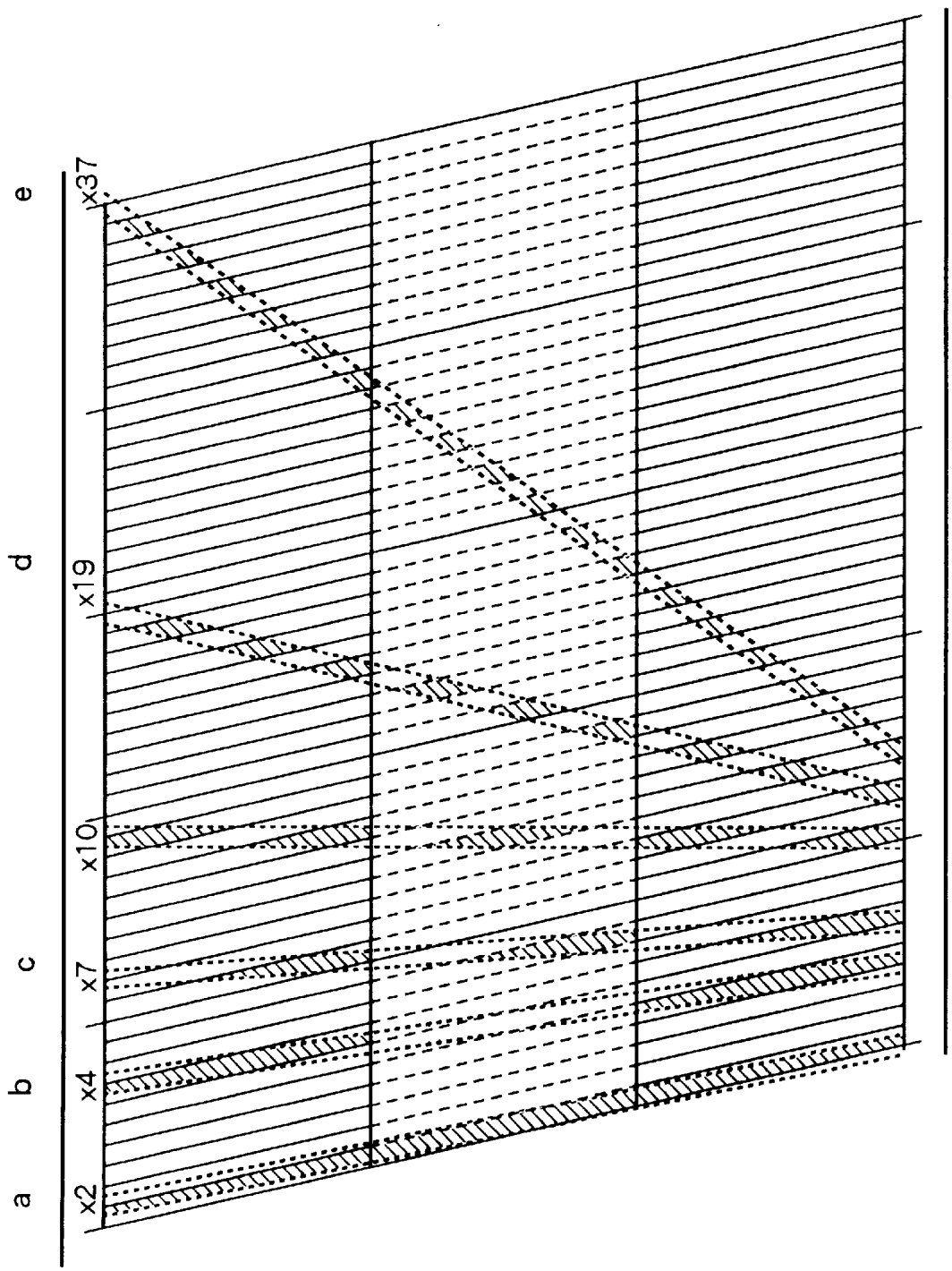
FIG. 13 is a view of the traces of part of the helical tracks from which the reproduction head unit 40 can reproduce 50 percent or more of the data when the reproduction unit shown in FIG. 3 performs 2-speed reproduction, 4-speed reproduction, 7-speed reproduction, 19-speed reproduction, and 37-speed reproduction.

FIG. 13 is a view of traces of the part of helical tracks (FIG. 4B) from which the reproduction head unit 40 can reproduce 50 percent or more of the data when the reproduction unit 48 performs the 2 times speed reproduction which is a double speed of the normal speed, 4 times speed reproduction, 7 times speed reproduction, 19 times speed reproduction, and 37 times speed reproduction. Note that, in FIG. 13, the trace a to the trace e are traces of one of the reproduction heads 400, 402, 404, and 406 (FIG. 4B) of the cases of 2 times speed reproduction, 4 times speed reproduction, 7 times speed reproduction, 19 times speed reproduction and 37 times speed reproduction, respectively.

FIG. 14 to FIG. 18 are views of the area of the image updated whenever the reproduction head unit 40 scans the VTR tape 2 one time when the reproduction head unit 48 shown in FIG. 1 performs 2 times speed reproduction, 4 times speed reproduction, 7 times speed reproduction, 19 times speed reproduction, and 37 times speed reproduction, respectively.

As will be explained later in the explanation of the non-tracking control circuit 512 of the reproduction unit 48, the reproduction unit 48 reproduces the audio and video data from the VTR tape 2 by the non-tracking system, therefore it can reproduce the audio and video data recorded in parts scanned by any one of the reproduction heads 400, 402, 404, and 406 of the helical tracks.

As indicated by the trace a of FIG. 13, the reproduction unit 48 of the VCR 1 can reproduce the audio and video data both from the upper side area and the lower side area of the scanned helical tracks at the time of 2 times speed reproduction and 4 times speed reproduction.

Figure 14A:
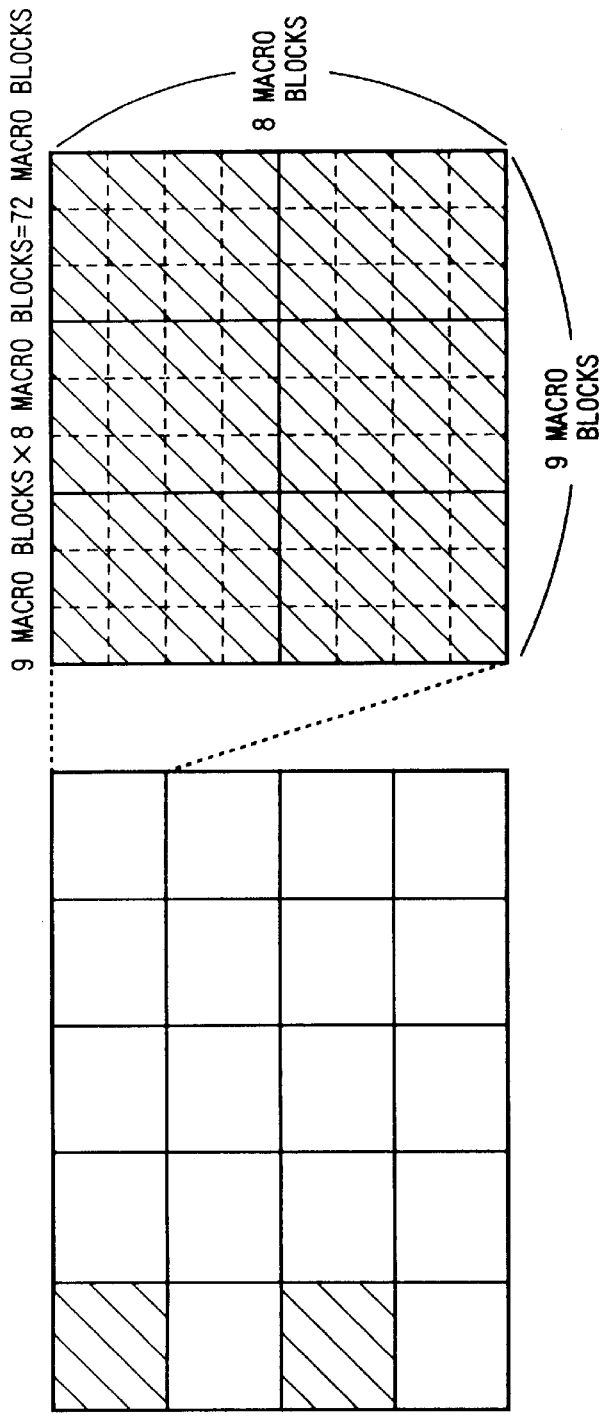
FIGS. 14A and 14B are views of the area of the image updated whenever a reproduction head unit scans the VTR tape one time when the reproduction unit shown in FIG. 1 performs 2-speed reproduction.

When the reproduction head unit 40 reads the shuffled audio and video data from the scanned helical tracks as shown in FIG. 12, for example, the read video data corresponds to the rectangular parts of two shuffling blocks of the half-tone picture in FIG. 14A and FIG. 15A and therefore it is possible to read successive video data of a wide area on the image.

Figure 14B:
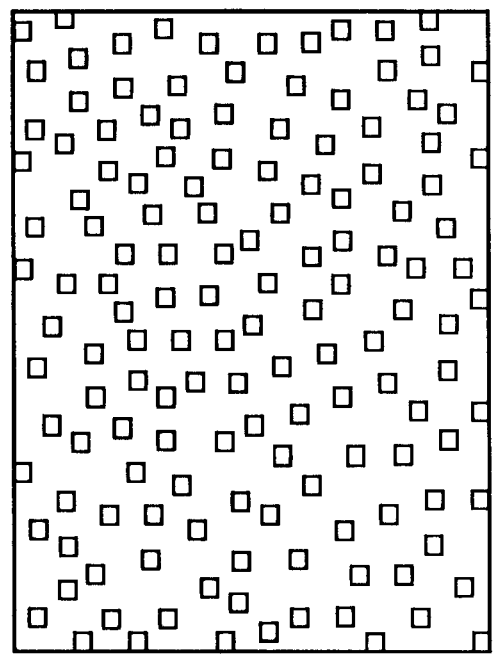

On the other hand, when the reproduction head unit 40 reproduces audio and video data shuffled at random similar to the conventional case from the helical tracks, as shown in FIG. 14B and FIG. 15B, video data which is discontinuous on the picture and corresponds to small rectangular parts each having a small area are read out and therefore an unnatural feeling will be given to the viewer as mentioned above.

Figure 16A:
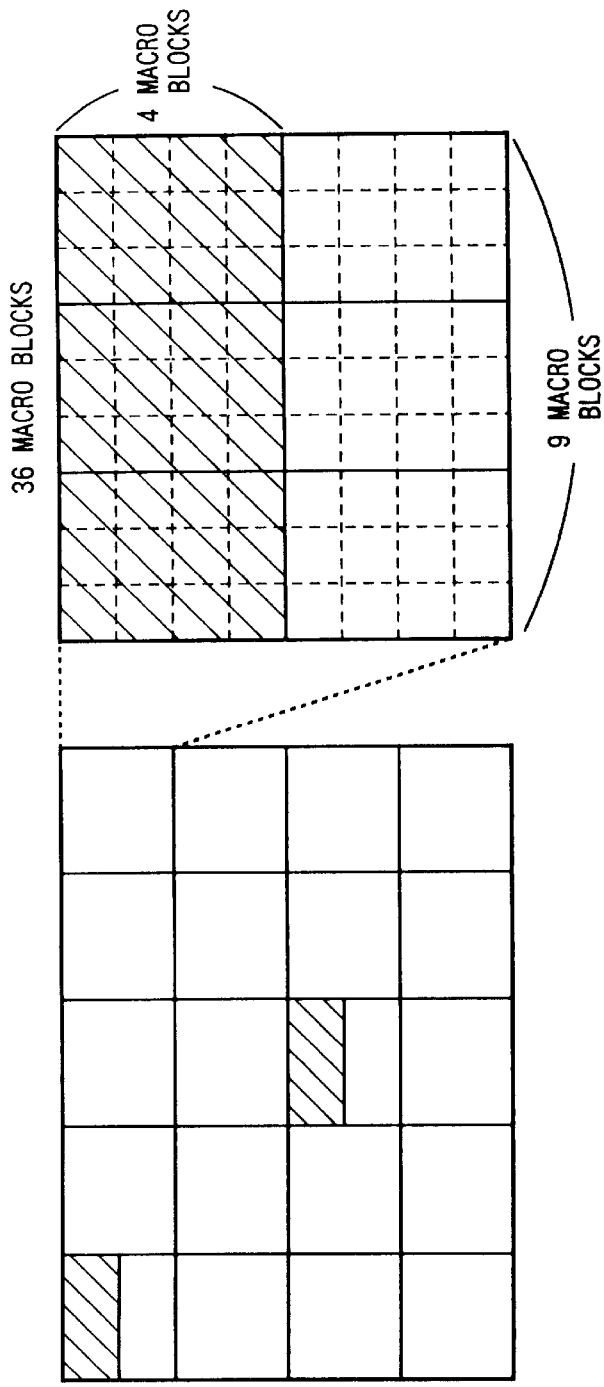
FIGS. 16A and 16B are views of the area of the image updated whenever the reproduction head unit scans the VTR tape one time when the reproduction unit shown in FIG. 1 performs 7-speed reproduction.
Figure 16B:
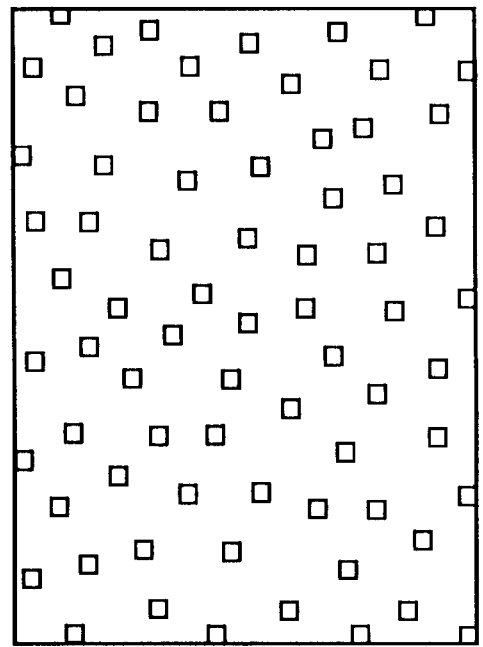

When the VCR apparatus 1 operates as 7 times speed reproduction, and the reproduction unit 48 of the VCR apparatus 1 reads audio and video data which was shuffled as shown in FIG. 12 from the part of the trace c of FIG. 13, for example, the read video data can be reproduced as the video data corresponding to two rectangular areas each containing 9×4 macroblocks of the half-tone picture in FIG. 16A. On the other hand, when the reproduction head unit 40 reproduces audio and video data which was shuffled at random from the helical tracks, the discontinuous video data on the picture corresponding to the rectangular parts each having a small area will be read as shown in FIG. 16B.

Figure 17A:
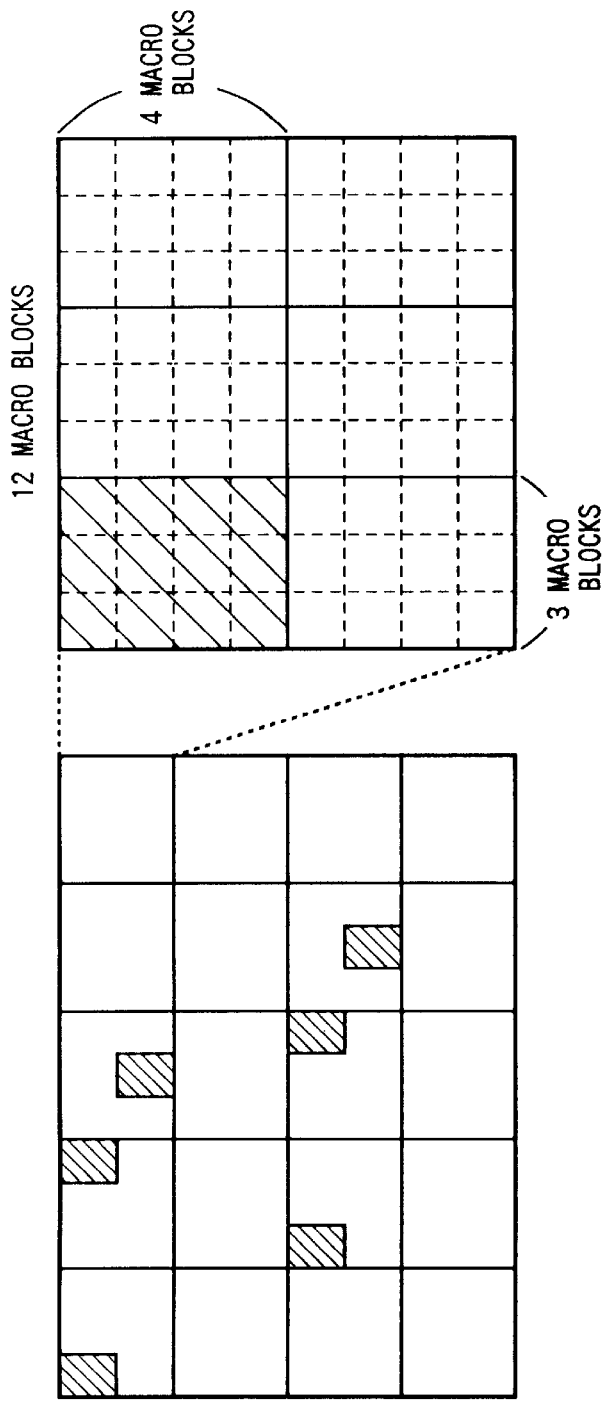
FIGS. 17A and 17B are views of the area of the image updated whenever the reproduction head unit scans the VTR tape one time when the reproduction unit shown in FIG. 1 performs 19-speed reproduction.
Figure 17B:
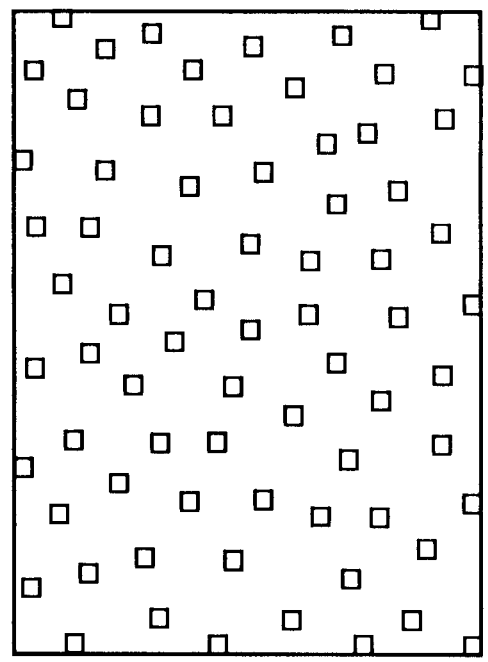

When VCR apparatus 1 operates as 19 times speed reproduction and the reproduction unit 48 of the VCR 1 reads the audio and video data which was shuffled as shown in FIG. 12 from the part of the trace d of FIG. 13, for example, the read video data can be reproduces as the video data corresponding to six rectangular areas each containing 3×4 macroblocks of the half-tone picture in FIG. 17A. On the other hand, when the reproduction head unit 40 reproduces the audio and video data shuffled at random from the helical tracks, the discontinuous video data on the picture corresponding to the rectangular parts each having a small area will be read as shown in FIG. 17B.

Figure 18A:
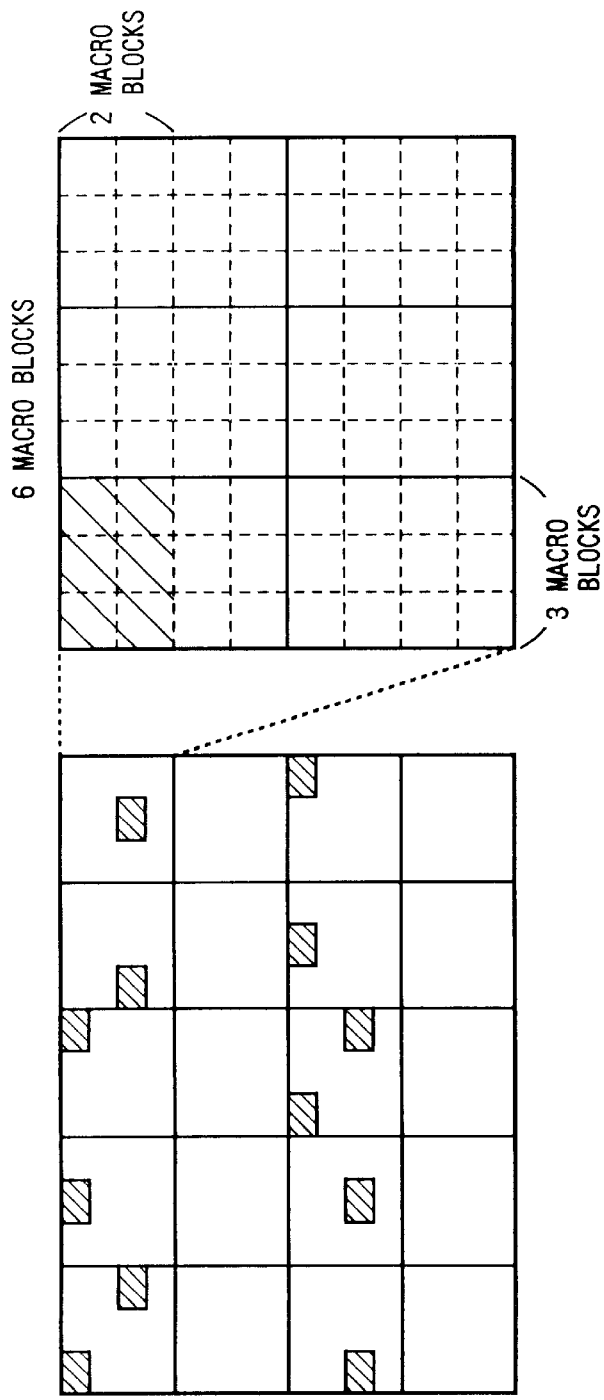
FIGS. 18A and 18B are views of the area of the image updated whenever the reproduction head unit scans the VTR tape one time when the reproduction unit shown in FIG. 1 performs 37-speed reproduction.
Figure 18B:
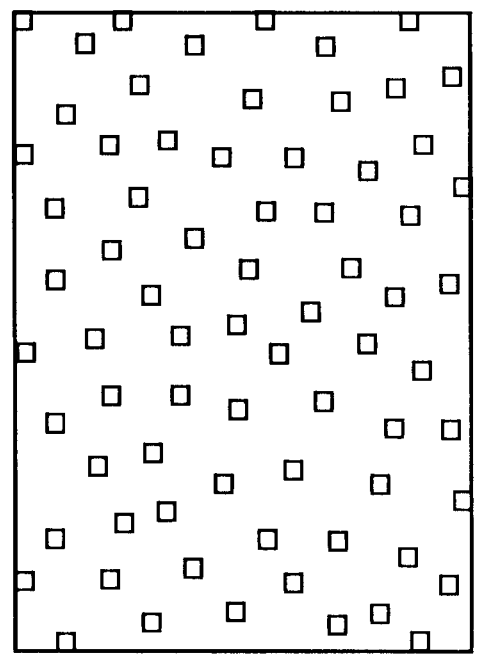

When the VCR apparatus 1 operates as 37 times speed reproduction and the reproduction unit 48 of the VCR apparatus 1 reads the audio and video data which was shuffled as shown in FIG. 12 from the part of the trace e of FIG. 13, for example, the read video data can be reproduced the video data corresponding to 12 rectangular areas each containing 3×2 macroblocks of the half-tone picture in FIG. 18A. On the other hand, when the reproduction head unit 40 reproduces the audio and video data shuffled at random from the helical tracks, the discontinuous video data on the picture corresponding to the rectangular parts each having a small area will be read as shown in FIG. 18B.

As explained above referring to FIG. 12 to FIG. 18, when the shuffling pattern shown in FIG. 12 is used, whenever the reproduction head unit 40 scans the helical tracks of the VTR tape 2 one time, video data corresponding to a wide rectangular area in which the image is continuous can be read out and it becomes easy for the view to recognize the contents of the image at the time of high speed reproduction.

The write address control circuit 142 reads the shuffling pattern from the shuffling ROM circuit 144 based on the macroblock position data input from the pack circuit 140, generates the addresses of the memory circuit 18 at which, the recording block units which the pack circuit 140 tries to store in the memory circuit 18 are to be written according to the read out shuffling pattern, and performs the shuffling.

Note that while the explanation was made of video data having a 525/60 configuration, the shuffling pattern shown in FIG. 12 can be applied even when video data having a 625/50 configuration is shuffled.

Further, the SYNC and ID adding circuit 152 (FIG. 2) performs the interleaving for the audio and video data which was shuffled and given the outer code and performs the track alternation as will be mentioned later. That is, the recording block units are assigned to helical tracks of the actual VTR tape 2 by the shuffling by the write address control circuit 142 and the interleaving and track alternation by the SYNC and ID adding circuit 152.

The outer code encoder 146 (FIG. 2) reads the audio and video data from the video ECC blocks and audio ECC blocks (FIGS. 7A to 7D) recorded in the memory circuit 18 and generates the outer codes from the compressed video data or audio data contained in each data area (DATA). Further, the outer code encoder 146 stores the generated outer codes together with the audio and video data at addresses corresponding to the data area (DATA) and outer code area of the memory circuit 18.

The SYNC and ID adding circuit 152 is activated by the recording start signal (REC START) input from the control unit 60 and generates the synchronization data SYNC. Further, the SYNC and ID adding circuit 152 generates the identification data ID and outputs the same to the SYNC and ID adding circuit 150. Further, the SYNC and ID adding circuit 152 performs the interleaving and track alternation mentioned later referring to FIG. 30 to FIG. 34.

Here, an explanation will be made of the identification data ID generated by the SYNC and ID adding circuit 152.

Figures 19A, 19B, 19C:
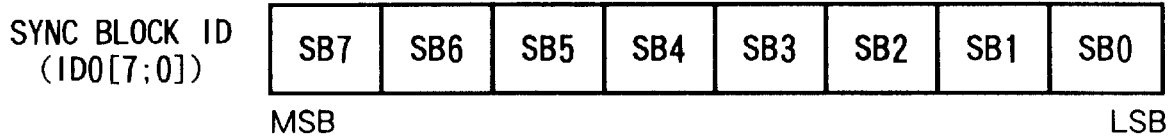
FIGS. 19A to 19C are view of contents of a synchronization data ID shown in FIG. 9.

FIGS. 19A to 19C are views of the contents of the identification data ID shown in FIG. 9.

As shown in FIG. 10, one GOP worth of the ECC block and system auxiliary data (SYSTEM AUX) recorded in the memory circuit 18 is recorded on 10 helical tracks of the VTR tape 2 in the case of video data having a 525/60 configuration and is recorded on 12 helical tracks of the VTR tape 2 in the case of video data of a 625/50 configuration.

In the identification data ID, a synchronization block (Sync Block) ID and track ID are contained (hereinafter, they will be also simply referred to as the identification data ID together).

To each of the recording block units of the ECC blocks and system auxiliary data, as indicated by the arrow A in FIG. 10, a synchronization block ID of 8 bits shown in FIG. 19A is added, and as indicated by the arrow B in FIG. 10, a track ID is added within a range of 01h to 0Ch with respect to the audio and video data having a 625/50 format while a track ID is added within a range of from 01h to 0Ah with respect to the audio and video data of a 525/60 format.

As shown in FIG. 19B, the sixth bit of the identification data ID of the ECC block (FIG. 7C) for the audio data is used for identification of the system auxiliary data and the audio (AUDIO) data, the fifth and fourth bits are used for the identification of the channels (CH1 to CH4) of the audio data, and the third bit is used for the identification of the upper side area and the lower side area of the helical tracks.

Further, as shown in FIG. 19C, the seventh bit of the identification data ID of the video data ECC block is used for the identification of the upper and lower sectors.

The interleave ROM circuit 148 (FIG. 2) stores the interleave pattern indicating which number recording block units of which ECC block (FIGS. 7A to 7D) the identification data ID correspond and outputs the interleave pattern stored according to the control of the read address control circuit 150 to the read address control circuit 150.

The read address control circuit 150 controls the interleave ROM circuit 148 to read the interleave pattern and generates the reading address of the memory circuit 18 at which the recording block unit of the ECC block corresponding to the input identification data ID is recorded based on the interleave pattern.

The memory circuit 18 outputs the recording block unit (ECC block) stored at the reading address generated by the read address control circuit 150 to the SYNC and ID adding circuit 152.

The SYNC and ID adding circuit 152 divides the input recording block units (ECC blocks) corresponding to the helical tracks of the VTR tape 2, adds the identification data ID, performs the interleaving, further performs the track alternation, and outputs the resultant data to the inner code encoder 154.

Here, referring to FIG. 20 to FIG. 29, a detailed explanation will be made of the interleaving by the SYNC and ID adding circuit 152.

Note that, as mentioned above, only after the shuffling by the write address control circuit 142 and the interleaving and the track alternation by the SYNC and ID adding circuit 152 are the recording block units (synchronization blocks: SYNC Block; FIG. 6) assigned to the helical tracks of the VTR tape 2.

The interleaving in the SYNC and ID adding circuit 152 is processing for uniformly assigning the recording block units (synchronization blocks) contained in the 30 (in the case of a 525/60 configuration) or the 36 (in the case of a 625/50 configuration) video data ECC blocks per GOP and the recording block units contained in the 10 (in the case of a 525/60 configuration) or the 12 (in the case of 625/50 configuration) audio data ECC blocks per GOP to 10 (in the case of a 525/60 configuration) or 12 (in the case of a 625/50 configuration) helical tracks of VTR tape 2.

One object of the interleaving by the SYNC and ID adding circuit 152 is the improvement of the quality of the reproduced image by dispersing the data error in a plurality of ECC blocks and thereby suppressing the error within a range not exceeding the error correction ability in each ECC block even where a burst-like data error is caused error is caused at the time of reproduction.

Further, another object of the interleaving by the SYNC and ID adding circuit 152 is to avoid the problem of loss of the image concentrating at a narrow range of the image making interpolation impossible or the loss of the picture becoming remarkable even if data error is caused in a plurality of adjoining macroblocks on the VTR tape 2 by packing the adjoining macroblocks on the VTR tape 2 in respectively different ECC blocks and thereby enabling error correction by respectively different error correction codes since the adjoining macroblocks in the image are recorded at adjacent positions also on the VTR tape 2 due to the shuffling by the write address control circuit 142.

As shown in FIG. 11, the outer codes (outer parity) of each ECC block are arranged at the two sides of each recording block unit (synchronization block) of the audio and video data. By arranging them in this way, where a tape skew occurs on the VTR tape 2, even in a case where the VTR tape 2 and the reproduction heads 400, 402, 404, and 406 (FIG. 4) do not sufficiently contact each other, the audio and video data can be read as much as possible. Further, by arranging the outer codes in this way, when editing audio data of for example a first channel (CH1), even in a case where the data of the other sector is erroneously overwritten, there is the advantage that the probability of loss of only the outer code is large, and the possibility that the main data is saved is high.

A concrete interleave pattern will be illustrated in FIG. 20 to FIG. 29.

FIG. 20 to FIG. 23 are views illustrating the interleave pattern of video data for video data having a 525/60 configuration. Note that parts of the interleave pattern are shown in FIG. 20 to FIG. 23. The numerical values in the drawings show the synchronization block IDs (SYNC BLOCK ID) and track IDs added to the recording block units as will be mentioned later in the explanation of the SYNC and ID adding circuit 152, and the numbers of the ECC blocks (ECC Block ID) and the synchronization block numbers corresponding to the track IDs and the synchronization block IDs.

FIG. 24 to FIG. 27 are views illustrating the interleave pattern of video data for video data having 625/50 configuration. Note that parts of the interleave pattern are shown in FIG. 24 to FIG. 27. The numerical values show the synchronization block IDs (SYNC BLOCK ID) and track IDs added to the recording block units as will be mentioned later in the explanation of the SYNC and ID adding circuit 152, and the numbers of the ECC blocks (ECC Block ID) and the synchronization block numbers corresponding to the track IDs and the synchronization block IDs.

FIG. 28 and FIG. 29 are views of the interleave pattern of the audio data for the case of video data having a 525/60 configuration and video data having a 625/50 configuration, respectively.

The interleave patterns shown in FIG. 22 to FIG. 29 are stored in the interleave ROM circuit 148.

Here, the track alternation by the SYNC and ID adding circuit 152 will be explained in detail referring to FIG. 30 to FIG. 34.

FIGS. 30A and 30B and FIGS. 31A and 31B are views of the helical tracks of the VTR tape 2 which cannot be read from and the parts on the picture corresponding to the data which cannot be read taking as an example a case where trouble occurs in the second recording head 202 among the four recording heads 200, 202, 204, and 206 of the recording head unit 20 shown in FIG. 4A when the track alternation by the SYNC and ID adding circuit 152 shown in FIG. 2 is not carried out.

Note that, FIGS. 30A and 30B are views show the case of audio and video data having a 525/60 configuration; and FIG. 31 the case of audio and video data having a 625/50 configuration. The correspondence between the tracks and the parts on the picture is simplified for the convenience of the illustration.

As shown in FIG. 30A, the helical tracks of the track numbers (Track Nos.) 01h, 05h, 09h, . . . correspond to the recording head 200, the helical tracks of the track numbers 02h, 06h, 0Ah, . . . correspond to the recording head 202, the helical tracks of the track numbers 03h, 07h, 01h, . . . correspond to the recording head 204, and the helical tracks of the track numbers 04h, 08h, 02h, . . . correspond to the recording head 206.

Here, when trouble such as head clogging occurs in the recording head 202 among the four recording heads 200, 202, 204, and 206 of the recording head unit 20 and the audio and video data can no longer be written on the VTR tape 2 by the recording head 202, the audio and video data (track ID=02h, 06h, 0Ah . . . ) of the helical tracks scanned by the recording head 202 can no longer be recorded. Here, as mentioned above, the write address control circuit 142 and the shuffling ROM circuit 144 of the VCR 1 perform the shuffling with respect to the compressed video data with a shuffling pattern so that the adjoining macroblocks on the picture collect together. The audio and video data (track ID=02h, 06h, 0Ah . . . ) correspond to for example the parts 02h, 06h, 0Ah . . . on the picture shown in FIG. 30(B). Accordingly, as shown in FIG. 30(B), the audio and video data corresponding to the parts 02h, 06h, and 0Ah on the picture will not be recorded on the VTR tape 2 when trouble occurs in the recording head 202. In next GOP, however, although the video data corresponding to the parts 04h and 08h on the picture cannot be recorded, the recording data corresponding to the parts 02h, 06h, and 0Ah on the picture are normally recorded by the recording head 206.

Figure 31A:
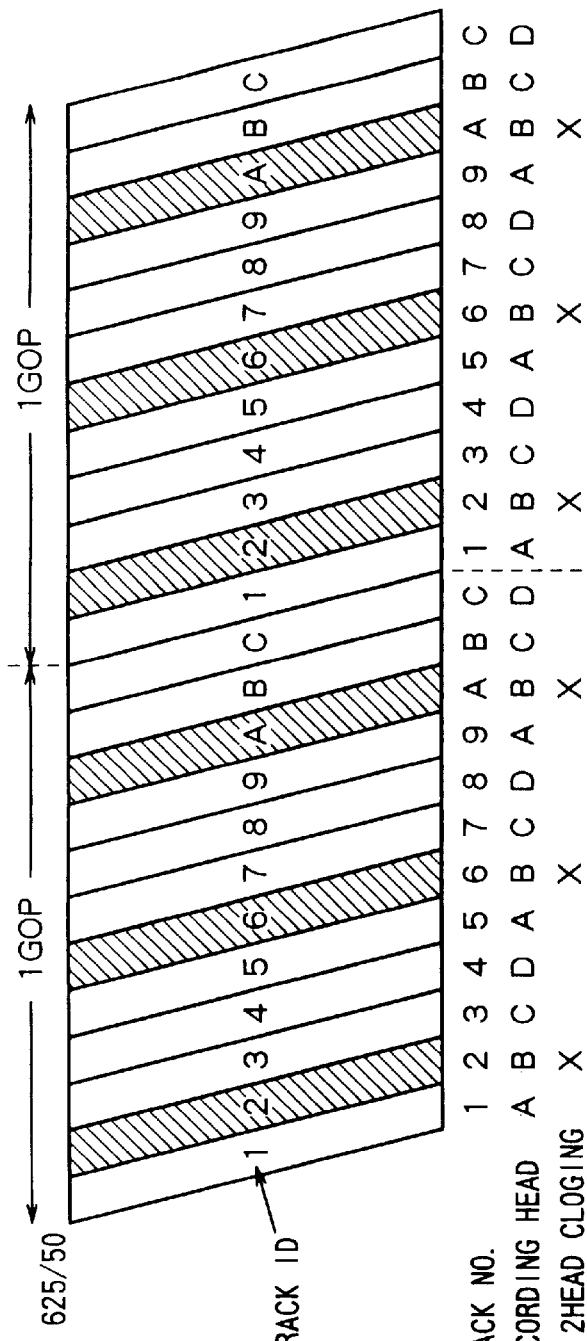
FIGS. 31A and 31B are views of helical tracks of a VTR tape which cannot be read from and a part on the picture corresponding to the data which cannot be read for a case of video data having a 625/50 configuration taking as an example a case where trouble occurs in a second recording head among the four recording heads of the recording head unit shown in FIG. 4 when track alternation by the SYNC and ID adding circuit shown in FIG. 2 is not carried out.
Figure 31B:
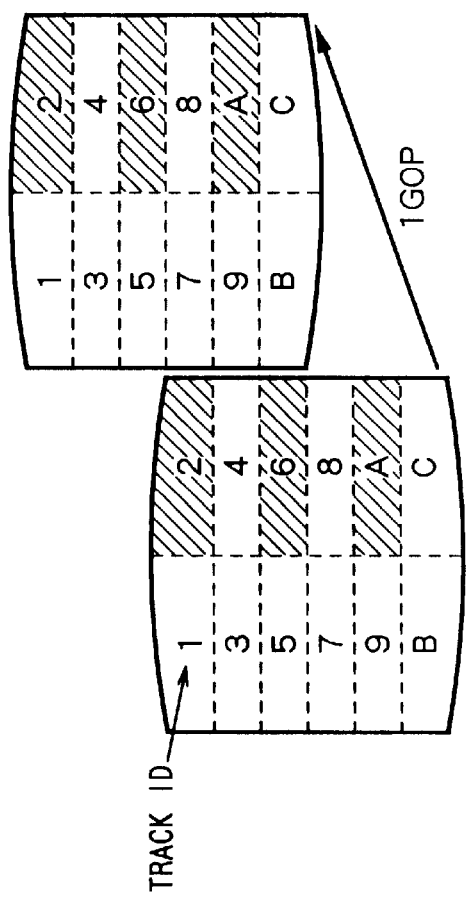

As shown in FIGS. 31A and 31B, as the effect of the trouble of the recording head 202, for audio and video data having a 626/50 configuration, since one GOP worth of video data is recorded on 12 helical tracks, so far as trouble occurs in the recording head 202, the video data corresponding to the parts 02h, 06h, and 0Ah on the picture will not be recorded on the VTR tape 2.

Figure 32A:
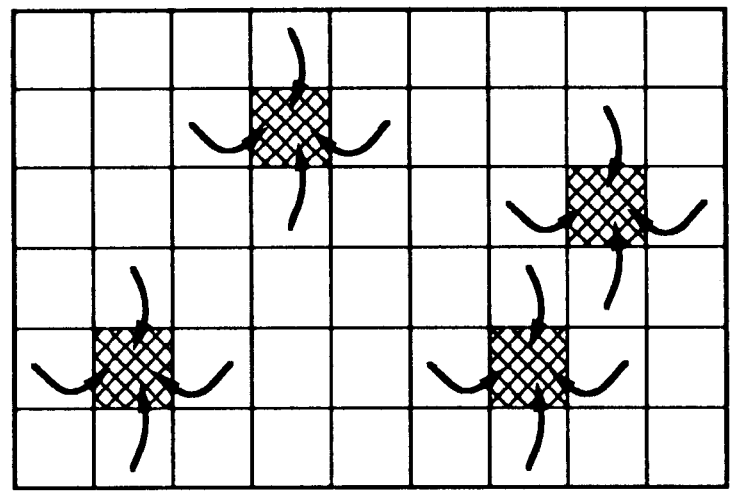
FIGS. 32A to 32C are views of a method of interpolating lost video data.
Figure 32B:
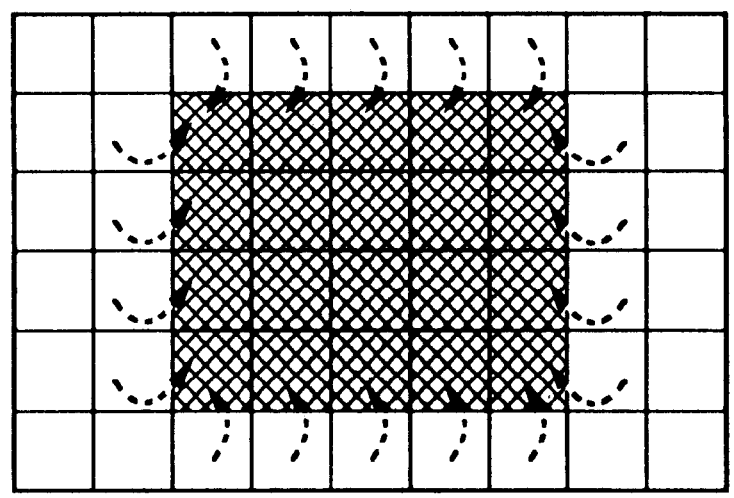
Figure 32C:
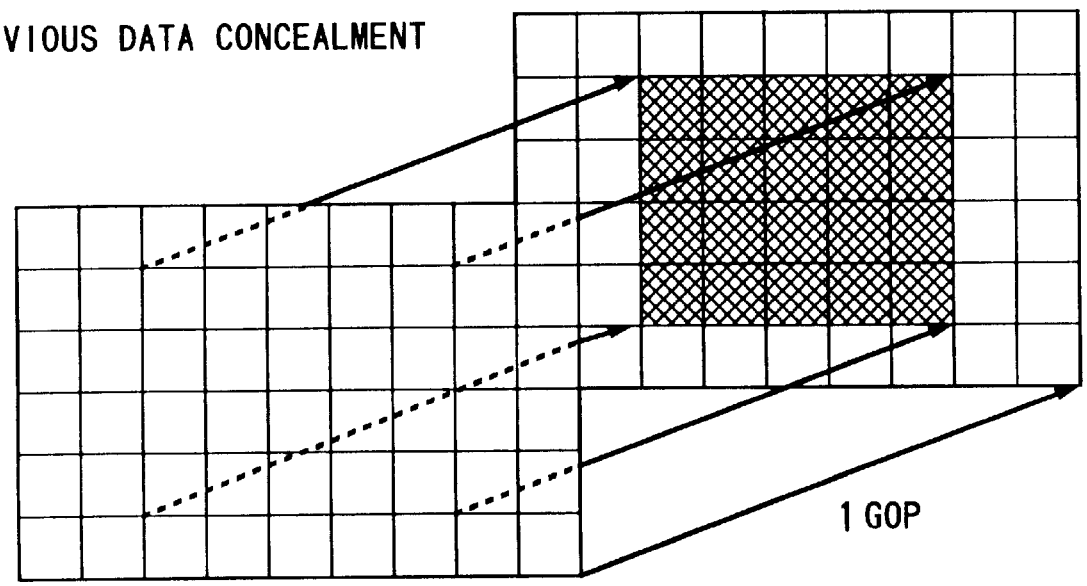

FIGS. 32A to 32C are views of the method for interpolation of the lost video data.

As shown in FIG. 30A and FIG. 31A, even in a case where the audio and video data are not recorded on specific helical tracks, when for example a shuffling pattern designed so that the pixels of the video data after the shuffling will become random is stored in the shuffling ROM circuit 144 (FIG. 2), it is possible to interpolate the data of the pixels lost at the time of reproduction using the data of the surrounding pixels.

As mentioned above, however, a shuffling pattern shuffling the data so that the adjoining macroblocks gather is stored in the shuffling ROM circuit 144 in the first embodiment. If the video data of the specific helical tracks are not recorded, the video data corresponding to a wide area on the picture will be lost together at the time of reproduction. The video data lost in this way cannot be interpolated by using the data of pixels on the periphery at the time of reproduction as shown in FIG. 32A.

In addition, the loss of the audio and video data shown in FIG. 31A occurs successively over GOPs, therefore, as shown in FIG. 32C, the data cannot be interpolated by processing putting parts of the previous picture in the missing portions as they are at the time of reproduction (freezing processing).

Therefore, the SYNC and ID adding circuit 152 performs the track alternation shown in FIGS. 33A and 33B and FIGS. 34A and 34B to prevent the video data of the same part on the picture from being continuously lost and enable freezing processing (FIG. 32C) using the video data reproduced at a time as near as possible to the time of reproduction even in a case where head clogging occurs in the recording head 202.

FIGS. 33A and 33B and FIGS. 34A and 34B are views of the helical tracks of the VTR tape 2 which cannot be read from and the parts on the picture corresponding to the data which cannot be read taking as an example a case where trouble occurs in the second recording head 202 among the four recording heads 200, 202, 204, and 206 of the recording head unit 20 shown in FIG. 4 when the track alternation by the SYNC and ID adding circuit 152 shown in FIG. 2 is being carried out.

Figure 33A:
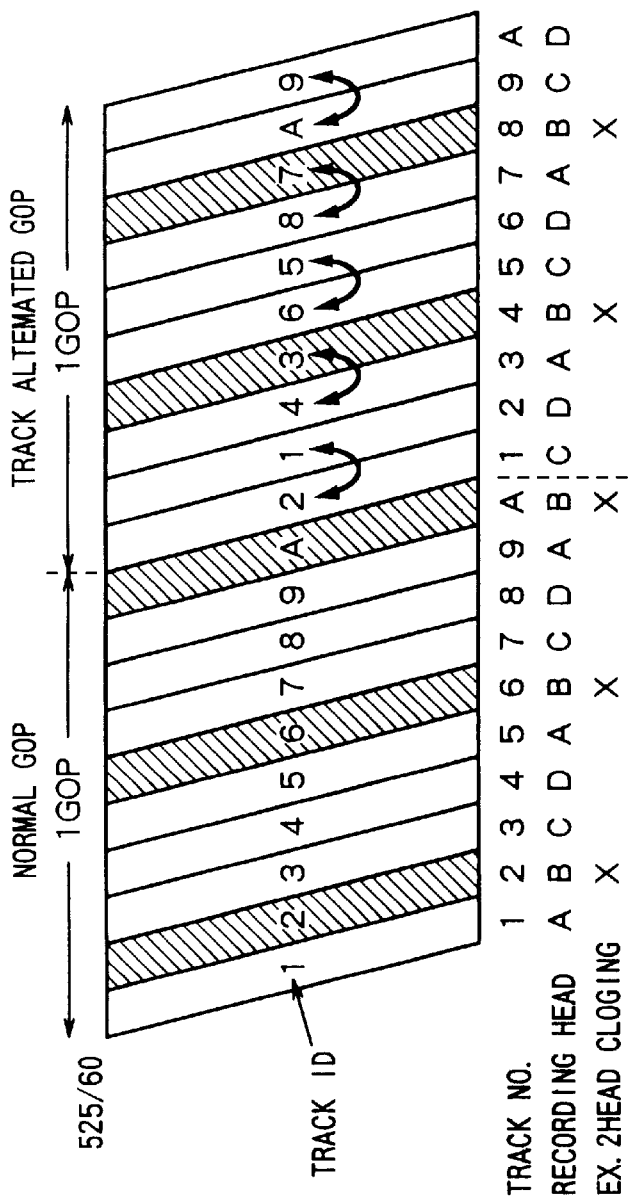
FIGS. 33A and 33B are views of helical tracks of the VTR tape which cannot be read from and a part on the picture corresponding to the data which cannot be read for a case of video data having a 525/60 configuration taking as an example a case where trouble occurs in a second recording head among the four recording heads of the recording head unit shown in FIG. 4 when the track alternation by the SYNC and ID adding circuit shown in FIG. 2 is being carried out.
Figure 33B:
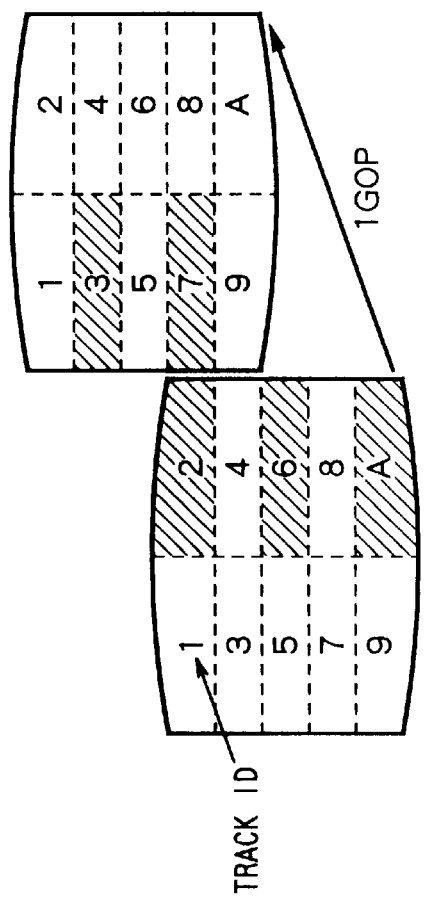
Figure 34A:
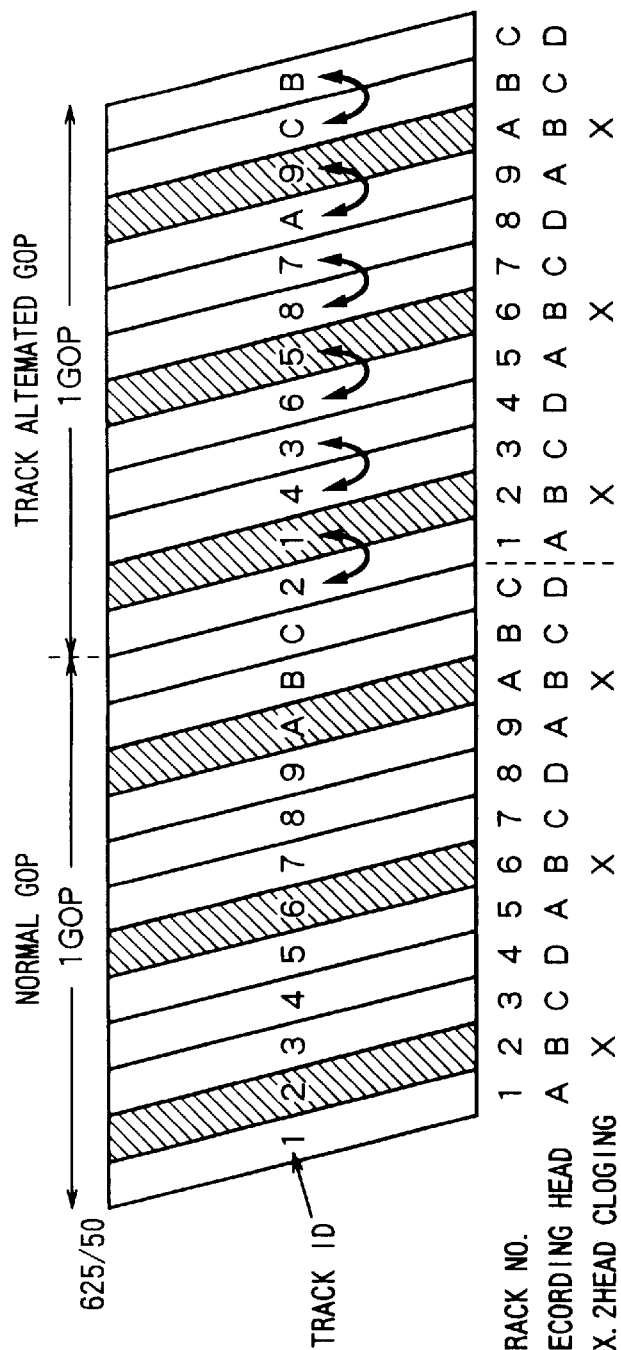
FIGS. 34A and 34B are views of helical tracks of the VTR tape which cannot be read from and a part on the picture corresponding to the data which cannot be read for a case of video data having a 625/50 configuration taking as an example a case where trouble occurs in the second recording head among the four recording heads of the recording head unit shown in FIG. 4 when the track alternation by the SYNC and ID adding circuit shown in FIG. 2 is being carried out.
Figure 34B:
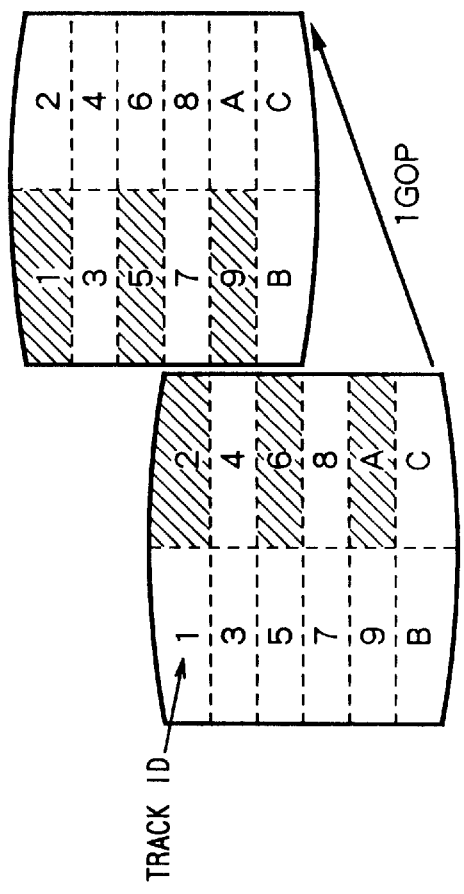

Note that, FIGS. 33A and 33B show the case of audio and video data having a 525/60 configuration; and FIGS. 34A and 34B show the case of audio and video data having a 625/50 configuration. In FIGS. 33A and 33B and FIGS. 34A and 34B, the correspondence between the tracks and the parts on the picture has been simplified without changing the fundamental concept of the present invention.

As shown in FIG. 33A and FIG. 34B, the SYNC and ID adding circuit 152 alternates the audio and video data for each GOP to be recorded on the helical tracks of the VTR tape 2 between adjoining helical tracks. That is, in the case of a normal GOP for which the track alternation shown in FIG. 33A and FIG. 34A is not carried out, the SYNC and ID adding circuit 152 adds the track IDs to individual audio and video data to be recorded on the helical tracks of the VTR tape 2 having the track numbers (Track No.) 01h, 02h, 03h, 04h, 05h, 06h, 07h, 08h, 09h, 0Ah (01h, 02h, 03h, 04h, 05h, 06h, 07h, 08h, 09h, 0Ah, 0Bh, 0Ch) (the contents outside the parentheses indicate the case of the 525/60 configuration, and the contents inside the parentheses indicate the case of the 625/50 configuration, the same is true in the explanation of operation of the SYNC and ID adding circuit 152) in an order of 01h, 02h, 03h, 04h, 05h, 06h, 07h, 08h, 09h, 0Ah (01h, 02h, 03h, 04h, 05h, 06h, 07h, 08h, 09h, 0Ah, 0Bh, 0Ch) and outputs the same to the inner code encoder circuit 154.

On the other hand, in the case of the alternated GOP for the track alternation shown in FIG. 33A and FIG. 34A, the SYNC and ID adding circuit 152 adds the track IDs of for example 02h, 01h, 04h, 03h, 06h, 05h, 08, 07h, 0Ah, 09h (02h, 01h, 04h, 03h, 06h, 05h, 08, 07h, 0Ah, 09h, 0Ch, 0Bh) to the individual audio and video data to be recorded on the helical tracks of the VTR tape 2 having the track numbers (Track No), for example, 01h, 02h, 03h, 04h, 05h, 06h, 07h, 08h, 09h, 0Ah (01h, 02h, 03h, 04h, 05h, 06h, 07h, 08h, 09h, 0Ah, 0Bh, 0Ch) and outputs the resultant audio and video data in this order to the inner code encoder circuit 154. That is, by the processing of the SYNC and ID adding circuit 152, the track IDs of the audio and video data recorded on the VTR tape 2 and the track numbers no longer coincide at every other GOP (10 helical tracks (12 helical tracks)).

Accordingly, as shown in FIGS. 34A and 34B, even in a case where the recording head 202 cannot record the data on the helical tracks of the track numbers 02h, 06h, and 0Ah of the VTR tape 2, the audio and video data having the track IDs of 02h, 06h, and 0Ah are recorded on the helical tracks of the VTR tape 2 having the track numbers 01h, 05h, and 09h at intervals of one GOP, and as shown in FIG. 34B, at the time of reproduction, the images of the parts 01h, 05h, and 09h and the parts 02h, 6h. And 0Ah of the picture are alternately reproduced at intervals of one GOP. Accordingly, at the time of reproduction, by alternately performing the freezing processing (FIG. 32C) with respect to the parts 01h, 05h, and 09h and the parts 02h, 06h, and 0Ah of the picture, the image can be interpolated.

Note that, even in the case shown in FIGS. 33A and 33B, the data which becomes unable to be recording changes for every GOP, and therefore the image can be interpolated by performing the freezing processing.

In comparison with a case where the track alternation shown in FIGS. 30A and 30B and FIGS. 31A and 31B is not carried out and the image of a specific part of the picture cannot be recorded at all, when the track alternation shown in FIGS. 33A and 33B and FIGS. 34A and 34B is carried out, the video data corresponding to all GOPs on the picture can be recorded on the VTR tape 2 at intervals of at least one GOP. Accordingly, when the track alternation is carried out, even in a case where trouble occurs in the recording head 202, interpolation by the freezing processing is possible and the quality of the reproduced picture is improved as a whole.

The effect of improvement of quality of the reproduced picture at the time of occurrence of trouble by the track alternation explained above is similarly exhibited also in cases where trouble occurs in the recording heads 200, 204, and 206 other than the recording head 202.

The inner code encoder circuit 154 generates 12 bits of inner code (FIGS. 7A to 7C) from the audio and video data and system auxiliary data input from the SYNC and ID adding circuit 152, adds the generated inner code to the audio and video data as shown in FIG. 8, and outputs the same to the recording head unit 20.

FIG. 35 is a view of the video data recorded on the VTR tape 2 by the recording head unit 20 shown in FIG. 2.

The recording head unit 20 records the audio and video data input from the inner code encoder circuit 154 on the helical tracks of the VTR tape 2. The recording positions of the macroblocks A, B, and C (FIG. 8) contained in the video data ECC stored in the memory circuit 18 from the component parts of the recording unit 10 become the positions A, B, and C in for example FIG. 35.

In the picture shown in FIG. 5, the macroblocks A and B are adjacent to each other, but the macroblock C is located at a position, away from the macroblocks A and B. Accordingly, as shown in FIG. 35, the macroblocks A and B are recorded at the adjacent positions on the VTR tape 2, and the macroblock C is recorded at a position away from the macroblocks A and B on the VTR tape 2. Note, the macroblocks A and B are distributed to different ECC blocks to improve the reliability with respect to the data error generated in a burst manner.

Below, an explanation will be made of the component parts involved in the operation when the VCR apparatus 1 reproduces the audio and video data from the VTR tape 2.

Each of the reproduction heads 400, 402, 404, and 406 of the reproduction head unit 40 (FIG. 4B) scans the helical tracks (FIG. 35) of the VTR tape 2, reproduces the audio and video data and the system auxiliary data ((PB DATA) FIG. 3; below, this will be also simply referred to as the audio and video data), and outputs the same to the inner code decoder circuit 500.

In the reproduction system 50 of the reproduction unit 48 (FIG. 1, FIG. 3), the inner code decoder circuit 500 detects the data error by using the inner code contained in each of the ECC blocks (FIGS. 7A to 7D) of the audio and video data input from each of the reproduction heads 400, 402, 404, and 406 and corrects the data error. When data error which cannot be corrected is caused in the audio and video data from each of the reproduction heads 400, 402, 404, and 406, the error flag is activated for every audio and video data in which the data error is caused and is output to the non-tracking control circuit 512.

The ID detecting circuit 510 demultiplexes the identification data ID (FIG. 9 and FIG. 10) from the ECC block of the audio and video data input from the inner code decoder circuit 500, outputs the same to the write address control circuit 142, and outputs the audio and video data to the non-tracking control circuit 512.

The non-tracking control circuit 512 performs the non-tracking control by using the system auxiliary data. That is, the non-tracking control circuit 512 selects the audio and video data having the lowest data error rate detected in the inner code decoder circuit 500 and outputs the same to the memory circuit 560.

Here, an explanation will be made of the non-tracking control.

On the VTR tape 2, the audio and video data is recorded by alternately inverting the azimuth angle of the adjoining helical tracks. In this way, when the azimuth angle is alternately inverted for every helical track, even if the helical tracks having different azimuth angles are traced by one of the reproduction heads 400, 402, 404, and 406 of the reproduction head unit 40, the recorded audio and video data cannot be reproduced.

Further, even in a case where one or more of the reproduction heads among the reproduction heads 400, 402, 404, and 406 traces the helical tracks of the same azimuth angle, where the helical tracks are not correctly traced, a large amount of error is caused in the reproduced audio and video data.

In the non-tracking control, this property regarding the azimuth angle of the reproduction heads and the helical tracks at the reproduction of the audio and video data is positively utilized. That is, as shown in FIG. 4B, the reproduction heads 400, 402, 404, and 406 include two positive azimuth heads and two negative azimuth heads at one helical track worth of intervals. The audio and video data read by the reproduction head among the four reproduction heads of the reproduction heads 400, 402, 404, and 406, in which the helical track and the azimuth angle coincide and which correctly traced the helical track, that is, the audio and video data in which the error rate becomes the lowest, is selected and output. By adoption of the non-tracking system, the conditions for the tracking control of the reproduction head with respect to the helical tracks of the VCR apparatus 1 are greatly eased.

The deinterleave ROM circuit 516 corresponds to the interleave ROM circuit 148 of the recording unit 10, stores the deinterleave pattern for returning the audio and video data interleaved by the SYNC and ID adding circuit 152 (FIG. 2) to the arrangement before the interleave, and outputs the stored interleave data to the write address control circuit 514 under the control of the write address control circuit 514.

The write address control circuit 514 controls the deinterleave ROM circuit 516 according to the identification data ID demultiplexed by the ID detecting circuit 510, reads the deinterleave pattern, generates the writing address of the audio and video data output by the non-tracking control circuit 512 based on the read deinterleave pattern, and makes the memory circuit 560 record the audio and video data output from the non-tracking control circuit 512 therein. By such a method, the write address control circuit 514 performs the deinterleaving for the audio and video data output by the SYNC and ID adding circuit 152 and returns the arrangement to that before the interleave.

The audio and video data output from the non-tracking control circuit 512 is stored at the addresses of the memory circuit 560 generated by the inner code encoder circuit 154 and returned in arrangement to the same as the ECC blocks (FIGS. 7A to 7D) of the original audio and video data.

In this way, the audio and video data subjected to the track alternation is rearranged based on the identification data ID inserted at the time of recording, whereby the arrangement can be returned to the original one by exactly the same processing as that for the audio and video data for which the track alternation was not carried out.

Further, the non-tracking control circuit 512 rearranges the ECC blocks returned to the original arrangement to the arrangement suited to the error correction using the outer code in the outer code decoder circuit 518 and outputs the result to the outer code decoder circuit 518.

The outer code decoder circuit 518 corrects the error of the audio and video data by using the outer code contained in the ECC blocks of the audio and video data input from the non-tracking control circuit 512 and outputs the result to the jog memory circuit 562.

The deshuffling ROM circuit 520 corresponds to the shuffling ROM circuit 144 of the recording unit 10, stores the deshuffling data for returning to the original arrangement the audio and video data which was shuffled by the write address control circuit 142 in the recording unit 10 and changed in arrangement, and outputs the deshuffling data to the read address control circuit 522 under the control of the read address control circuit 522.

The read address control circuit 522 controls the deshuffling ROM circuit 520 based on the identification data ID of the audio and video data for which the depack circuit 524 requests the reading and makes this generate the deshuffling data, generates the reading address for returning the audio and video data stored in the jog memory circuit 562 to the arrangement at the time of the recording based on the deshuffling data generated by the deshuffling ROM circuit 520, and outputs the same to the jog memory circuit 562.

Note that, the read address control circuit 522 generates the reading address for realizing special reproduction and outputs the same to the jog memory circuit 562 where a special reproduction, for example, jog shuttle reproduction, is to be carried out.

The jog memory circuit 562 outputs the audio and video data stored at the reading address input to the depack circuit 524 in the arrangement at the time of the recording.

The depack circuit 524 demultiplexes the audio data (OUTPUT AUDIO) from the recording block units of the audio and video data input from the jog memory circuit 562 and outputs the same to the external video processing apparatus corresponding to the pack circuit 140 of the recording unit 10, demultiplexes the video data and outputs the same to the expansion and decoding system 58, and further demultiplexes the system auxiliary data and outputs the same to the control unit 60.

The expansion and decoding system 58 performs the expansion and decoding corresponding to the compressing and coding method in the compressing and coding system 12 (FIG. 2) with respect to the video data input from the depack circuit 524 and outputs the video data (OUTPUT VIDEO) corresponding to the original video data (INPUT VIDEO; FIG. 2) to the external video processing apparatus.

Note that, where an error which cannot be corrected is caused in the input video data, the expansion and decoding system 58 performs interpolation by using the pixels on the periphery shown in FIG. 32A or interpolation by the freezing processing shown in FIG. 32C in accordance with the range where the error is caused and thereby corrects the loss of the image due to the head clogging or the like.

Below, the operation of the VCR apparatus 1 at the time of recording will be explained.

The compressing and coding system 12 (FIG. 2) divides the noncompressed video data input from the outside into macroblocks (FIG. 5) consisting of 16 pixels×16 lines and compresses and codes the same. It thereby generates compressed video data (FIGS. 6A to 6C) in which one GOP is comprised by 2 frames (I-frame, B-frame).

In the recording system 14 (FIG. 1), the pack circuit 140 (FIG. 2) packs the compressed video data input from the compressing and coding system 12 and the noncompressed audio data input from the external portion in the recording block units (FIG. 6C) and stores the same in the memory circuit 18 in the form of the ECC blocks (FIGS. 7A to 7D). At this time, by storing the audio and video data at the writing address of the memory circuit 18 generated by the write address control circuit 142, shuffling is applied to the audio and video data.

The outer code encoder 146 reads the audio and video data contained in the ECC blocks (FIGS. 7A to 7D) from the memory circuit 18, generates the outer codes, adds the generated outer codes to the audio and video data. and stores the result in the memory circuit 18.

The SYNC and ID adding circuit 152 divides the audio and video data to which the outer codes are added corresponding to the helical tracks of the VTR tape 2 and adds the synchronization data SYNC and the track IDs (FIG. 9, FIG. 10) and, at the same time, performs the interleaving and the track alternation (FIGS. 33A and 33B and FIGS. 34A and 33B).

The inner code encoder circuit 154 generates the inner codes (FIGS. 7A to 7D) for the audio and video data for which the interleaving and the track alternation are carried out, adds the generated inner codes to the audio and video data, and outputs the resultant data to the recording head unit 20.

The recording head unit 20 records the audio and video data to which the inner codes are added on the helical tracks (FIG. 35) of the VTR tape 2.

Below, an explanation will be made of the operation of the VCR apparatus 1 at the time of reproduction.

Each of the reproduction heads 400, 402, 404, and 406 (FIG. 4B) of the reproduction head unit 40 reproduces the audio and video data from the VTR tape 2.

The inner code decoder circuit 500 detects the data error by using the inner codes contained in the audio and video data reproduced by each of the reproduction heads 400, 402, 404, and 406 and corrects the data error. Further, the inner code decoder circuit 500 activates the error flag where a data error which cannot be corrected is caused in the audio and video data.

The ID detecting circuit 510 demultiplexes the identification data ID (FIG. 9, FIG. 10) from the ECC block of the audio and video data, outputs the same to the write address control circuit 514, and outputs the audio and video data to the non-tracking control circuit 512.

The non-tracking control circuit 512 performs the non-tracking control by using the system auxiliary data, that is, the non-tracking control circuit 512 selects the audio and video data detected at the inner code decoder circuit 500 in which the data error rate is the lowest and outputs the same.

The deinterleave ROM circuit 516 and the write address control circuit 514 perform the processing corresponding to the interleaving, that is, the processing for returning the audio and video data to the original arrangement (deinterleave) based on the identification data ID detected by the ID detecting circuit 510.

The outer code decoder circuit 518 corrects the error of the audio and video data by using the outer code with respect to the audio and video data returned to the original order and makes the jog memory circuit 562 to store the same.

The deshuffling ROM circuit 520 and the read address control circuit 522 generates the reading address for returning the arrangement of the audio and video data stored in the jog memory circuit 562 to the arrangement at the time of recording based on the identification data ID of the audio and video data for which the depack circuit 524 requests the reading and outputs the same to the jog memory circuit 562. Further, the read address control circuit 522 generates the reading address for special reproduction such as jog shuttle reproduction in accordance with the request of the control unit 60.

The depack circuit 524 demultiplexes the audio data (OUTPUT AUDIO) from the audio and video data output by the jog memory circuit 562 and outputs the same to the external video processing apparatus and demultiplexes the video data and outputs the same to the expansion and decoding system 58. Further, the depack circuit 524 demultiplexes the system auxiliary data and outputs the same to the control unit 60.

The expansion and decoding system 58 performs the expansion and decoding processing for the compressed video data by the compressing and coding method corresponding to the compressing and coding system 12 (FIG. 2) and outputs the video data (OUTPUT VIDEO) to the external video processing apparatus. Further, the expansion and decoding system 58 performs the interpolation (FIGS. 32A and 32C) of the video data according to need to corrects the loss of the image.

As explained above, according to the VCR apparatus 1 of the present invention, even if the compression and coding are carried out by using relatively large macroblocks and the video data recorded on the VTR tape 2 is reproduced at a high speed, the reproduced input does not become unnatural, the recognition of the contents becomes easy, and in addition the ability to correct error in the audio and video data is not lowered.

Further, even in a case where head clogging occurs in a recording head or a reproduction head, the quality of the reproduced image is not deteriorated much. In addition, irrespective of the fact that such an effect can be obtained, there is almost no hardware which should be added in comparison with the conventional VCR.

Further, in the first embodiment, the explanation was made of a case where trouble occurred in the recording head unit 20, but even in a case where trouble occurs in the reproduction head unit 40, a similar effect can be obtained according to the VCR 1 of the present invention.

Note that, the numbers of heads of the recording head unit 20 and the reproduction head unit 40 were examples. It is satisfactory so far as each of the recording head unit 20 and the reproduction head unit 40 has at least two heads.

Further, the track alternation shown in FIGS. 33A and 33B and FIGS. 34A and 34B is an example. It is also possible to perform the track alternation by another pattern.

Further, the shuffling pattern and interleave pattern recorded in the shuffling ROM circuit 144 and the interleave ROM circuit 148 are examples. These can be changed to other patterns having an equivalent effect.

Further, the configuration of the VCR apparatus 1 is an example. So far as the required functions and performance can be secured, there is no problem if the component parts are constituted in terms of hardware or constituted in terms of software.

Below, another embodiment of the present invention will be explained.

In this embodiment, the explanation will be made of track alternation in a case where each of the recording head unit 20 and the reproduction head unit 40 of the VCR apparatus 1 has two heads.

In this embodiment, the recording head unit 20 has only two recording heads 200 and 204 (FIG. 4A), and the reproduction head unit 40 has two reproduction heads 400 and 404.

FIGS. 36A and 36B and FIGS. 37A and 37B are views of the helical tracks of the VTR tape 2 which cannot be read from and the parts on the picture corresponding to the data which cannot be read taking as an example a case where trouble occurs in the second recording head 204 among the two recording heads 200 and 204 of the recording head unit 20 shown in FIG. 4A when the track alternation by the SYNC and ID adding circuit 152 shown in FIG. 2 is not carried out.

Figure 36A:
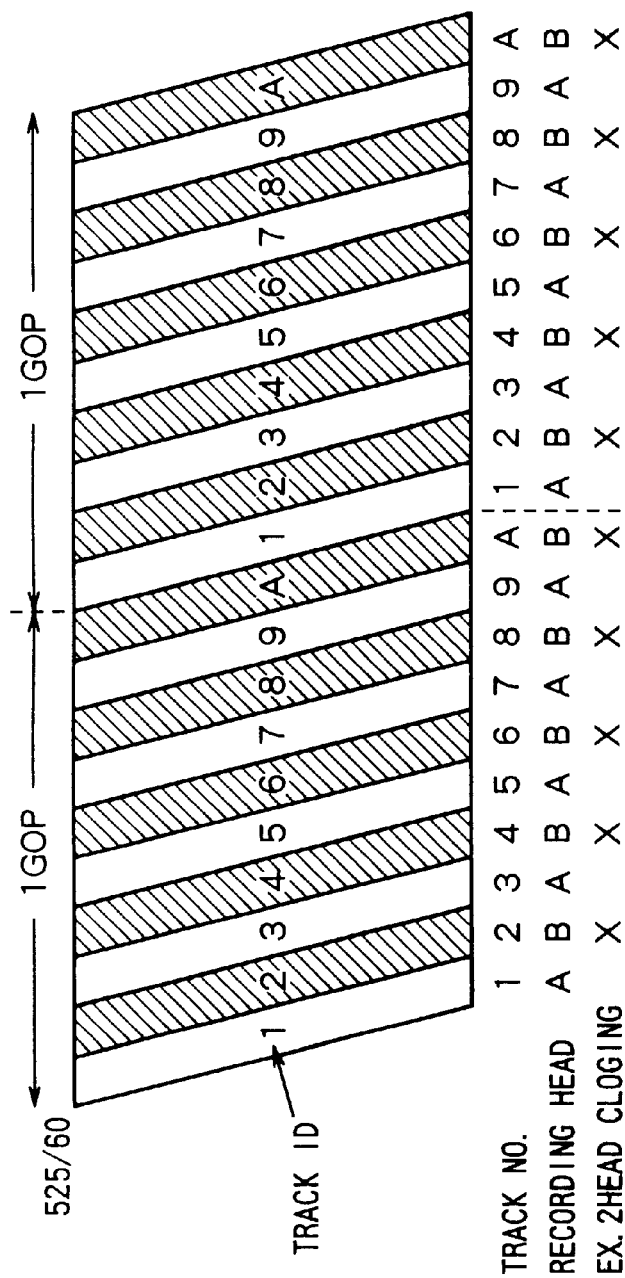
FIGS. 36A and 36B are views of helical tracks of the VTR tape which cannot be read from and a part on the picture corresponding to the data which cannot be read for a case of video data having a 525/60 configuration taking as an example a case where trouble occurs in the second recording head among two recording heads of the recording head unit 20 when the track alternation by the SYNC and ID adding circuit shown in FIG. 2 is not carried out.
Figure 36B:
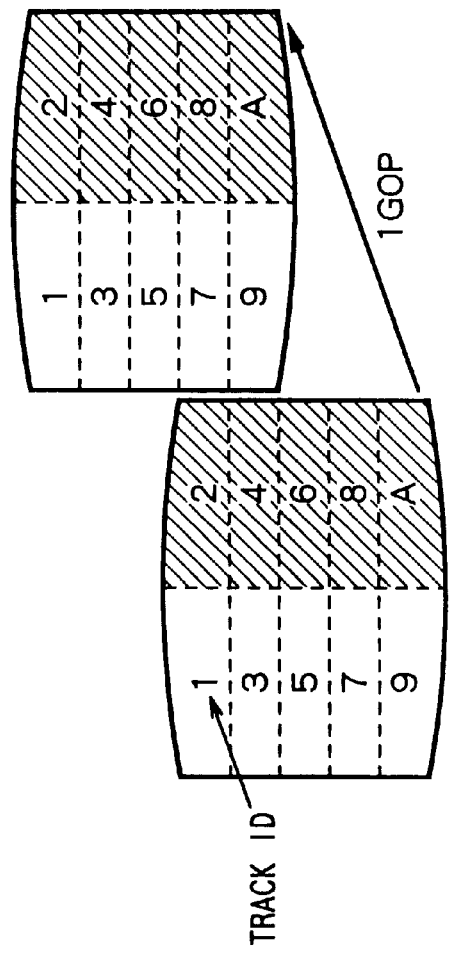
Figure 37A:
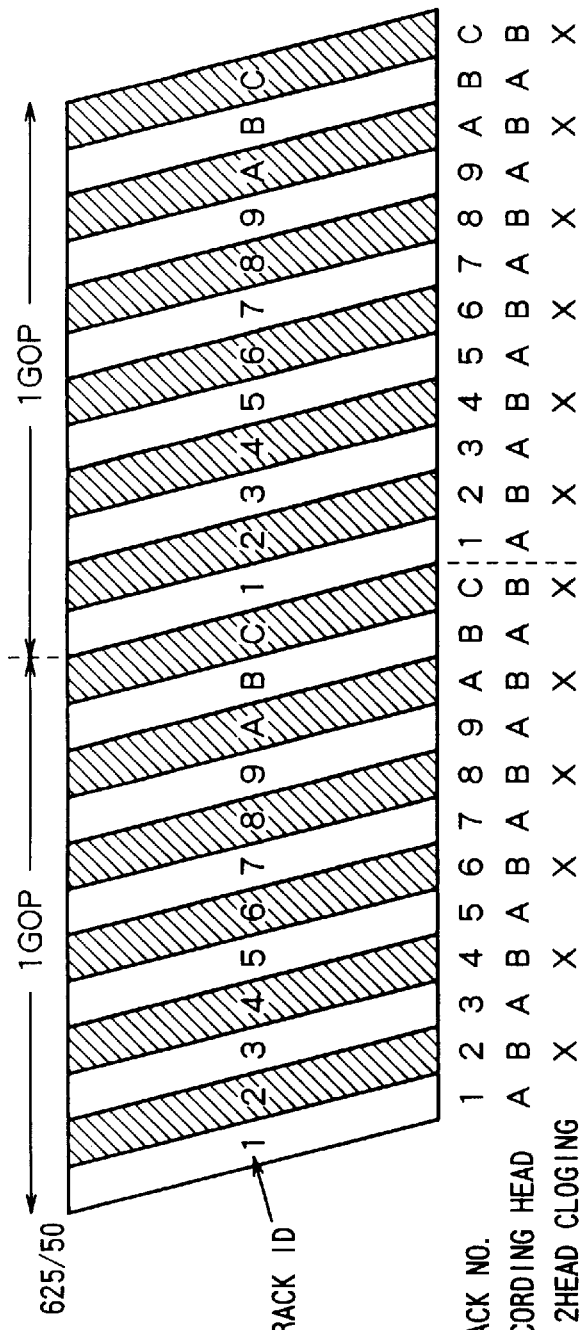
FIGS. 37A and 37B are views of helical tracks of the VTR tape which cannot be read from and a part on the picture corresponding to the data which cannot be read for a case of video data having a 625/50 configuration taking as an example a case where trouble occurs in the second recording head among two recording heads of the recording head unit 20 when the track alternation by the SYNC and ID adding circuit shown in FIG. 2 is not carried out.
Figure 37B:
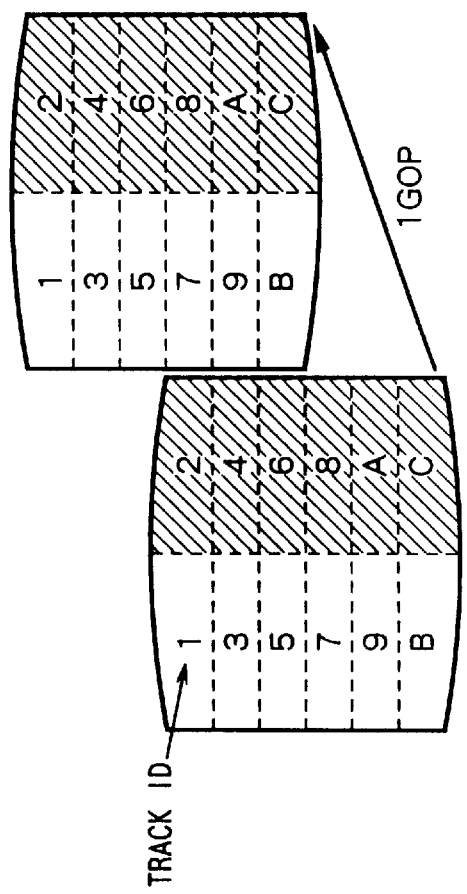

Note that, FIGS. 36A and 36B show the case of the audio and video data having a 525/60 configuration; and FIGS. 37A and 37B show the case of the audio and video data having a 625/50 configuration. The correspondence between the tracks and the parts on the picture is simplified for convenience of illustration.

In FIG. 36A, the helical tracks of the track numbers (Track No.) 01h, 03h, 05h, . . . correspond to the recording head 200, and the helical tracks of the track numbers 02h, 04h, 06h, . . . correspond to the recording head 204.

Here, when trouble such as head clogging occurs in the recording head 204 among the two recording heads 200 and 204 of the recording head unit 20 and the recording head 204 cannot write the audio and video data on the VTR tape 2, the audio and video data (track ID=02h, 04h, 06h . . . ) of the helical tracks scanned by the recording head 204 can no longer be recorded. Here, as mentioned in the first embodiment, the write address control circuit 142 and the shuffling ROM circuit 144 of the VCR apparatus 1 perform shuffling with respect to the compressed video data with a shuffling pattern designed so that the adjoining macroblocks on the picture gather, and the audio and video data (track ID=02h, 04h, 06h . . . ) correspond to for example the parts 02h, 06h, 0Ah . . . on the picture shown in FIG. 36B. Accordingly, the audio and video data corresponding to the parts 02h, 04h, 06h, 08h, and 0Ah on the picture will not be recorded on the VTR tape 2 so long as trouble occurs in the recording head 204.

As shown in FIGS. 37A and 37B, regarding the effect of the trouble of the recording head 204, a similar effect is exerted concerning the audio and video data having a 626/50 configuration.

FIGS. 38A and 38B and FIGS. 39A and 39B are views of the helical tracks of the VTR tape 2 which cannot be read from and the parts of the picture corresponding to the data which cannot be read taking as an example a case where trouble occurs in the second recording head 204 among the two recording heads 200 and 204 of the recording head unit 20 shown in FIG. 4 when the track alternation by the SYNC and ID adding circuit 152 shown in FIG. 2 is being carried out.

Figure 38A:
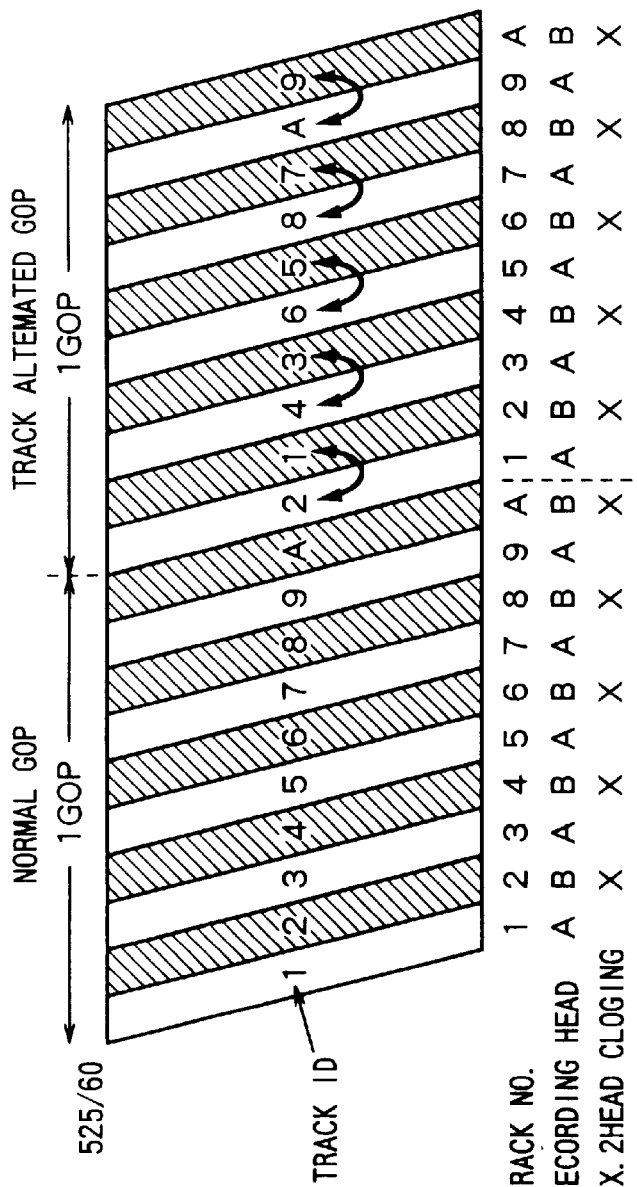
FIGS. 38A and 38B are views of helical tracks of the VTR tape which cannot be read from and a part on the picture corresponding to the data which cannot be read for a case of video data having a 525/60 configuration taking as an example a case where trouble occurs in the second recording head among two recording heads of the recording head unit when the track alternation by the SYNC and ID adding circuit shown in FIG. 2 is being carried out.
Figure 38B:
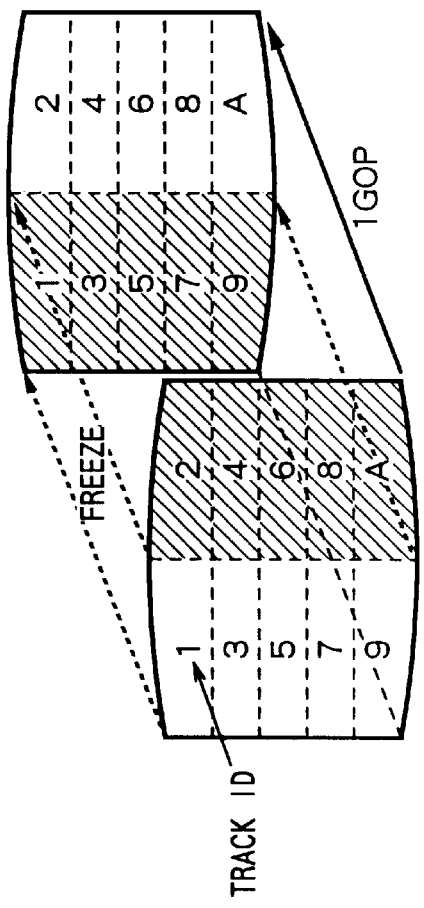
Figure 39A:
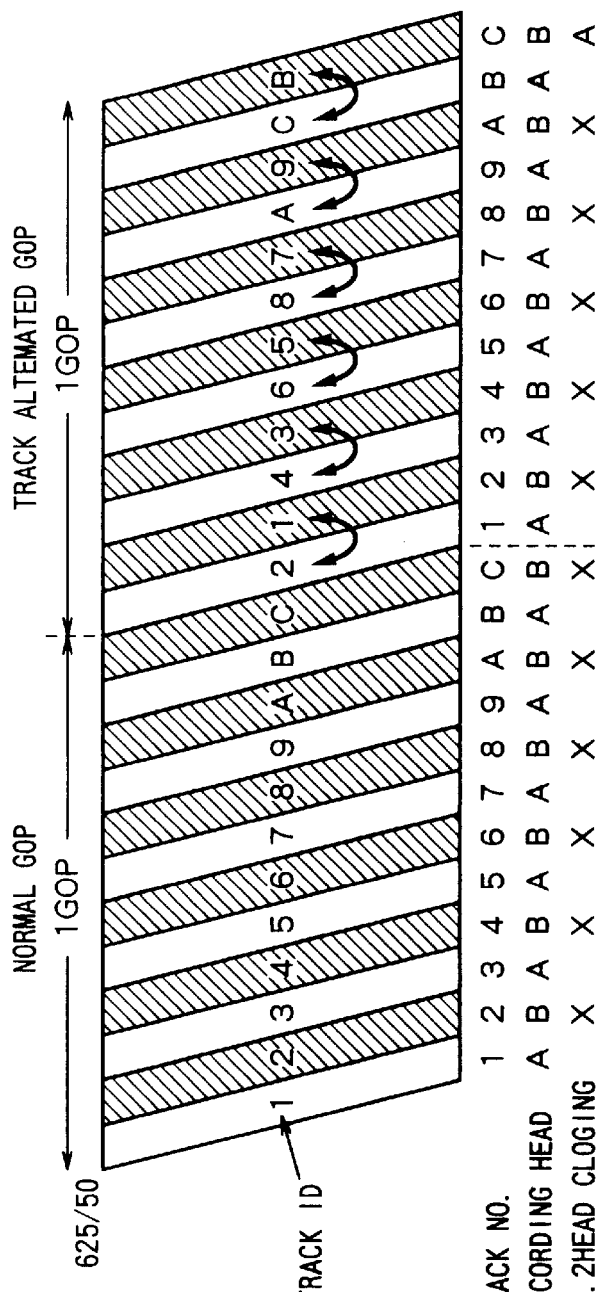
FIGS. 39A and 39B are views of helical tracks of the VTR tape which cannot be read from and a part on the picture corresponding to the data which cannot be read for a case of video data having a 625/50 configuration taking as an example a case where trouble occurs in the second recording head among two recording heads of the recording head unit when the track alternation by the SYNC and ID adding circuit shown in FIG. 2 is being carried out.
Figure 39B:
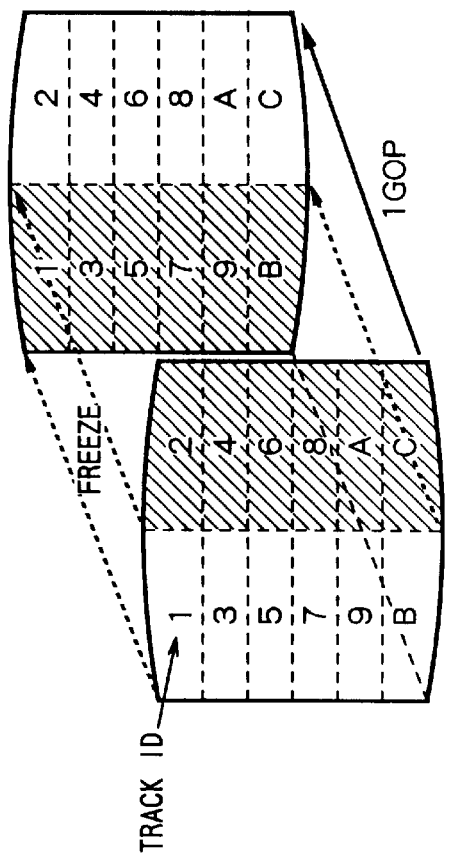

Note that, FIGS. 38A and 38B show the case of audio and video data having a 525/60 configuration; and FIG. 39 shows the case of audio and video data having a 625/50 configuration. In FIGS. 38A and 38B and FIGS. 39A and 39B, the correspondence between the tracks and the parts on the picture has been simplified without changing fundamental concept of the present invention.

As shown in FIG. 38A and FIG. 39B, the SYNC and ID adding circuit 152 alternates the audio and video data to be recorded for each one GOP on each of the helical tracks of the VTR tape 2 between the adjoining helical tracks. That is, in the case of a normal GOP for which the track alternation shown in FIG. 38A and FIG. 39A is not carried out, the SYNC and ID adding circuit 152 adds the track IDs to the individual audio and video data to be recorded on the helical tracks of the VTR tape 2 having the track numbers (Track No.) 01h, 02h, 03h, 04h, 05h, 06h, 07h, 08h, 09h, 0Ah (01h, 02h, 03h, 04h, 05h, 06h, 07h, 08h, 09h, 0Ah, 0Bh, 0Ch) (the contents outside the parentheses indicate the case of a 525/60 configuration, and the contents inside the parentheseses indicate the case of a 625/50 configuration, this same is true in the explanation of operation of the SYNC and ID adding circuit 152) in the order of 01h, 02h, 03h, 04h, 05h, 06h, 07h, 08h, 09h, 0Ah (01h, 02h, 03h, 04h, 05h, 06h, 07h, 08h, 09h, 0Ah, 0Bh, 0Ch) and outputs the same to the inner code encoder circuit 154.

On the other hand, in the case of the alternated GOP for the track alternation shown in FIG. 38A and FIG. 39A, the SYNC and ID adding circuit 152 adds the track IDs of for example 02h, 01h, 04h, 03h, 06h, 05h, 08, 07h, 0Ah, 09h (02h, 01h, 04h, 03h, 06h, 05h, 08, 07h, 0Ah, 09h, 0Ch, 0Bh) to the individual audio and video data to be recorded on the helical tracks of the VTR tape 2 having the track numbers (Track No) of, for example, 01h, 02h, 03h, 04h, 05h, 06h, 07h, 08h, 09h, 0Ah (01h, 02h, 03h, 04h, 05h, 06h, 07h, 08h, 09h, 0Ah, 0Bh, 0Ch) and outputs the resultant data in this order to the inner code encoder circuit 154. That is, by the processing of the SYNC and ID adding circuit 152, the track IDs of the audio and video data recorded on the VTR tape 2 and the track numbers no longer coincide for every other GOP (10 helical tracks (12 helical tracks)).

Accordingly, even in a case where the recording head 204 cannot record the data on the helical tracks of the track numbers 02h, 04h, 06h, . . . of the VTR tape 2, all audio and video data are recorded on the helical tracks of the VTR tape 2 having the track numbers 01h, 05h, and 09h at intervals of one GOP, and as shown in FIG. 38B and FIG. 39B, at the time of reproduction, the images of the parts 01h, 03h, 05h, . . . , 0Bh and the parts 02h, 04h, 06h, . . . , 0Ch of the picture are alternately reproduced at intervals of one GOP. Accordingly, at the time of reproduction, by alternately performing the freezing processing (FIG. 32C) with respect to the parts 01h, 03h, 05h, . . . , 0Bh and the parts 02h, 04h, 06h, . . . , 0Ch of the picture, the image can be interpolated.

In comparison with a case where the track alternation shown in FIGS. 36A and 36B and FIGS. 37A and 37B is not carried out and the image of a specific part of the picture cannot be recorded at all, when the track alternation shown in FIGS. 38A and 38B and FIGS. 39A and 39B is carried out, the video data corresponding to all GOPs of the picture can be recorded on the VTR tape 2 at intervals of at least one GOP. Accordingly, when the track alternation is carried out, even in a case where trouble occurs in the recording head 204, interpolation by the freezing processing is possible and the quality of the reproduced picture is improved as a whole.

Note that, even in a case where trouble occurs in the recording head 200, a similar effect can be obtained by the track alternation shown in the second embodiment.

Further, the same modifications shown in the first embodiment are possible for a VCR apparatus 1 to which the track alternation shown in the second embodiment is applied.

As explained above, according to the video data recording and reproducing apparatus of the present invention such as the VCR apparatus, even in a case where the video data is compressed and coded and recorded on the VTR tape by using large macroblocks each consisting of 16×16 pixels and further is reproduced at a high speed for display, a reproduced input which is natural and easy to view can be obtained.

Also, according to the present invention, even in a case where clogging is caused in the recording/reproduction heads, loss will not be continuously caused at the same position of the image obtained by reproducing the video data from the VTR tape.

Further, according to the present invention, no matter which shuffling pattern is used to shuffle the video data to be reproduced from the VTR tape, loss will not be continuously caused at the same position of the image.

According to the present invention, even in a case where clogging is caused in the recording/reproduction heads of the rotation heads, inter-frame interpolation can be easily carried out and the quality of the reproduced image will not be largely deteriorated.

What is claimed is:

1. A method of recording video data on a magnetic tape, the video data representing a plurality of images and being partitioned into groups of pictures, each said group of pictures including a plurality of macroblocks, and each said macroblock representing a portion of one of said images, the method comprising the steps of:

shuffling said macroblocks such that their recording order does not correspond in an ordered fashion to their display order;

recording a respective macroblock at a position adjacent to another macroblock corresponding to the same one of said images such that said respective macroblock and said another macroblock represent adjacent portions of said one of said images; and alternating, on a per group of pictures basis, the track order in which corresponding portions of said images are recorded.

2. Apparatus for recording video data on a magnetic tape, the video data representing a plurality of images and being partitioned into groups of pictures, each said group of pictures including a plurality of macroblocks, and each said macroblock representing a portion of one of said images, the apparatus comprising:

shuffling means for shuffling said macroblocks such that their recording order does not correspond in an ordered fashion to their display order;

means for recording a respective macroblock at a position adjacent to another macroblock corresponding to the same one of said images such that said respective macroblock and said another macroblock represent adjacent portions of said one of said images;

interleaving means for packing macroblocks assigned to adjacent positions on said tape into different error correction blocks;

error correction code means for adding error correction codes to each said error correction block; and alternating means for alternating, on a per group of pictures basis, the track order in which corresponding portions of said images are recorded.

3. Apparatus for recording video data on a magnetic tape, the video data representing a plurality of images and being partitioned into groups of pictures, each said group of pictures including a plurality of macroblocks, and each said macroblock representing a portion of one of said images, the apparatus comprising:

video data processing means for operating on said video data to generate processed video data, including:

shuffling means for shuffling said macroblocks such that their recording order does not correspond in an ordered fashion to their display order;

means for positioning a respective macroblock at a position adjacent to another macroblock corresponding to the same one of said images such that said respective macroblock and said another macroblock represent adjacent portions of said one of said images;

interleaving means for packing macroblocks assigned to adjacent positions on said tape into different error correction blocks;

error correction code means for adding error correction codes to each said error correction block; and alternating means for alternating, on a per group of pictures basis, the track order in which corresponding portions of said images are recorded; and recording means for recording said processed video data on said magnetic tape.

4. The apparatus as set forth in claim 3, further comprising:

video data reproducing means for reproducing the processed video data recorded on said magnetic tape to generate reproduced data;

deshuffling means for deshuffling said reproduced data so as to reverse the operation of said shuffling means, thereby generating deshuffled data;

error correction means for performing error correction on said deshuffled data using said error correction codes, thereby generating corrected data; and expanding means for expanding said corrected data.

5. Apparatus for processing video data prior to recording on a magnetic tape, the video data representing a plurality of images and being partitioned into groups of pictures, each said group of pictures including a plurality of shuffling blocks, the apparatus comprising:

shuffling means for rearranging the relative positions of said shuffling blocks so that their recording order does not correspond in an ordered fashion to their display order, thereby generating a plurality of shuffled blocks;

partitioning means for partitioning each of said shuffled blocks into a plurality of recording blocks;

identification code adding means for adding an identification code to each said recording block, said identification code indicating the recording order of said recording block on said magnetic tape; and alternating means for alternating said identification codes of said recording blocks such that the track order in which corresponding portions of said images are recorded is alternated on a group of pictures basis.

6. Apparatus for recording video data on a magnetic tape, the video data representing a plurality of images and being partitioned into groups of pictures, each said group of pictures including a plurality of shuffling blocks, the apparatus comprising:

shuffling means for rearranging the relative positions of said shuffling blocks so that their recording order does not correspond in an ordered fashion to their display order, thereby generating a plurality of shuffled blocks;

partitioning means for partitioning each of said shuffled blocks into a plurality of recording blocks;

identification code adding means for adding an identification code to each said recording block, said identification code indicating the recording order of said recording block on said magnetic tape;

alternating means for alternating said identification codes of said recording blocks such that the track order in which corresponding portions of said images are recorded is alternated on a group of pictures basis, thereby generating processed data; and recording means for recording said processed data.

7. The apparatus of claim 6, wherein said recording means has a plurality of recording heads for recording each of the plurality of shuffled blocks by sequentially accessing each of a plurality of recording areas of said magnetic tape in a predetermined order.

8. The apparatus of claim 7, further comprising:

reproducing means for reproducing said plurality of shuffled blocks from said plurality of recording areas of said magnetic tape; and order restoring means for restoring the order of said recording blocks so as to reverse the operation of said alternating means.

* * * * *